(12) United States Patent
Dulkin et al.

(10) Patent No.: US 10,044,726 B2
(45) Date of Patent: *Aug. 7, 2018

(54) SYSTEMS AND METHODS FOR DETECTING AND REACTING TO MALICIOUS ACTIVITY IN COMPUTER NETWORKS

(71) Applicant: CyberArk Software Ltd., Petach-Tikva (IL)

(72) Inventors: Andrey Dulkin, Herzelia (IL); Lavi Lazarovitz, Ramat-Gan (IL)

(73) Assignee: CyberArk Software Ltd., Petach-Tikva (IL)

( * ) Notice: Subject to any disclaimer, the term of this patent is extended or adjusted under 35 U.S.C. 154(b) by 302 days.

This patent is subject to a terminal disclaimer.

(21) Appl. No.: 15/147,428

(22) Filed: May 5, 2016

(65) Prior Publication Data

US 2016/0330220 A1 Nov. 10, 2016

Related U.S. Application Data

(60) Provisional application No. 62/158,135, filed on May 7, 2015, provisional application No. 62/234,112, filed (Continued)

(51) Int. Cl.
*H04L 29/06* (2006.01)
(52) U.S. Cl.
CPC .......... *H04L 63/102* (2013.01); *H04L 63/08* (2013.01); *H04L 63/0807* (2013.01);
(Continued)

(58) Field of Classification Search
CPC ....... H04L 63/102; H04L 63/08; H04L 63/20; H04L 63/1433; H04L 63/1416; H04L 63/0807
See application file for complete search history.

(56) References Cited

U.S. PATENT DOCUMENTS 6,775,704 B1 * 8/2004 Watson ................... G06F 9/547
709/229
7,240,192 B1 * 7/2007 Paya ................... H04L 63/0807
713/152

(Continued)

*Primary Examiner* — Darren B Schwartz
(74) *Attorney, Agent, or Firm* — Finnegan, Henderson, Farabow, Garrett & Dunner LLP

(57) ABSTRACT

Described herein are systems and methods for performing potentially malicious activity detection operations. Embodiments may include receiving data associated with a plurality of authentication messages; analyzing the received data associated with the plurality of authentication messages; determining, based on the analyzing, a plurality of characteristics of the data associated with the authentication messages; receiving data associated with a new authentication message communicated over the network; determining a plurality of characteristics of the data associated with the new authentication message; comparing at least one determined characteristic of the new authentication message data with at least one of: a determined characteristic of the plurality of authentication messages data, known valid data, and known invalid data; and generating, based on the comparison, an assessment of whether the new authentication message is indicative of the potentially malicious activity in the network.

25 Claims, 32 Drawing Sheets

Related U.S. Application Data on Sep. 29, 2015, provisional application No. 62/247,270, filed on Oct. 28, 2015.

(52) U.S. Cl.
CPC ...... H04L 63/1416 (2013.01); H04L 63/1433 (2013.01); H04L 63/20 (2013.01)

(56) References Cited

U.S. PATENT DOCUMENTS

| | | | | |
|---|---|---|---|---|
| 8,763,120 B1* | 6/2014 | Forristal | ............... | G06F 21/566 726/23 |
| 8,856,869 B1* | 10/2014 | Brinskelle | ............... | H04L 63/08 726/12 |
| 2002/0094090 A1* | 7/2002 | Iino | ............... | G06F 21/6209 380/282 |
| 2002/0150253 A1* | 10/2002 | Brezak | ............... | H04L 63/0428 380/281 |
| 2003/0149871 A1* | 8/2003 | Medvinsky | ......... | H04L 63/0807 713/155 |
| 2003/0229789 A1* | 12/2003 | Morais | ............... | H04L 9/083 713/171 |
| 2004/0078571 A1* | 4/2004 | Haverinen | ............... | H04L 9/0869 713/168 |
| 2004/0128390 A1* | 7/2004 | Blakley, III | ........ | H04L 63/0807 709/228 |
| 2005/0050317 A1* | 3/2005 | Kramer | ............... | G06F 21/606 713/155 |
| 2005/0198379 A1* | 9/2005 | Panasyuk | ............... | G06F 21/31 709/239 |
| 2005/0210253 A1* | 9/2005 | Shigeeda | ............... | H04L 9/0863 713/171 |
| 2006/0004662 A1* | 1/2006 | Nadalin | ............... | H04L 63/02 705/50 |
| 2006/0048212 A1* | 3/2006 | Tsuruoka | ............... | H04L 9/0866 726/4 |
| 2007/0162961 A1* | 7/2007 | Tarrance | ............... | G06F 21/33 726/5 |
| 2007/0220595 A1* | 9/2007 | M'raihi | ............... | G06F 21/316 726/5 |
| 2008/0127323 A1* | 5/2008 | Soin | ............... | G06F 21/31 726/12 |
| 2008/0127332 A1* | 5/2008 | Kawai | ............... | G06F 21/10 726/21 |
| 2008/0295169 A1* | 11/2008 | Crume | ............... | H04L 63/1441 726/22 |
| 2009/0144806 A1* | 6/2009 | Gal | ............... | H04L 63/083 726/3 |
| 2010/0023762 A1* | 1/2010 | Kailash | ............... | H04L 63/0442 713/168 |
| 2010/0031315 A1* | 2/2010 | Feng | ............... | G06F 21/554 726/3 |
| 2010/0199100 A1* | 8/2010 | Goertzen | ............... | G06F 21/31 713/185 |
| 2011/0179478 A1* | 7/2011 | Flick | ............... | H04L 9/0822 726/9 |
| 2011/0282997 A1* | 11/2011 | Prince | ............... | H04L 61/1511 709/226 |
| 2011/0305333 A1* | 12/2011 | Jacobson | ............... | H04L 9/0844 380/44 |
| 2012/0023567 A1* | 1/2012 | Hammad | ............... | G06Q 20/12 726/9 |
| 2012/0159180 A1* | 6/2012 | Chase | ............... | G06F 21/6227 713/183 |
| 2012/0173870 A1* | 7/2012 | Reddy | ............... | H04L 63/0428 713/153 |
| 2012/0284507 A1* | 11/2012 | Bostanci | ............... | H04L 9/3213 713/155 |
| 2012/0291129 A1* | 11/2012 | Shulman | ............... | H04L 63/1433 726/23 |
| 2012/0311689 A1* | 12/2012 | Kron | ............... | G06F 21/33 726/9 |
| 2013/0047203 A1* | 2/2013 | Radhakrishnan | ..... | G06F 21/335 726/1 |
| 2013/0055384 A1* | 2/2013 | Shulman | ............... | H04L 63/1425 726/22 |
| 2013/0067555 A1* | 3/2013 | Toomey | ............... | G06F 21/31 726/9 |
| 2013/0117817 A1* | 5/2013 | Gantman | ............... | H04L 67/02 726/4 |
| 2014/0189839 A1* | 7/2014 | Jezek | ............... | H04L 63/0815 726/8 |
| 2015/0026027 A1* | 1/2015 | Priess | ............... | G06Q 40/00 705/35 |
| 2015/0058493 A1* | 2/2015 | Adams | ............... | H04L 63/1475 709/228 |
| 2015/0089569 A1* | 3/2015 | Sondhi | ............... | H04L 63/08 726/1 |
| 2016/0065565 A1* | 3/2016 | Plotnik | ............... | G06F 21/335 726/10 |
| 2016/0255067 A1* | 9/2016 | Keromytis | .......... | H04L 63/0807 726/7 |
| 2018/0004765 A1* | 1/2018 | Holloway | ........... | H04L 63/1416 |

\* cited by examiner

| No. | Time | Source | Destination | Protocol | Length | Info |
|---|---|---|---|---|---|---|
| 179 | 191.477276 | 10.0.67.60 | 10.0.67.14 | KRB5 | 299 | AS-REQ |
| 180 | 131.490040 | 10.0.67.14 | 10.0.67.60 | KRB5 | 275 | KRB Error: KRB5KDC_ERR_PREAUTH_REQUIRED |
| 187 | 191.491055 | 10.0.67.60 | 10.0.67.14 | KRB5 | 379 | AS-REQ |
| 189 | 191.492861 | 10.0.67.14 | 10.0.67.60 | KRB5 | 165 | AS-REP |
| 197 | 191.510628 | 10.0.67.60 | 10.0.67.14 | KRB5 | 1667 | TGS-REQ |
| 200 | 191.516608 | 10.0.67.14 | 10.0.67.60 | KRB5 | 224 | TGS-REP |
| 205 | 191.559671 | 10.0.67.60 | 10.0.67.101 | SMB2 | 1864 | Session Setup Request |
| 207 | 191.561824 | 10.0.67.101 | 10.0.67.60 | SMB2 | 314 | Session Setup Response |

```
⊞padata-type: kRB5-PAOATA-TGS-REQ (1)
  ⊞padata-value: 6e8204fa308204f6a003020105a10302010ea20703050000...
    ⊟ap-req
       pvno: 5
       msg-type: krb-ap-req (14)
       Padding: 0
    ⊞ap-options: 00000000
    ⊟ticket
       tkt-vno: 5
       realm: GUESTRESEARCH.COM
       ⊟sname
          name-type: kRB5-NT-SRV-INST (2)
          ⊟name-string: 2 iteas
             Kerberosstring: krbtgt
             KerberosString: GUESTRESEARCH.COM
       ⊟enc-part
          etype: eTYPE-AES256-CTS-HMAC-SHAI-96 (18)
          kvno: 4
          cipher: f9c158cb600ccb036052d9f5798eef4e7fc42db383dbe588...
    ⊞authenticator
⊟req-body
    Padding: 0
    ⊞kdc-options: 40810000 (forwardable, renewable, canonicalize)
       real: GUESTRESEARCH.COM
    ⊟sname
       name-type: kRB5-NT-SRV-INST (2)
       ⊟name-string: 2 items
          KerberosString: cifs
          KerberosString: win2008r2-1.guestresearch.com
       till: 2037-09-13 02:48:05 (UTC)
       nonce: 176917887
    ⊞etype: 5 items
```

FIGURE 5B

| No. | Time | Source | Destination | Protocol | Length | Info |
|---|---|---|---|---|---|---|
| 179 | 191.477276 | 10.0.67.60 | 10.0.67.14 | KRB5 | 299 | AS-REQ |
| 180 | 131.490040 | 10.0.67.14 | 10.0.67.60 | KRB5 | 275 | KRB Error: KRB5KDC_ERR_PREAUTH_REQUIRED |
| 187 | 191.491055 | 10.0.67.60 | 10.0.67.14 | KRB5 | 379 | AS-REQ |
| 189 | 191.492861 | 10.0.67.14 | 10.0.67.60 | KRB5 | 165 | AS-REP |
| 197 | 191.510628 | 10.0.67.60 | 10.0.67.14 | KRB5 | 1667 | TGS-REQ |
| 200 | 191.516608 | 10.0.67.14 | 10.0.67.60 | KRB5 | 224 | TGS-REP |
| 205 | 191.559671 | 10.0.67.60 | 10.0.67.101 | SMB2 | 1864 | Session Setup Request |
| 207 | 191.561824 | 10.0.67.101 | 10.0.67.60 | SMB2 | 314 | Session Setup Response |

⊞ Ethernet II, Src: vmware_4l:ba:77 (00:0c:29:41:ba:77), Dst: vmware_fc:lL:12:d6 (00:0C:29:fc:12:d6)
⊞ Internet Protocol version 4, Src: 10.0.67.14 (10.0.67.14), Dst: 10.0.67.60 (10.0.67.60)
⊞ Transmission control Protocol, Src Port: 88 (88), Dst Port: 49248 (49248), seq: 1461, Ack: 326, Len: 111
⊞ [2 Reassembled TCP segments (1571 bytes): #188(1460), #189(111)]
⊟ Kerberos
  ⊞ Record Mark: 1567 bytes
  ⊟ as-rep
    pvno: 5
    msg-type: krb-as-rep (11)
    ⊟ padata: 1 item
      ⊟ PA-OATA PA-ENCTYPE-INFO2
        ⊟ padata-type : kRB5-PAOATA-ETYPE-INFO2 (19)
          ⊟ padata-value: 30233021a003020112a11a1b18475545535345245534541 52 ...
          ⊞ ETYPE-INFO2-ENTRY
    crealm: GUESTRESEARCH.COM
    ⊟ cname
      name-type: kRB5-NT-PRINCIPAL (1)
      ⊟ name-string: 1 item
        KerberosString: caadmin
    ⊟ ticket
      tkt-vno: 5
      realm: GUESTRESEARCH.COM
      ⊟ sname
        name-type: kRB5-NT-SRV-INST (2)
        ⊟ name-string: 2 items
          KerberosString: krbtgt
          KerberosString: GUESTRESEARCH.COM
      ⊟ enc-part
        etype: eTYPE-AES256-CTS-HMAC-SHAI-96 (18)
        kypo: 4
        cipher: f9c1S8cb600ccb0360S2d9f5798eef4e7fc42db383dbeS88 ...

FIGURE 6B

| No. | Time | Source | Destination | Protocol | Length | Info |
|---|---|---|---|---|---|---|
| 96 | 17:18:31.549633000 | 10.0.67.1 | 10.0.67.14 | KRB5 | 299 | AS-REQ |
| 97 | 17:18:31.558120000 | 10.0.67.14 | 10.0.67.1 | KRB5 | 275 | KRB Error: KRB5KDC_ERR_PREAUTH_REQUIRED |
| 105 | 17:18:31.568310000 | 10.0.67.1 | 10.0.67.14 | KRB5 | 379 | AS-REQ |
| 107 | 17:18:31.569527000 | 10.0.67.14 | 10.0.67.1 | KRB5 | 165 | AS-REP |
| 115 | 17:18:31.570263000 | 10.0.67.1 | 10.0.67.14 | KRB5 | 1648 | TGS-REQ |
| 118 | 17:18:31.571662000 | 10.0.67.14 | 10.0.67.1 | KRB5 | 182 | TGS-REP |
| 123 | 17:18:31.572090000 | 10.0.67.1 | 10.0.67.60 | SMB2 | 1646 | Session Setup Request |
| 125 | 17:18:31.573126000 | 10.0.67.60 | 10.0.67.1 | SMB2 | 315 | Session Setup Response |

⊞ Frame 118: 182 bytes on wire (1456 bits), 182 bytes captured (1456 bits) on interface 0
⊞ Ethernet II, Src: vmware_41:ba:77 (00:0c:29:41:ba:77), Dst: vmware_05:67:0d (00:0c:29:05:67:0d)
⊞ Internet Protocol version 4, Src: 10.0.67.14 (10.0.67.14), Dst: 10.0.67.1 (10.0.67.1)
⊞ Transmission Control Protocol, src Port: 88 (88), Dst Port: 50894 (50894), Seq: 1461, Ack: 1595, Len: 128
⊞ [2 Reassembled TCP segments (1588 bytes): #117(1460), #118(128)]
⊟ Kerberos
    ⊞ Record Mark: 1584 bytes
    ⊟ tgs-rep
        pvno: 5
        msg-type: krb-tgs-rep (13)
        crealm: GUESTRESEARCH.COM
        ⊟ cname
            name-type: kRB5-NT-PRINCIPAL (1)
            ⊟ name-string: 1 item
                Kerberosstring: caadmin
        ⊟ ticket
            tkt-vno: 5
            realm: GUESTRESEARCH.COM
            ⊟ sname
                name-type: kRB5-NT-SRV-INST (2)
                ⊟ name-string: 2 items
                    KerberosString: cifs
                    KerberosString: computer2
            ⊟ enc-part
                etype: eTYPE-AES256-CTS-HMAC-SHA1-96 (18)
                kypo: 10
                cipher: 8804C0C073T7279ab2ffd166ec7eba865df6819649908080 . . .
        ⊟ enc-part
            etype: ETYPE-AES246-CTS-HMAC-SHA1-96 (18)

FIGURE 7B

```
Kerberos
⊟ Record Mark: 292 bytes
     0... .... .... .... .... .... .... = Reserved : Not set
     .000 0000 0000 0000 0000 0001 0010 0100 = Record Length: 292
⊟ as-req
   pvno: 5
   msg-type: krb-as-req (10)
   ⊟ padata: 2 items
      ⊟ PA-OATA PA-ENC-TIMESTAMP
         ⊟ padata-type: kRBS-PAOATA-ENC-TIMEST~P (2)
             padata-value: 303da003020117a23604347ec9fb64bSSdf7d9aceb6e19cl...
             etype: eTYPE-ARCFOUR-HMAC-MOS (23)
             cipher: 7ec9fb64bSSdf7d9aceb6e19c17119833d973b3833953655...
      ⊟ PA-OATA PA-PAC-REQUEST
         ⊟ padata-type: kRB5-PAOATA-PA-PAC-REQUEST (128)
             ⊟ padata-value: 3005a003010100
                 include-pac: False
   ⊟ req-body
```

FIGURE 8B

| No. | Time | Source | Destination | Protocol | Length | Info |
|---|---|---|---|---|---|---|
| 96 | 17:18:31.549633000 | 10.0.67.1 | 10.0.67.14 | KRB5 | 299 | AS-REQ |
| 97 | 17:18:31.558120000 | 10.0.67.14 | 10.0.67.1 | KRB5 | 275 | KRB Error: KRB5KDC_ERR_PREAUTH_REQUIRED |
| 105 | 17:18:31.568310000 | 10.0.67.1 | 10.0.67.14 | KRB5 | 379 | AS-REQ |
| 107 | 17:18:31.569527000 | 10.0.67.14 | 10.0.67.1 | KRB5 | 165 | AS-REP |
| 115 | 17:18:31.570263000 | 10.0.67.1 | 10.0.67.14 | KRB5 | 1648 | TGS-REQ |
| 118 | 17:18:31.571662000 | 10.0.67.14 | 10.0.67.1 | KRB5 | 182 | TGS-REP |
| 123 | 17:18:31.572090000 | 10.0.67.1 | 10.0.67.60 | SMB2 | 1845 | Session Setup Request |
| 125 | 17:18:31.573126000 | 10.0.67.60 | 10.0.67.1 | SMB2 | 315 | Session Setup Response |

⊞ Frame 118: 182 bytes on wire (1456 bits), 182 bytes captured (1456 bits) on interface 0
⊞ Ethernet II, Src: vmware_41:ba:77 (00:0c:29:41:ba:77), Dst: vmware_05:67:0d (00:0c:29:05:67:0d)
⊞ Internet Protocol version 4, Src: 10.0.67.14 (10.0.67.14), Dst: 10.0.67.1 (10.0.67.1)
⊞ Transmission Control Protocol, src Port: 88 (88), Dst Port: 50894 (50894), Seq: 1461, Ack: 1595, Len: 128
⊞ [2 Reassembled TCP segments (1588 bytes): #117(1460), #118(128)]
⊟ Kerberos
  ⊞ Record Mark: 1584 bytes
  ⊟ tgs-rep
    pvno: 5
    msg-type: krb-tgs-rep (13)
    crealm: GUESTRESEARCH.COM
    ⊟ cname
      name-type: kRB5-NT-PRINCIPAL (1)
      ⊟ name-string: 1 item
        Kerberosstring: caadmin
    ⊟ ticket
      tkt-vno: 5
      realm: GUESTRESEARCH.COM
      ⊟ sname
        name-type: kRB5-NT-SRV-INST (2)
        ⊟ name-string: 2 items
          KerberosString: cifs
          KerberosString: computer2
      ⊟ enc-part
        etype: eTYPE-AES256-CTS-HMAC-SHA1-96 (18)
        kypo: 10
        cipher: 8804C0C073T7279ab2ffd166ec7eba865df6819649908080 . . .
    ⊟ enc-part
      etype: ETYPE-AES246-CTS-HMAC-SHA1-96 (18)

FIGURE 9B

| No. | Time | Source | Destination | Protocol | Length | Info |
|---|---|---|---|---|---|---|
| 132 | 11:15:58.744210000 | 10.0.67.60 | 10.0.67.14 | KRB5 | 297 | AS-REQ |
| 133 | 11:15:58.757622000 | 10.0.67.14 | 10.0.67.60 | KRB5 | 273 | KRB Error: KRB5KDC_ERR_PREAUTH_REQUIRED |
| 140 | 11:15:58.758317000 | 10.0.67.60 | 10.0.67.14 | KRB5 | 377 | AS-REQ |
| 142 | 11:15:58.797165000 | 10.0.67.14 | 10.0.67.60 | KRB5 | 135 | AS-REP |
| 150 | 11:15:58.798115000 | 10.0.67.60 | 10.0.67.14 | KRB5 | 1640 | TGS-REQ |
| 153 | 11:15:58.818167000 | 10.0.67.14 | 10.0.67.60 | KRB5 | 196 | TGS-REP |
| 158 | 11:15:58.818658000 | 10.0.67.60 | 10.0.67.101 | SMB2 | 1837 | Session Setup Request |
| 162 | 11:15:58.871286000 | 10.0.67.101 | 10.0.67.60 | SMB2 | 315 | Session Setup Response |

⊞Frame 140: 377 bytes on wire (3016 bits), 377 bytes captured (3016 bits) on interface 0
⊞Ethernet II, Src: vmware_fc:12:d6 (00:0c:29:fc:12:d6), Dst: vmware_41:ba:77 (00:0c:29:41:ba:77)
⊞Internet Protocol version 4, Src: 10.0.67.60 (10.0.67.60), Dst: 10.0.67.14 (10.0.67.14)
⊞Transmission Control Protocol, Src Port: 50707 (50707), Dst Port: 88 (88), Seq: 1, Ack: 1, Len: 323
⊟Kerberos
  ⊞Record Mark: 319 bytes
  ⊟as-req
    pvno: 5
    msg-type: krb-as-req (10)
    ⊞padata: 2 times
    ⊟req-body
      Padding: 0
      ⊞kdc-options: 40810010 (forwardable, renewable, cononicalize, renewable-ok)
      ⊞cname
      realm: GUESTRESEARCH.COM
      ⊞sname
      till: 2037-09-13 02:48:05 (UTC)
      rtime: 2037-09-13 02:48:05 (UTC)
      nonce: 745589763
      ⊟etype: 7 times
        ENCTYPE: eTYPE-AES256-CTS-HMAC-SHA1-96 (18)
        ENCTYPE: eTYPE-AES256-CTS-HMAC-SHA1-96 (17)
        ENCTYPE: eTYPE-ARCFOUR-HMAC-MD5 (23)
        ENCTYPE: eTYPE-ARCFOUR-HMAC-OLD (-133)
        ENCTYPE: eTYPE-ARCFOUR-MD4 (-128)
        ENCTYPE: eTYPE-ARCFOUR-HMAC-MD5-56 (24)
        ENCTYPE: eTYPE-ARCFOUR-HMAC-OLD-EXP (-135)
      ⊞address: 1 item COMPUTER2<20>

FIGURE 10B

| enctype |
|---|
| des-cbc-crc |
| des-cbc-md4 |
| des-cbc-md5 |
| des3-cbc-sha1 |
| arcfour-hmac |
| arcfour-hmac-exp |
| aes128-cts-hmac-sha1-96 |
| aes256-cts-hmac-sha1-96 |
| camellia128-cts-cmac |
| camellia256-cts-cmac |

▽ IF_RELEVANT AD-Win-2k-PAC
　Type:　AD-Win2k-PAC (128)
　▽ Data:　05000000000000000100000b00100005800000000000000...
　　Num Entries: 5
　　Version: 0
　△ Type: Logon Info (1)
　△ Type: Client Info Type (10)
　△ Type: UPN DNS Info (12)
　▽ Type: Server Checksum (6)
　　Size: 20
　　Offset: 608
　　△ PAC_SERVER_CHECKSUM: 76ffffff8caf7c2d8866ed805fe6b0d498eb1bf9 ← 2002
　▽ Type: Privsvr Checksum (7) ← 2004
　　Size: 20
　　Offset: 632
　　△ PAC_PRIVSVR_CHECKSUM: 76ffffff93284bbc94abefbc28b97da09d44670

FIGURE 20A

▶ AuthorizationData item
  ad-type: AD-WIN2k-PAC (128)
  ▶ ad-data: 050000000000000001000000020020000058000000000000... 2006
    Num Entries: 5
    Version: 0
    ▶ Type: Logon Info (1)
      Size: 544
      Offset: 88
      ▶ PAC_LOGON_IFNO: 01100800cccccccc1002000000000000020023400358...
    ▶ Type: Client Info Type (10)
      Size: 36
      Offset: 632
      ▶ PAC_CLIENT_INFO_TYPE: 0014076c059bd1011a004100640064006d0069006e0069007300...
    ▶ Type: UPN DNS Info (12)
      Size: 96
      Offset: 672
      ▶ UPN_DNS_INFO: 34001000180048000100000000000000410064006d006900...
    ▼ Type: Server Checksum (6)
      Size: 16
      Offset: 768
      ▶ PAC_SERVER_CHECKSUM: 1000000072406b9aac282bc6ab8b4699
        Type: 16
        Signature: (72406b9aac282bc6ab8b4699) ← 2008
    ▼ Type: Privsvr Checksum (7)
      Size: 20
      Offset: 784
      ▶ PAC_PRIVSVR_CHECKSUM: 76ffffff89135af66fe9deacc3dac21f6736d10f
        Type: -138
        Signature: (89135af66fe9deacc3dac21f6736d10f) ← 2010

FIGURE 20B

SYSTEMS AND METHODS FOR DETECTING AND REACTING TO MALICIOUS ACTIVITY IN COMPUTER NETWORKS

PRIORITY

This application claims priority to U.S. Provisional Application No. 62/158,135, filed May 7, 2015 and titled "Detecting Attacks in Computer Networks"; 62/234,112, filed Sep. 29, 2015 and titled "Reaction to Suspicious Activity in Computer Networks"; and 62/247,270 filed Oct. 28, 2015 and titled "Systems and Methods for Detection of Malicious Activity"; the disclosures of which are hereby each incorporated by reference.

BACKGROUND

Computer networks are increasingly under attack from malicious actors, including both actors with legitimate access to networks, and actors without such access. These targeted attacks may involve the malicious actor establishing a foothold in the network, conducting reconnaissance, moving laterally within the network, acting on targets and assets within the network, exfiltrating data, and more. Organizations may invest significant resources attempting to detect and mitigate attacks. Such detection or mitigation may focus on the network traffic, attempting to discern potentially malicious activity from normal, permissible activity. Activity may be considered potentially malicious, rather than actually malicious, in order to, for instance, avoid so-called "false positive" detection of malicious activity.

Network accounts may be entities for which authentication and authorization policies and processes have been configured within the computer network. In some cases, malicious actors may rely on compromised network accounts to engage in malicious activity. Network accounts may be compromised in various ways, including, for example, by credential hijacking (e.g., through keylogging or memory scraping), creation of new credentials by malicious actors, and account impersonation. Additionally, some malicious actors may attempt to circumvent proper authentication protocols within the computer networks. Some authentication protocols may operate using, for example, security access tickets, which allow parties communicating over a non-secure computer network to authenticate their identity to one another in a secure manner. Examples of authentication protocols include, for instance, the Kerberos protocol, Single Sign-On, Simple and Protected GSSAPI Negotiation Mechanism, S/Key, Secure Remote Password protocol, Host Identity Protocol, etc., which may operate in Windows® networks or other types of networks.

Thus, there is a need for detection of potentially malicious activity in computer networks. This potentially malicious activity may relate to authentication protocols within the network and/or to any other activity that can be abused or exploited by malicious actors. There is a further need for mitigation and/or remediation controls in computer networks. Such mitigation and/or remediation controls may respond to detected potentially malicious activity in order to, for example, prevent or minimize harm to an organization and/or computer network.

SUMMARY

The disclosed embodiments describe systems and methods for detecting and remedying malicious activity in computer networks.

In some embodiments, a non-transitory computer readable medium may include instructions that, when executed by at least one processor, cause the at least one processor to perform detection operations on secure ticket data to detect potentially malicious activity. The operations may include obtaining encrypted data from an encrypted portion of a secure ticket, the obtained encrypted data having been communicated over a network; obtaining a decryption key corresponding to the encrypted data; decrypting the encrypted data using the obtained decryption key to generate decrypted data elements; comparing the decrypted data elements to at least one of known valid data elements and known invalid data elements; and generating an assessment based on the comparison, the assessment identifying whether the secure ticket is indicative of potentially malicious activity in the network.

In other embodiments, a network system may be configured for performing detection operations on secure ticket data to detect potentially malicious activity. The network system may comprise at least one computer-readable memory storing instructions and at least one processor configured to execute the instructions to obtain encrypted data from an encrypted portion of a secure ticket, the obtained encrypted data having been communicated over a network; obtain a decryption key corresponding to the encrypted data; decrypt the encrypted data using the obtained decryption key to generate decrypted data elements; compare the decrypted data elements to at least one of known valid data elements and known invalid data elements; and generate an assessment based on the comparison, the assessment identifying whether the secure ticket is indicative of potentially malicious activity in the network.

In further embodiments, a computer-implemented method may perform detection operations on secure ticket data to detect potentially malicious activity. The method may comprise obtaining encrypted data from an encrypted portion of a secure ticket, the obtained encrypted data having been communicated over a network; obtaining a decryption key corresponding to the encrypted data; decrypting the encrypted data using the obtained decryption key to generate decrypted data elements; comparing the decrypted data elements to at least one of known valid data elements and known invalid data elements; and generating an assessment based on the comparison, the assessment identifying whether the secure ticket is indicative of potentially malicious activity in the network.

In some embodiments, a non-transitory computer readable medium may include instructions that, when executed by at least one processor, cause the at least one processor to perform operations for detecting potentially malicious activity. The operations may comprise receiving data associated with a plurality of authentication messages, wherein at least some of the received data includes secure ticket data, the authentication messages having been communicated over a network; analyzing the received data associated with the plurality of authentication messages; determining, based on the analyzing, a plurality of characteristics of the data associated with the authentication messages, wherein a characteristic from the plurality of characteristics includes the secure ticket data; receiving data associated with a new authentication message communicated over the network; determining a plurality of characteristics of the data associated with the new authentication message; comparing at least one determined characteristic of the new authentication message data with at least one of: a determined characteristic of the plurality of authentication messages data, known valid data, and known invalid data; and generating, based on the comparison, an assessment of whether the new authentication message is indicative of the potentially malicious activity in the network.

In other embodiments, a network system may be configured for detecting potentially malicious activity. The network system may comprise at least one computer-readable memory storing instructions at least one processor configured to execute the instructions to receive data associated with a plurality of authentication messages, wherein at least some of the received data includes secure ticket data, the authentication messages having been communicated over a network; analyze the received data associated with the plurality of authentication messages; determine, based on the analysis, a plurality of characteristics of the data associated with the authentication messages, wherein a characteristic from the plurality of characteristics includes the secure ticket data; receive data associated with a new authentication message communicated over the network; determine a plurality of characteristics of the data associated with the new authentication message; compare at least one determined characteristic of the new authentication message data with at least one of: a determined characteristic of the plurality of authentication messages data, known valid data, and known invalid data; and generate, based on the comparison, an assessment of whether the new authentication message is indicative of the potentially malicious activity in the network.

In further embodiments, a computer-implemented method may perform potentially malicious activity detection operations. The method may comprise receiving data associated with a plurality of authentication messages, wherein at least some of the received data includes secure ticket data, the authentication messages having been communicated over a network; analyzing the received data associated with the plurality of authentication messages; determining, based on the analyzing, a plurality of characteristics of the data associated with the authentication messages, wherein a characteristic from the plurality of characteristics includes the secure ticket data; receiving data associated with a new authentication message communicated over the network; determining a plurality of characteristics of the data associated with the new authentication message; comparing at least one determined characteristic of the new authentication message data with at least one of: a determined characteristic of the plurality of authentication messages data, known valid data, and known invalid data; and generating, based on the comparison, an assessment of whether the new authentication message is indicative of the potentially malicious activity in the network.

In some embodiments, a non-transitory computer readable medium may include instructions that, when executed by at least one processor, cause the at least one processor to perform operations responsive to potentially malicious activity. The operations may comprise receiving an indication of the potentially malicious activity in a computer network; identifying, based on data included in the indication, at least one network account associated with the potentially malicious activity; determining, based on the identifying and further based on the data included in the indication and according to a defined policy, at least one responsive operation with respect to the at least one identified network account; and invoking, based on the determining, the at least one responsive operation, the at least one responsive operation being implemented to mitigate the potentially malicious activity in the computer network.

In other embodiments, a network system may be configured for cyber-attack remediation operations. The network system may comprise at least one computer-readable memory storing instructions and at least one processor configured to execute the instructions to receive an indication of the potentially malicious activity in a computer network; identify, based on data included in the indication, at least one network account associated with the potentially malicious activity; determine, based on the identifying and further based on the data included in the indication and according to a defined policy, at least one responsive operation with respect to the at least one identified network account; and invoke, based on the determining, the at least one responsive operation, the at least one responsive operation being implemented to mitigate the potentially malicious activity in the computer network.

In further embodiments, a computer-implemented method may perform operations responsive to potentially malicious activity. The method may comprise receiving an indication of the potentially malicious activity in a computer network; identifying, based on data included in the indication, at least one network account associated with the potentially malicious activity; determining, based on the identifying and further based on the data included in the indication and according to a defined policy, at least one responsive operation with respect to the at least one identified network account; and invoking, based on the determining, the at least one responsive operation, the at least one responsive operation being implemented to mitigate the potentially malicious activity in the computer network.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 5A-5B illustrate an example method, and corresponding captured data, for detecting a Golden Ticket Attack, in accordance with disclosed embodiments;

FIGS. 6A-6B illustrate an example method, and corresponding captured data, for detecting a Pass-the-Ticket Attack that uses a TGT, in accordance with disclosed embodiments;

FIGS. 7A-7B illustrate an example method, and corresponding captured data, for detecting a Pass-the-Ticket Attack that uses an ST, in accordance with disclosed embodiments;

FIGS. 8A-8B illustrate an example method, and corresponding captured data, for detecting a PAC Attack, in accordance with disclosed embodiments;

FIGS. 9A-9B illustrate an example method, and corresponding captured data, for detecting a Silver Ticket Attack, in accordance with disclosed embodiments;

FIGS. 10A-10B illustrate an example method, and corresponding captured data, for detecting an Overpass-the-Hash Attack, in accordance with disclosed embodiments;

FIG. 14 is a table of example decryption schemes, in accordance with disclosed embodiments;

FIGS. 20A-20B illustrate example decrypted tickets for use in an authentication protocol, in accordance with disclosed embodiments.

DETAILED DESCRIPTION

Reference will now be made in detail to the disclosed embodiments, examples of which are illustrated in the accompanying drawings.

Figure 1:
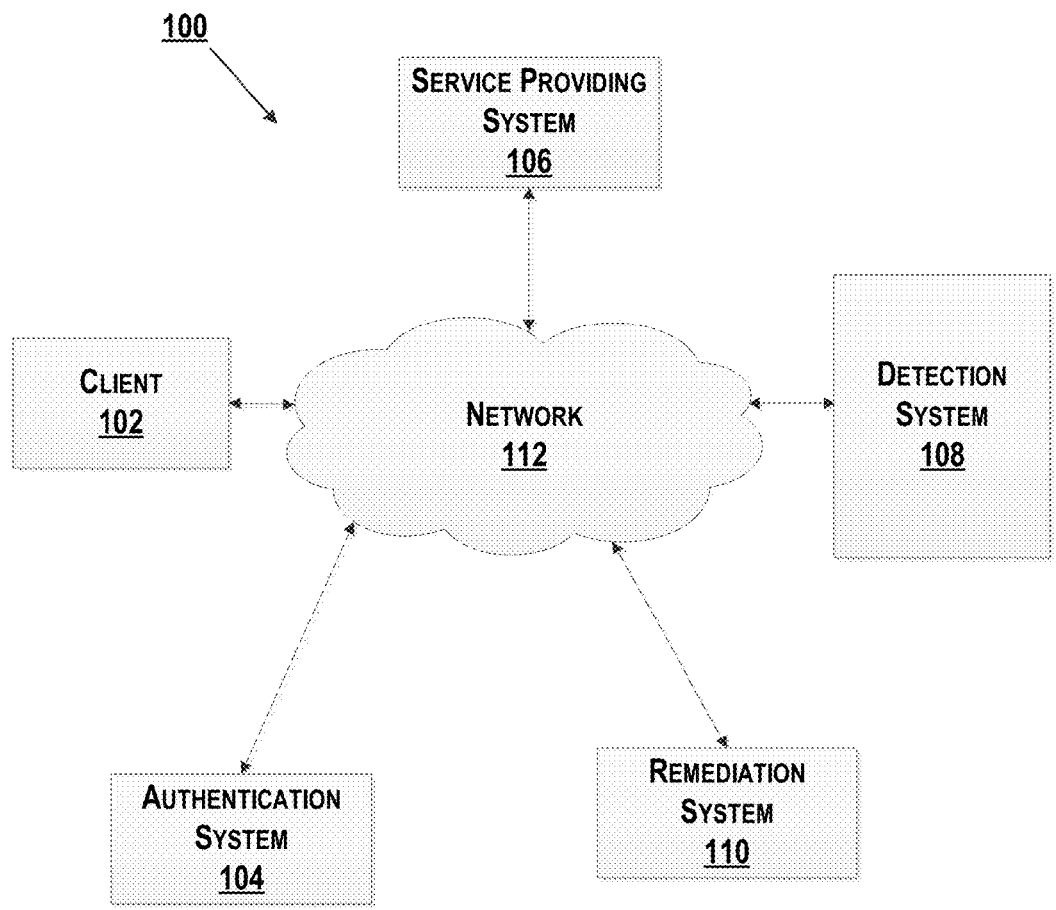
FIG. 1 is a block diagram of an example computer network system, in accordance with disclosed embodiments.

FIG. 1 is a block diagram of an example computer network system 100, in accordance with disclosed embodiments. As shown, computer network 100 includes client 102, authentication system 104, service providing system 106, detection system 108, and remediation system 110, all of which are communicatively coupled by network 112.

Client 102 and service providing system 106 may each take the form of any of a network node, a web server, a data storage device, a mobile device, a smartphone, a tablet computer, a desktop computer, a notebook computer, a wearable computer, a watch computer, a glasses computer, and/or a computer at a kiosk, etc. Other clients and service providing systems, including any computing device, are possible as well.

Authentication system 104 may be any computing device configured to facilitate operation of an authentication protocol within network 112. Authentication system 104 may be configured to generate and/or exchange authentication messages with client 102 and service providing system 106.

An example computer network authentication protocol is Kerberos. Kerberos authentication typically employs three parties: a client, a target service (also sometimes referred to as a "principal" in Kerberos documentation), and a third-party, the Kerberos system, that enables the target service and, optionally the client, to authenticate each other. Other examples of authentication protocols include Single Sign-On, Simple and Protected GSSAPI Negotiation Mechanism, S/Key, Secure Remote Password protocol, Host Identity Protocol, etc. In some embodiments, client 102 may serve as a client, service providing system 106 may serve as a target service, and authentication system 104 may serve as a Kerberos (or other authentication) system.

In embodiments where the authentication system 104 follows the Kerberos protocol, a Kerberos system may combine the functionalities of an Authentication Service (AS), a Key Distribution Center (KDC), and a Ticket-Granting Service (TGS).

Authentication using the Kerberos protocol may involve three steps: an AS Exchange step, a TGS Exchange step, and a Client-Server (CS) Exchange step.

During the AS Exchange step, the client authenticates itself to the AS in the Kerberos system (e.g., authentication system 104) by providing credentials to the AS. The client may authenticate itself using, for example, a KRB_AS_REQ message. Also during the AS Exchange step, the AS may forward the credentials to the KDC, and the KDC may issue a Ticket Granting Ticket (TGT) to the client. The KDC may issue the TGT using, for example, a KRB_AS_REP message. The KRB_AS_REP message may include the TGT.

At the TGS Exchange step, the client may request from the KDC a service ticket (ST) for a specific target service. The client may authenticate itself to TGS using the TGT. The client may authenticate itself using, for example, a KRB_TGS_REQ message. The KRB_TGS_REQ message may include the TGT. Also at the TGS Exchange step, the client may receive the requested ST from the TGS. The TGS may issue the ST using, for example, a KRB_TGS_REP message.

During the CS Exchange step, the client may provide the ST to the target service, which in turn may provide access to the client. The client may provide the ST to the target service using, for example, a KRB_AP_REQ message. The KRB_AP_REQ message may include the ST. In some cases, the target service may authenticate itself to the client using, for example, a KRB_AP_REP message.

While the foregoing provides an example of a computer network system 100 operating according to the Kerberos protocol, it will be understood that the computer network system 100 may be configured to operate according to other authentication protocols as well, as described above.

Detection system 108 may be configured to detect potentially malicious activity in computer network system 100. In some embodiments, for example, detection system 108 may be configured to detect whether an authentication message generated and/or exchanged in computer network system 100 is indicative of potentially malicious activity in network 112. Potentially malicious activity, as referred to herein, may include, for example, any activity that indicates, suggests, or makes possible an attack, a potential attack, or any other actual or potentially illegitimate activity in the computer network. Potentially malicious activity is not limited to activity that is actually illegitimate; rather, activity, say in the form of suspicious activity or anomalous activity, that merely suggests a likelihood of illegitimate activity, may be potentially malicious activity as well. Moreover, malicious activity is not limited to activity characterized as an attack; rather, any illegitimate activity in the computer network may be included.

Detection system 108 may be configured to collect authentication messages generated and/or exchanged in computer network system 100 and extract data from the authentication messages. Detection system 108 may collect authentication messages in many ways. In some embodiments, for example, detection system 108 may monitor traffic in and/or out of authentication system 104; traffic in and/or out of client 102; traffic in and/or out of service providing system 106, and logs provided by any of client 102, authentication system 104, and service providing system 106. In some embodiments, detection system 108 may collect authentication messages by monitoring one or more of client 102, authentication system 104, and service providing system 106. Alternatively or additionally, detection system 108 may collect authentication messages using sensors or sniffers distributed in network 112. Detection system 108 may collect authentication messages in other manners as well.

Detection system 108 may be further configured to detect anomalous activity by analyzing the messages communicated in network 112, as described in more detail below. Detection system 108 may be centralized, as shown in FIG. 1, or may be distributed within network 112. Example detection systems are further described below in connection with FIGS. 11, 13, and 15.

As noted above, an example computer network authentication protocol is Kerberos, which typically employs three parties: a client, a target service, and a Kerberos system. In some embodiments, potentially malicious activity detected in a computer network system operating according the Kerberos protocol, and/or other protocols, may include, for example, the Golden Ticket Attack, the Silver Ticket Attack, the MS14-068 Exploitation Attack (sometimes referred to as the Privilege Attribute Certificate (PAC) Attack), the Pass-the-Ticket Attack, which can be implemented for both TGTs and STs, and the Overpass-the-Hash Attack. Each of these attacks is described in detail below. Other malicious activity is possible as well.

Although some embodiments described herein are directed to detecting potentially malicious activity in a network operating according to the Kerberos protocol, this description is not intended to be limiting to such networks. In other embodiments, the disclosed systems and methods may be used in networks operating according to authentication protocols other than Kerberos as well, such as authentication protocols that use messaging to request and obtain tickets or tokens, possibly encrypted, for use in authentication and/or accessing of services.

Remediation system 110 may be configured to prevent, mitigate, and/or reverse the potentially malicious activity detected in network 112 by detection system 108. In some embodiments, remediation system 110 may be configured to perform and/or cause to be performed one or more control actions in connection with one or more network accounts. Control actions may be actions taken to prevent, mitigate, and/or reverse the potentially malicious activity. Example remediation systems are described below in connection with FIGS. 16, 17A-17C, and 19.

Network 112 may be any type of network configured to provide communications between components of computer network system 100. For example, network 112 may be any type of network (including infrastructure) that provides communications, exchanges information, and/or facilitates the exchange of information, such as (all or portions of) the Internet or another Wide Area Network, a Local Area Network, a near field communication (NFC) network, an optical code scanner network, or any other suitable connection(s) that enables the sending and receiving of information between the components of system 100. As used herein, sending and receiving are understood to have broad meanings, including sending or receiving in response to a specific request or without such a specific request. These terms thus cover both active forms, and passive forms, of sending and receiving. In other embodiments, one or more components of system 100 may communicate directly through a dedicated communication link(s).

In some embodiments, one or more of computer network 100, client 102, authentication system 104, service providing system 106, detection system 108, remediation system 110, and network 112 may be implemented in whole or in part using cloud-based, on-demand, or other Internet-enabled computing. For instance, the functions of client 102, authentication system 104, service providing system 106, detection system 108, remediation system 110, and/or network 112 may, in some embodiments, be provided as cloud-based, on-demand, or other Internet-enabled services accessible over an Internet connection. In some embodiments, communicative coupling among client 102, authentication system 104, service providing system 106, detection system 108, remediation system 110, and/or network 112 may be via an Internet connection.

Figure 2:
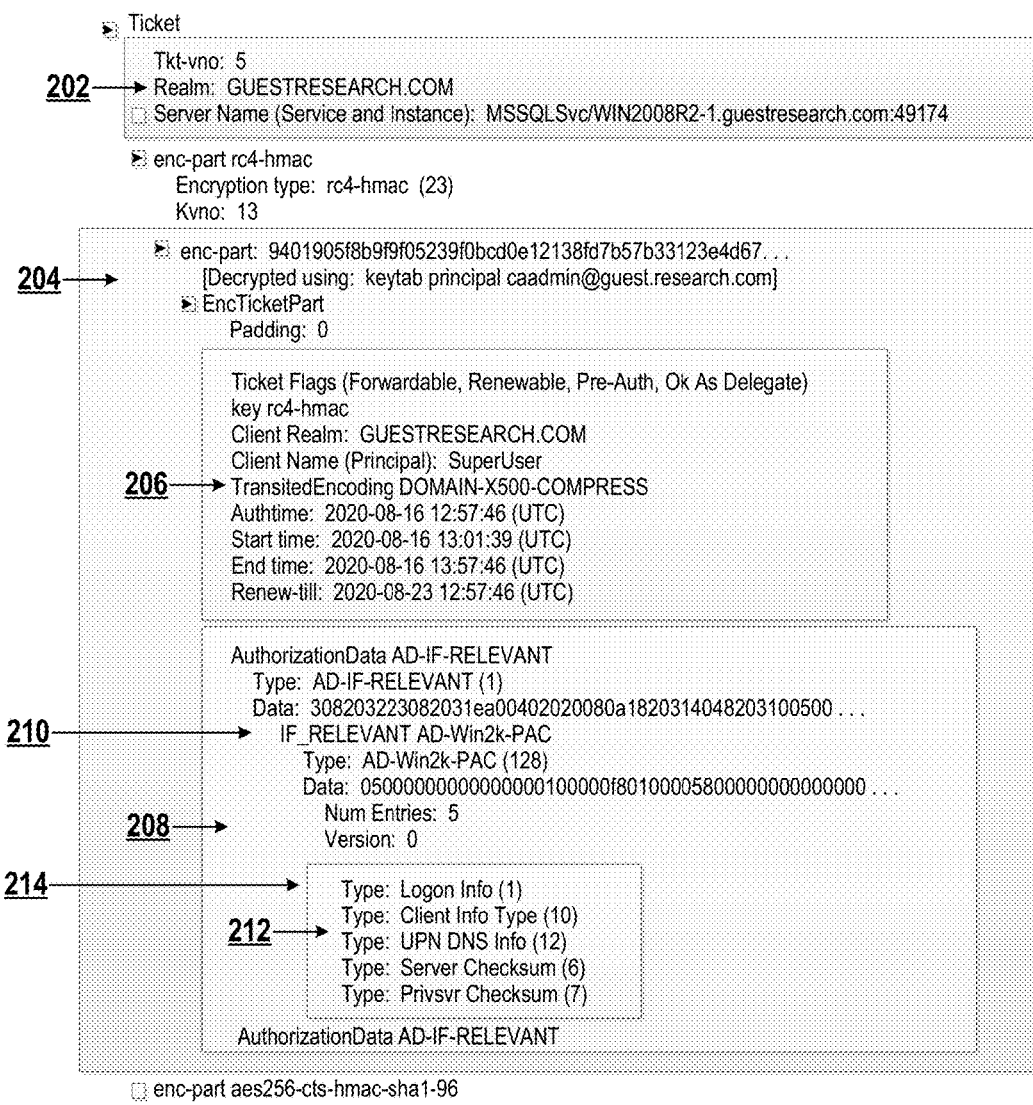
FIG. 2 is an example ticket for use in an authentication protocol, in accordance with disclosed embodiments.

FIG. 2 is an example ticket 200 for use in an authentication protocol, in accordance with disclosed embodiments. In some embodiments, ticket 200 may be, for example, a ticket defined by the Kerberos protocol. Other authentication protocols, including other authentication protocols that use messaging to request and obtain tickets or tokens, possibly encrypted, for use in authentication and/or accessing of services, are possible as well.

As shown, ticket 200 includes both a non-encrypted portion 202 and an encrypted portion 204. Non-encrypted portion 202 may contain, for example, metadata. As shown, encrypted portion 204 includes sub-portion 206, which may include fields containing values defined by the authentication protocol, such as the Kerberos protocol.

As shown, encrypted portion 204 further includes sub-portion 208, which may include authorization data elements. For example, as shown, sub-portion 208 includes authorization data elements AD-IF-RELEVANT. Expanded element 210 of sub-portion 208, as shown, is a PAC (AD-Win2k-PAC), which may specify the ad-type value (as shown, 128). Sub-portion 208 may further include sub-portion 212 which, as shown, includes data buffers inside the PAC. Sub-portion 208 may still further include data buffer 214, as shown.

Malicious activity in a network operating according to the authentication protocol may take the form of, for example, tickets containing forged data. Forged data may appear in any of sub-portions 206, 208, 210, 212, or 214. In some embodiments, for example, ticket 200 may contain a forgery of the PAC within the Logon Info (1) data buffer 214, as shown. Such forged data in tickets may be detected using the systems and/or methods described herein.

Kerberos tickets, like ticket 200, may be transmitted in a network and may be encrypted. Thus it may not be possible to retrieve the actual tickets without knowing the encryption keys, which may solely reside on the participating endpoints. However, it may be possible to observe the tickets in the traffic in their encrypted form as a character string known as an encrypted ticket string (ETS) or "blob."

Due to the structure of Kerberos messaging, it is possible to isolate the ETS within the message stream. In some situations it is also possible to identify data associated with the ticket, such as an internet protocol (IP) address from which the ticket request originated. By comparing the ETS of a new ticket to the ETSs of legitimate tickets it is possible to identify whether the new ticket is a known, legitimate ticket. Additional information may be gathered by analyzing the content of other Kerberos-related communications, such as ticket requests sent to the KDC and KDC responses to these requests. ETSs and other information may be used to detect potentially malicious activity in a computer network (e.g., network 112).

Potentially malicious activity, as referred to herein, may include, for example, any activity that indicates, suggests, or makes possible an attack, a potential attack, or other actual or potentially illegitimate activity in the computer network. Potentially malicious activity is not limited to activity that is actually illegitimate; rather, activity, say in the form of suspicious activity or anomalous activity, that merely suggests a likelihood of illegitimate activity, may be potentially malicious activity as well.

Figure 3:
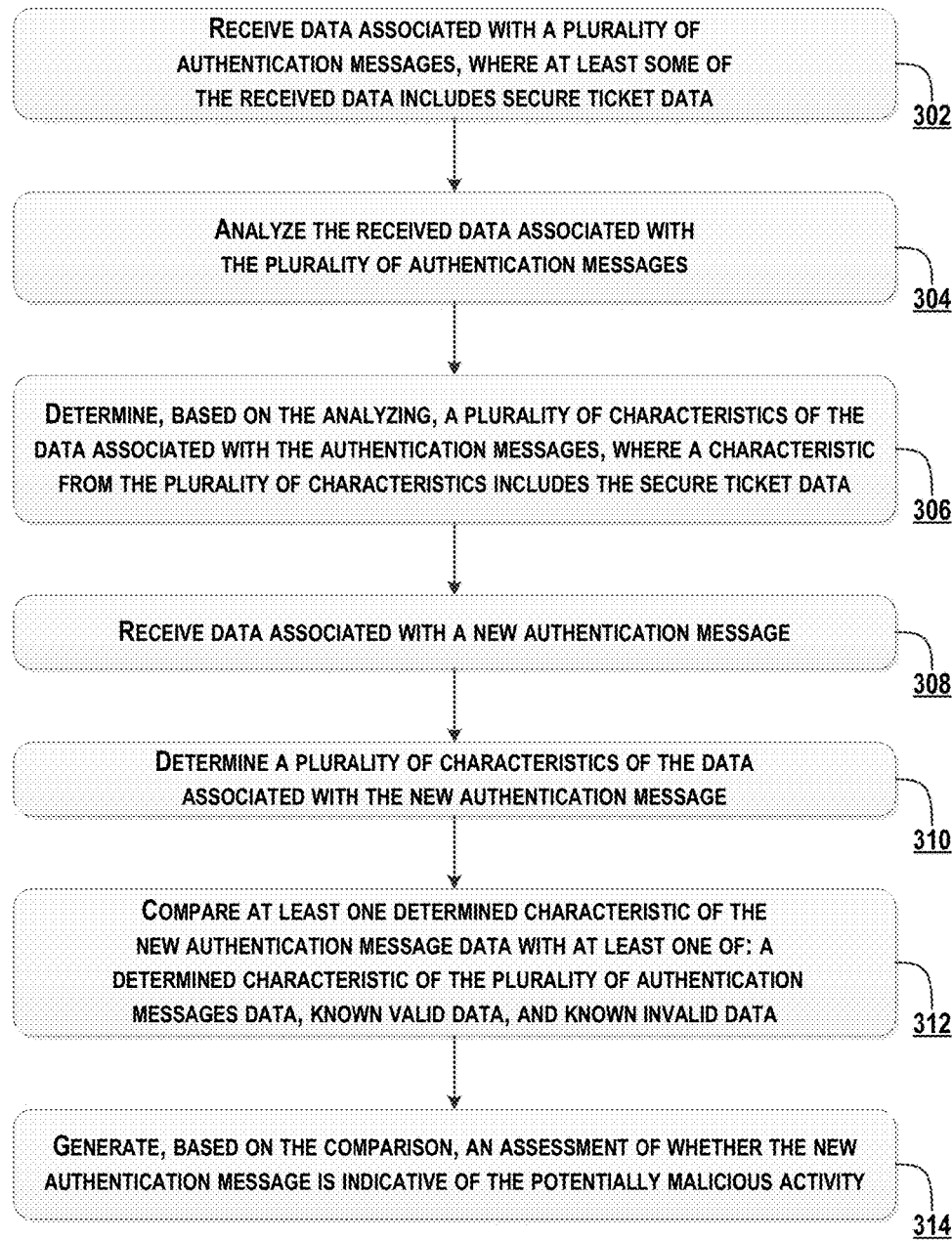
FIG. 3 is a flow chart illustrating an example method for detecting potentially malicious activity in a computer network, in accordance with disclosed embodiments.

FIG. 3 is a flow chart illustrating an example method 300 for detecting potentially malicious activity in a computer network (e.g., network 112), in accordance with disclosed embodiments. In some embodiments, the computer network may operate according to the Kerberos protocol or any number of other authentication protocols that use messaging to request and obtain tickets or tokens, possibly encrypted, for use in authentication and/or accessing of services. Other authentication protocols are possible as well.

As shown, method 300 includes step 302 of receiving data associated with a plurality of authentication messages, where at least some of the received data includes secure ticket data. The authentication messages may, for example, have been communicated over a network.

Authentication messages, also referred to herein as secure tickets, may be any messages exchanged between network entities in an authentication protocol. For example, in a computer network operating according to the Kerberos protocol, authentication messages may include any of KRB_AS_REQ, KRB_AS_REP, KRB_TGS_REQ, KRB_TGS_REP, KRB_AP_REQ, and KRB_AP_REQ messages. Other authentication messages, including those used in other authentication protocols, such as other authentication protocols that use messaging to request and obtain tickets or tokens, possibly encrypted, for use in authentication and/or accessing of services, are possible as well.

Secure ticket data may be data included in an encrypted portion of a secure ticket. For example, in a Kerberos ticket, such as a TGT or an ST, secure ticket data may be data included in an encrypted portion of the Kerberos ticket. As illustrated in FIG. 2, for example, secure ticket data may be data included in the encrypted portion 204 of ticket 200. Tickets or tokens, possible encrypted, for use in authentication and/or accessing of services in any number of other authentication protocols that use messaging to request and obtain tickets or tokens are possible as well.

In some embodiments, the data may be received in real-time. For example, the data from an authentication message may be received before the authentication message is delivered to its recipient. Alternatively or additionally, the authentication message may be obtained from a log or list of messages communicated via the network. The data may be received in other manners as well.

In some embodiments, the received data may, for example, be extracted from the authentication messages. In some embodiments, the received data may be stored in a repository. The received data may, for example, be associated with the authentication message from which the data was extracted. The data may be received in other manners as well.

In embodiments where the Kerberos protocol is used, the authentication messages may take the form of Kerberos messages communicated between clients, a Kerberos system, and target services. The authentication messages may include, for example, TGTs and/or STs issued by the Kerberos system (such as by a KDC of the Kerberos system). As described above, a TGT may enable a client receiving the TGT to request an ST for accessing a target service, and the ST may enable the client to access the target service.

In some embodiments, the authentication messages may include one or more of a TGT request, such as a KRB_AS_REQ message; a response to a TGT request, such as a KRB_AS_REP message; an ST request, such as a KRB_TG-S_REQ message; a response to an ST request, such as a KRB_TGS_REP message; and an access request that includes an ST, such as a KRB_AP_REQ message.

Data associated with the authentication messages, also referred to herein as characteristics of data associated with authentication messages, may include, for example, one or more of a TGT; an ST; a flag; a PAC; a network address and/or a group of network addresses; a target service name; a client name; an encryption suite supported by an originator of the message; an origin of the message; a destination of the message; a time of transmission; and a message type. Alternatively or additionally, data associated with the authentication messages may include a target service for which a ticket is requested, a target service being accessed using a ticket, and a target service responding to a request for access by a client using a ticket. Still alternatively or additionally, data associated with the authentication messages may include one or more of a client requesting an ST, a client requesting a TGT, a client accessing a target service using an ST, and a client sending a ticket to an entity other than a target service. Other data associated with the authentication messages is possible as well.

Data associated with the authentication messages may be received in a number of ways. In some embodiments, for example, data may be received by monitoring KDC data traffic; obtaining Kerberos message data from sensors in the communication network; monitoring Kerberos messaging sent and received by a client; monitoring Kerberos messaging sent and received by a target service; and/or obtaining logs from a KDC, a client, and/or a target service. Data may be received in other manners as well.

The method 300, in some embodiments, includes step 304 of analyzing the received data associated with the plurality of authentication messages. At step 306, the method 300 may include determining, based on the analyzing, a plurality of characteristics of the data associated with the authentication messages.

The method 300, in some embodiments, includes step 308 of receiving data associated with a new authentication message communicated over the network. As referred to herein, a new authentication message may be similar to another authentication message, but may be received at a different (earlier or later) time. In some embodiments, the new authentication message may be encrypted.

The method 300, in some embodiments, includes step 310 of determining a plurality of characteristics of the data associated with the new authentication message. The various characteristics of authentication messages, which may be detected and analyzed, are described above.

The method 300, in some embodiments, includes step 312 of comparing a determined characteristic of the new authentication message data with at least one of: a determined characteristic of the plurality of authentication messages data, known valid data, and known invalid data. The known valid data, for example, may be data known to be valid generally, or known to be valid in a particular network. In embodiments where the new authentication message is encrypted, for example, the comparing may be based on encrypted data of the new authentication message without first decrypting the encrypted data. In some embodiments, the comparing may include determining whether data from the new authentication message matches data from the received data from the plurality of authentication messages. Alternatively or additionally, the comparing may include determining whether data from the new authentication message includes a flag that is not included in the received data from the plurality of authentication messages. Still alternatively or additionally, the comparing may include determining whether an encryption type associated with the new authentication message data matches an encryption type associated with the received data from the plurality of authentication messages. The encryption type may indicate, for example, an encryption scheme used to encrypt the secure ticket data of the authentication message. Other encryption types, including any description pertaining to the encryption, are possible as well. Still alternatively or additionally, the comparing may include determining whether the new authentication message data includes a ticket that is also included in the received data from the plurality of authentication messages. Still alternatively or additionally, the comparing may include determining whether the new authentication message data includes a ticket, identifying a machine from which the new authentication message data originated, and ascertaining whether the ticket was previously sent to the machine from which the new authentication message originated. Other comparisons, including any ascertaining of similarities or differences between the authentication message data and the new authentication message data, are possible as well.

The method 300 includes step 314 of generating, based on the comparison, an assessment of whether the new authentication message is indicative of the potentially malicious activity in the network. The assessment, as referred to herein, may be any determination or analysis of whether the authentication message is indicative of the potentially malicious activity in the network. The assessment may be, for example, a binary indication, such as forged or genuine, or may be a probability indication, such as a probability that the authentication message is indicative of the potentially malicious activity. Other assessments, including any valuation, diagnosis, or other description of the computer network and/or potentially malicious activity, are possible as well.

Generating the assessment may include, for example, performing a protective false-positive detection operation to limit false-positive indications from the potentially malicious activity indications. In some embodiments, the false-positive detection operation may involve, for example, identifying an error message sent by a ticket issuer (such as a KDC of a Kerberos system) in response to a ticket request (such as a TGT or ST); identifying a ticket request sent from an unmonitored domain; and determining when an issued ticket is forwardable to another entity. The false-positive detection operation may take other forms as well.

Alternatively or additionally, generating the assessment may include determining whether the new authentication message data is associated with a potential attack in the network. Still alternatively or additionally, generating the assessment may include determining information containing the potentially malicious activity. The assessment may be generated in other manners as well.

In some embodiments, based on the assessment, a decision may be made of whether to transmit the new authentication message to the target application. For example, this may involve accessing a proxy server or other server, implemented in the form of a dedicated computer, software, or any other computer. The proxy server or other server may be configured to intervene, or to intermediate, in the message communication process. This may involve, for example, controlling communication of authentication messages between a client and a target application. It may also involve intercepting authentication messages, either transparently or not from the client's (or target application's) perspective. Thus, in some situations the client and/or target application may be unaware or not informed that potentially malicious activity has been identified. The proxy server or other server may be configured to block, accept, store, and/or forward authentication messages. These actions may be based on, for example, risk factors or risk scenarios associated with determining indications of potentially malicious activity.

In other embodiments, a different computer component (e.g., authentication system 104, service providing system 106, or detection system 108) determines whether to transmit the new authentication message to the target application. In such embodiments, a proxy server may or may not be used.

In some embodiments, determining whether an authentication message could be forwarded (e.g., to a target application) may be based on the assessment made of whether an authentication message communicated over the network is indicative of potentially malicious activity. Further, such determining might include determining whether to forward or not forward an authentication message based on different risk factors and risk scenarios, some of which may be applicable to comply with the specific implementing system environment.

As noted above, attacks involving the Kerberos protocol and/or other protocols may include, for example, a Golden Ticket Attack, Silver Ticket Attack, MS14-068 Exploitation Attack (sometimes referred to as the PAC Attack), Pass-the-Ticket Attack, which can be implemented for both TGTs and STs, and Overpass-the-Hash Attack. Each of these exemplary attacks is described in greater detail below.

Method 300 may be used to detect potentially malicious activity associated with each of these types of attacks. In some embodiments, detection of these attacks may involve the receipt and analysis of different data associated with different authentication messages. For example, in some embodiments, detection of a Golden Ticket attack may involve extracting TGTs from responses to TGT requests and storing the TGTs in the repository. Potentially malicious activity may be detected when a TGT included in an authentication message is not stored in the repository. As another example, in some embodiments, detection of a Silver Ticket attack may involve extracting STs from responses to ST requests and storing the STs in the repository. Potentially malicious activity may be detected when an ST included in the obtained message is not stored in the repository. As still another example, in detection of a MS14-068 attack, potentially malicious activity may be detected when a TGT request includes flag to not include a PAC in the TGT request. As yet another example, detection of a Pass-the-Ticket TGT attack may involve extracting TGTs and the respective TGT requester from responses to TGT requests. Potentially malicious activity may be detected when a sender of a message including a TGT differs from the respective requester of the TGT. As still another example, detection of a Pass-the-Ticket ST attack may involve extracting STs and the respective ST requester from responses to TGT requests. Potentially malicious activity may be detected when a sender of a message including an ST differs from the respective requester of the ST. And as yet another example, detection of an Overpass-the-Hash attack may involve extracting encryption suite identifiers for respective Kerberos ticket requesters. Potentially malicious activity may be detected when the encryption suite of a sender of a Kerberos message differs from the encryption suite previously recorded for the sender. Potentially malicious activity may be detected in other manners and for other attacks as well.

In some embodiments, method 300 may be used to detect potentially malicious activity in real-time. Alternatively or additionally, in some embodiments, an alert may be issued when potentially malicious activity is detected.

In some embodiments, method 300 may further include identifying a network account associated with a sender of the received data associated with the new authentication message, and executing a responsive measure with respect to the identified network account. As used herein, the term network account may broadly include any local machine account, or any network-defined or network-recognized account.

In some embodiments, such as those in which the computer network operates according to the Kerberos protocol, the plurality of authentication messages data may include, for example, information regarding Kerberos TGT tickets issued by a KDC. Comparing a determined characteristic of the new authentication message data with a determined characteristic of the plurality of authentication message data may involve, for example, checking whether any of the Kerberos TGT tickets in the new authentication message data does not appear in plurality of authentication messages data. This may be useful, for instance, in detecting Golden Ticket attacks.

Alternatively or additionally, in some embodiments, the plurality of authentication messages data may include, for example, information regarding Kerberos ST tickets issued by a KDC. Comparing a determined characteristic of the new authentication message data with a determined characteristic of the plurality of authentication message data may involve, for example, checking whether any of the Kerberos ST tickets in the new authentication message data does not appear in the plurality of messages authentication data. This may be useful, for instance, in detecting Silver Ticket attacks.

In some embodiments, such as those in which the computer network operates according to the Kerberos protocol, method 300 may further include checking the KDC_options flag of TGS_REQ messages in the plurality of authentication messages and indicating in the plurality of authentication messages data which TGTs were intended for renewal. In these embodiments, when a TGT is intended for renewal, the KDC response to the renewal request can be checked. If the TGT request is rejected by the KDC, potentially malicious activity is not detected.

In some embodiments, such as those in which the computer network operates according to the Kerberos protocol, comparing a determined characteristic of the new authentication message data with a determined characteristic of the plurality of authentication message data may involve, for example, checking AS_REQ messages in the second new authentication message data to determine whether the TGT is requested without a PAC. If no PAC is requested, potentially malicious activity may be detected and an alert may be issued. This may be useful, for instance, in detecting MS14-068 attacks.

In some embodiments, the plurality of authentication messages data may include, for example, information regarding all Kerberos TGTs issued by the KDC. The Kerberos TGTs may include, for example, those found in AS_REP or TGS_REP messages. The plurality of authentication messages data may further include, for example, the respective requesting entity to which each TGT was sent. In these embodiments, comparing a determined characteristic of the new authentication message data with a determined characteristic of the plurality of authentication message data may involve, for example, checking whether any of the Kerberos TGTs in the new authentication message data, such as in a TGS_REQ message, does not come from the requesting entity to which it was sent according to the plurality of authentication messages data. This may be useful, for instance, in detecting Pass-the-Ticket TGT attacks.

In some embodiments, the plurality of authentication messages data may include, for example, information regarding all Kerberos STs issued by the KDC. For example, the plurality of authentication messages data may include Kerberos STs found in TGS_REP messages. The plurality of authentication messages data may further include, for example, the respective requesting entity to which each ST was issued. In these embodiments, comparing a determined characteristic of the new authentication message data with a determined characteristic of the plurality of authentication message data may involve, for example, checking whether any of the Kerberos ST tickets in the new authentication message data, such as ST tickets found in AP_REQ messages, does not come from the machine to which it was issued according to the plurality of authentication messages data. This may be useful, for instance, in detecting Pass-the-Ticket ST attacks.

In some embodiments, the method 300 may further include checking the KDC_options flag of TGS_REQ messages in the plurality of authentication messages and indicating in the plurality of authentication messages data which TGTs were intended for delegation. In these embodiments, if the TGT was intended for delegation, no potentially malicious activity may be detected when the TGT is found in the new authentication message data.

In some embodiments, the method 300 may further include checking the KDC_options flag of TGS_REQ messages in the plurality of authentication messages and indicating in the plurality of authentication messages data which STs were intended for delegation. In these embodiments, if the ST was intended for delegation, no potentially malicious activity may be detected when the ST is found in the new authentication message data.

In some embodiments, the plurality of authentication messages data may contain information regarding the encryption suites for AS_REQ messages and an indication of the respective encryption suites supported by each requesting entity in the network. In these embodiments, comparing a determined characteristic of the new authentication message data with a determined characteristic of the plurality of authentication messages data may involve checking whether the encryption suite in an AS_REQ message for a specific requesting entity in the new authentication message data is different from the encryption suite in the plurality of authentication messages data for the requesting entity. A difference in encryption suites may indicate, for instance, an Overpass-the-Hash attack.

Figure 4:
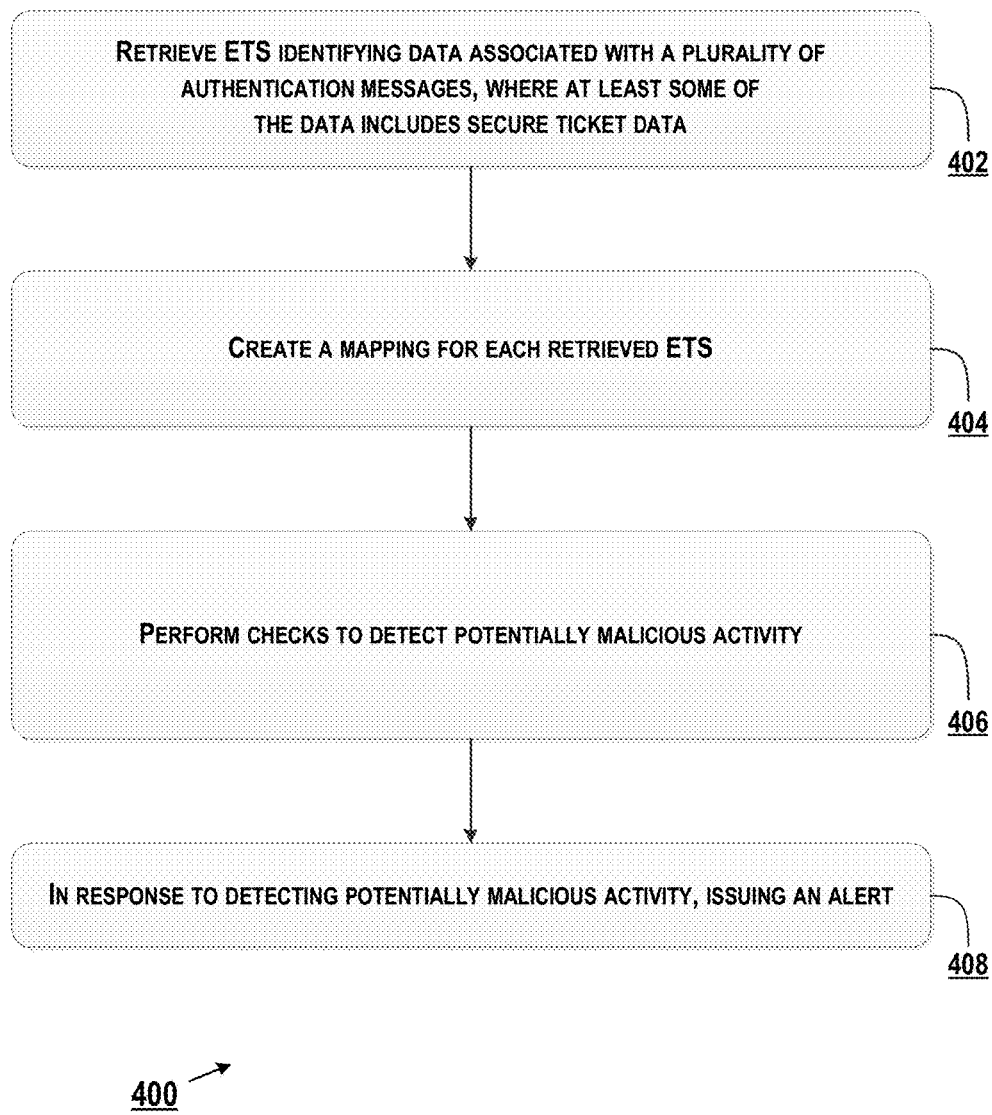
FIG. 4 is a flow chart illustrating another example method for detecting potentially malicious activity in a computer network, in accordance with disclosed embodiments.

Reference is now made to FIG. 4, which is a flow chart illustrating an example method 400 for detecting potentially malicious activity in a computer network, in accordance with some embodiments. The method 400 may, for example, be used in a computer network operating according to the Kerberos protocol or any number of other authentication protocols that use messaging to request and obtain tickets or tokens, possibly encrypted, for use in authentication and/or accessing of target services.

In some embodiments, data associated with authentication messages that is retrieved, for example as described above in connection with method 300, may be stored in a repository as a string of characters, known as an ETS or blob. In particular, for example, data may be extracted from authentication messages, as described above in connection with method 300. The extracted data may, for example, identify a Kerberos ticket, such as a TGT or an ST, or a ticket or token used in any number of other authentication protocols that use messaging to request and obtain tickets or tokens, possibly encrypted, for use in authentication and/or accessing of target services.

In some embodiments, an ETS associated with the extracted data may be stored in the repository. Alternatively or additionally, in some embodiments, a hash of the ETS may be stored. Such a hash may be, for example, an MD5 hash. Other hashes, including any other algorithm, process, or cryptographic value, are possible as well. The ETS may take other forms as well.

In a computer network operating the Kerberos protocol, data may be collected by monitoring traffic in the computer network. For example, traffic may be monitored to and from the KDC, such as KRB_AS_REQ and KRB_AS_REP messages exchanged during the AS Exchange step or KRB_TGS_REQ and KRB_TGS_REP message exchanged during the TGS Exchange step; and between endpoints, such as KRB_AP_REQ and KRB_AP_REP messages exchanged during the CS Exchange step. Observing messages exchanged during the CS Exchange step may include, for example, parsing various protocols that use Kerberos for authentication, such as File Transfer Protocol (FTP), Structured Query Language (SQL), Remote Desktop Protocol (RDP), Server Message Block (SMB) Protocol, Common Internet File System (CIFS), and Hypertext Transfer Protocol (HTTP). Other protocols, including any other application protocol, are possible as well As shown, in some embodiments the method 400 includes step 402 of retrieving ETS identifying data associated with a plurality of authentication messages. The authentication messages may be, for example, Kerberos messages or other types of messages.

The method 400 includes step 404 of creating a mapping for some or all retrieved ETSs. The mapping may indicate, for example, an origin, destination, time of transmission, and message type for an authentication message from which data identified by the ETS was extracted. The mapping may involve, for example, creating a file or a database table for each message type. For a computer network operating the Kerberos protocol, for instance, the message types may include KRB_AS_REQ, KRB_AS_REP, KRB_TGS_REQ, KRB_TGS_REP, KRB_AP_REQ, and KRB_AP_REP. Other message types, including any message transmitted, received, or stored in connection with an authentication protocol, are possible as well. Details for each ETS may be stored in the file or database table that corresponds to the appropriate message type. In some embodiments, as noted above, ETSs may be stored as a hash of the ETS. Storing ETSs as hashes may, in some embodiments, serve to reduce a size of the mapping.

The method 400, in some embodiments, includes step 406, which may include performing checks to detect potentially malicious activity. The checks may take several forms.

In some embodiments, for example, a check may involve, for some or all ETSs that are not from an AS_REP or TGS_REP message (for example, blobs from TGS_REQ or AP_REQ messages), determining whether a stored ETS matches an ETS that was previously sent in an AS_REP or a TGS_REP message.

As another example, in some embodiments, a check may involve determining whether some or all ETSs represent a Kerberos ticket that was sent from the KDC of the Kerberos system. As every Kerberos ticket sent on the computer network should have been legitimately generated by the KDC, an ETS that does not represent a Kerberos ticket sent from the KDC in an AS_REP or a TGS_REP message may be considered forged, illegitimate, and/or potentially malicious. Other checks may be performed as well.

The method 400, in some embodiments, includes step 408 of, in response to detecting potentially malicious activity, issuing an alert. The alert may be, for example, a message provided to, for instance, an administrator, such as a pop-up message on a graphical user interface for presentation to the administrator, or a message otherwise communicated to the administrator. Other alerts or indications provided to other parties or entities are possible as well.

In some embodiments, a computer readable medium may include computer executable instructions adapted to perform the methods of one or more of FIGS. 3 and 4. Alternatively or additionally, in some embodiments, the methods of FIGS. 3 and 4 and/or related systems may be implemented, for example, on a network-connected device that monitors network communications; as a software module on the KDC; and/or as software modules (or agents) on machines in the network. The methods and/or systems may be implemented in other manners as well.

Figure 5A:
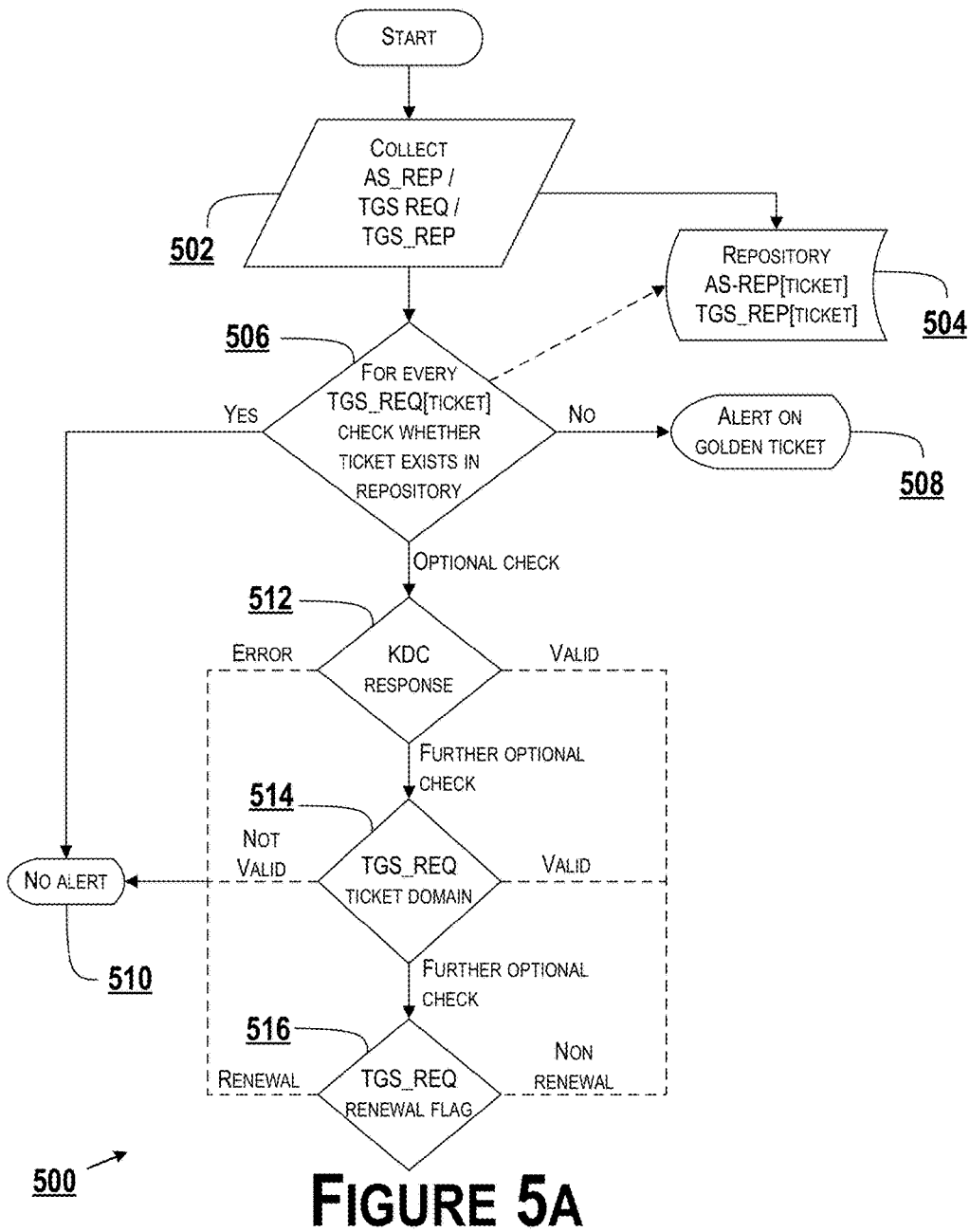

FIGS. 5A-5B illustrate an example method 500 for detecting a Golden Ticket Attack, and associated collected data, in accordance with disclosed embodiments. The term "Golden Ticket" refers to a TGT that was not generated by a legitimate KDC. This may be achieved by the attackers stealing a secret from the KDC (such as Microsoft Active Directory®), which enables them to create and/or cryptographically sign tickets which will be recognized as legitimate by services in the network.

FIG. 5A is a simplified flowchart of an example method 500 for detecting a Golden Ticket attack, according to disclosed embodiments. Method 500 may, for example, be performed by authentication system 104, service providing system 106, detection system 108, and/or remediation system 110, as described above in connection with FIG. 1. FIG. 5B is a screen capture showing example Kerberos message fields from which data required for the instant method may be extracted. An example Golden Ticket attack is described with reference to FIGS. 5A and 5B.

When a TGS_REQ is observed from machine X with a TGT that was not sent to machine X in a previous AS_REP or TGS_REP, this may be an indication of potentially malicious activity. If the TGT has not been seen anywhere before, the TGT is probably a Golden Ticket.

In some embodiments, the method 500 may include step 502 of collecting AS_REP, TG_REQ, and/or TGS_REP messages. Other messages may be collected as well.

In some embodiments, the method 500 may include step 504 where AS_REP and TGS_REP messages, including TGT and ST tickets, may be stored in, for example, a repository.

The method 500 may include, in some embodiments, step 506 where, for all or some TGS_REQ messages, the repository may be checked to determine whether the ticket included in the TGS_REQ exists in the repository. If not, the ticket included in the TGS_REQ may be deemed a Golden Ticket, and, at step 508, an alert on a Golden Ticket may be issued. If, on the other hand, the ticket in the TGS_REQ is determined to exist in the repository, the method 500 may include step 510 and no alert may be issued.

In some embodiments, in order to eliminate false positive cases, one or more of optional checks may be performed, as shown in FIG. 5A. These optional checks may include, for example, a KDC response check, shown as step 512, a domain check, shown as step 514, and a ticket renewal check, shown as step 516.

In a KDC response check, shown at step 512, the KDC may check any TGT it receives along with the TGS_REQ message. When the KDC response to a TGS_REQ message is an error message, no alert may be issued. Such a case may arise when, for example, a requesting entity sends the KDC an expired or malformed ticket. If the KDC response is valid (TGS_REP), an alert may be issued and/or further checks may be executed.

A domain check, shown at step 514, may determine whether the domain in which a Kerberos ticket has been issued is unmonitored. Kerberos issued tickets may be used to access resources across different domains. In such a case, if the monitoring does not cover all domains, tickets issued by the domain controllers of unmonitored domains may be ignored in order to avoid false positive alerts. The domain in which the ticket has been issued may be specified under the realm field within the Kerberos ticket request.

A ticket renewal check, shown at step 516, may determine whether a Kerberos ticket is expired. When a Kerberos ticket is about to expire, a renewed ticket may be requested by the requesting entity (renewal request initiation may vary according to the operating system). In some cases, the requesting entity will attempt to renew an expired ticket which was issued prior to the initiation of the network monitoring. In order to eliminate false positive alerts due to such cases, the KDC response to the renewal request may be observed. If the KDC accepts the request, the ETS may be validated, as described above. If the KDC rejects the request due to the usage of expired ticket, the ETS may be ignored.

In some embodiments, it may further be checked whether there is a subsequent successful TGS_REP. If so, this may be especially problematic, as it means the attack was successful in using a forged TGT to generate an ST.

Figure 6A:
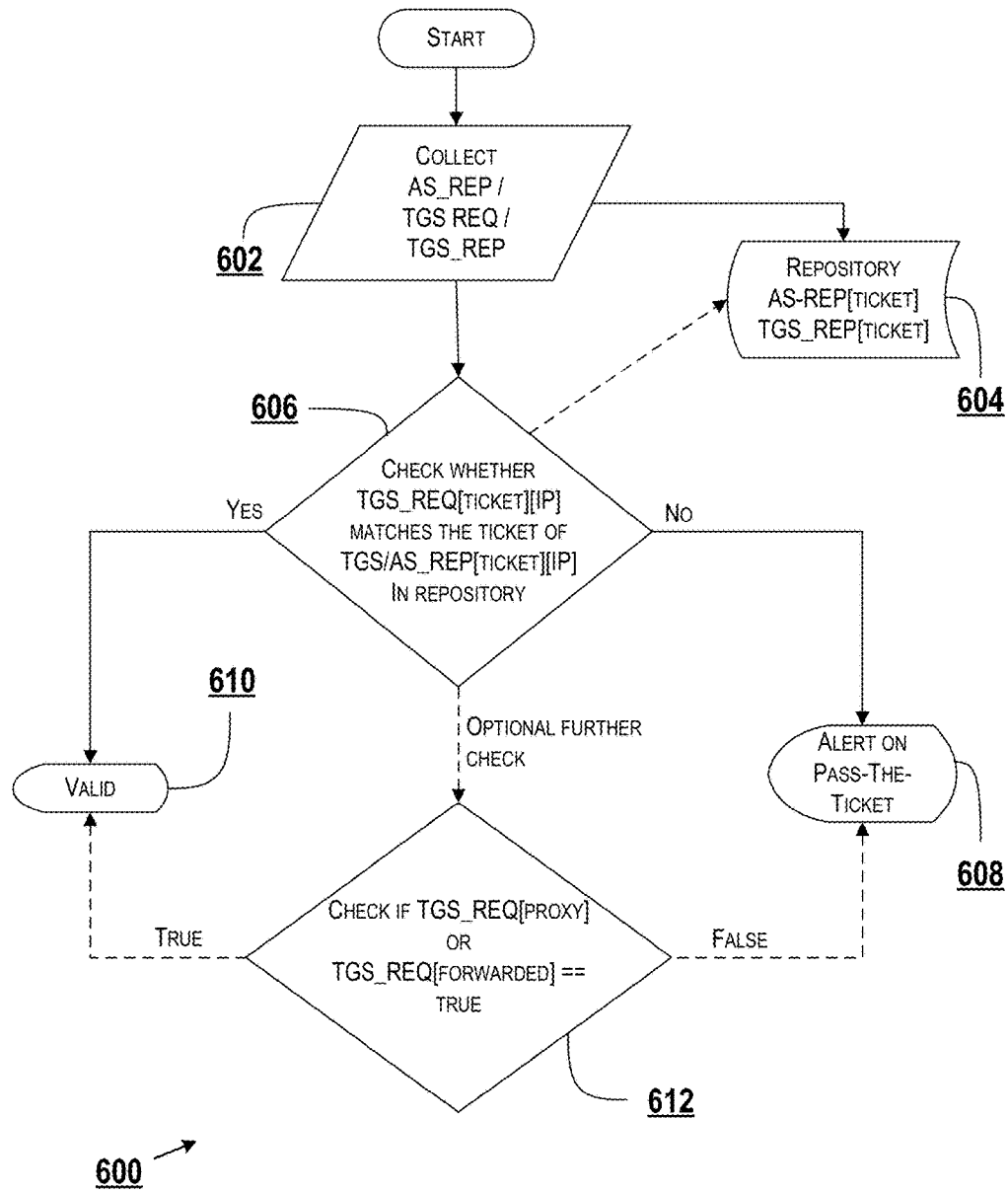

FIGS. 6A-6B illustrate an example method 600 for detecting a Pass-the-Ticket Attack that uses a TGT, in accordance with disclosed embodiments. In a Pass-the-Ticket attack, the attacker may pass a legitimate ticket, which was issued by the KDC to a first machine, to a second machine. In this manner, the second machine may be in possession of a legitimate ticket, even though it might not have the appropriate credentials to obtain the ticket itself. A Pass-the-Ticket attack may be performed for either of a TGT and an ST.

In a Pass-the-Ticket TGT attack the attacker takes a valid TGT from network machine X and uses it on network machine Y. Usually, machine Y did not have the proper original credentials to successfully complete the Authentication Service Exchange, and did not legitimately receive the TGT from the KDC. The Pass-the-Ticket TGT attack enables the attacker to request STs from machine Y.

FIG. 6A is a simplified flowchart of an example method 600 for detecting a Pass-the-Ticket TGT attack, according to disclosed embodiments. Method 600 may, for example, be performed by authentication system 104, service providing system 106, detection system 108, and/or remediation system 110, as described above in connection with FIG. 1. FIG. 6B is a screen capture showing example Kerberos message fields from which data required for the instant method is extracted. An example Pass-the-Ticket TGT attack is described with reference to FIGS. 6A and 6B.

When a TGS_REQ is observed from machine Y with a TGT that was not sent to it in a previous AS_REP, this may indicate a potential attack. If the TGT was seen going to another machine X in AS_REP, for example, this may be a potential Pass-the-Ticket TGT attack.

In some embodiments, the method 600 may include step 602 of collecting AS_REP, TG_REQ, and/or TGS_REP messages. Other messages may be collected as well.

In some embodiments, the method 600 may include step 604 where AS_REP and TGS_REP messages, including TGT and ST tickets, may be stored in, for example, a repository.

In some embodiments, the method 600 may include step 606 where, for some or all TGS_REQ messages, the repository may be checked to determine whether the ticket included in the TGS_REQ message matches the ticket of a TGS_REP or AS_REP message stored in the repository. If not, the method 600 may include step 608 where an alert on a Pass-the-Ticket TGT attack may be issued. If, on the other hand, the ticket in the TGS_REQ is determined to match that in the repository, the method 600 may include step 610 where no alert may be issued, and the TGS_REQ may be determined to be valid.

It should be noted that there may be an option in Kerberos-authenticated networks to "delegate" tickets, that is, tickets may legitimately be issued for a specific source but used by another. These delegation-intended tickets may be identified by the "FORWARDED" or "PROXY" flag in the TGS_REQ message. Accordingly, in some embodiments, in order to prevent false positive alerts, the method 600 may include step 612 where it may be checked whether a "FORWARDED" or "PROXY" flag is included in the TGS_REQ message.

Figure 7A:
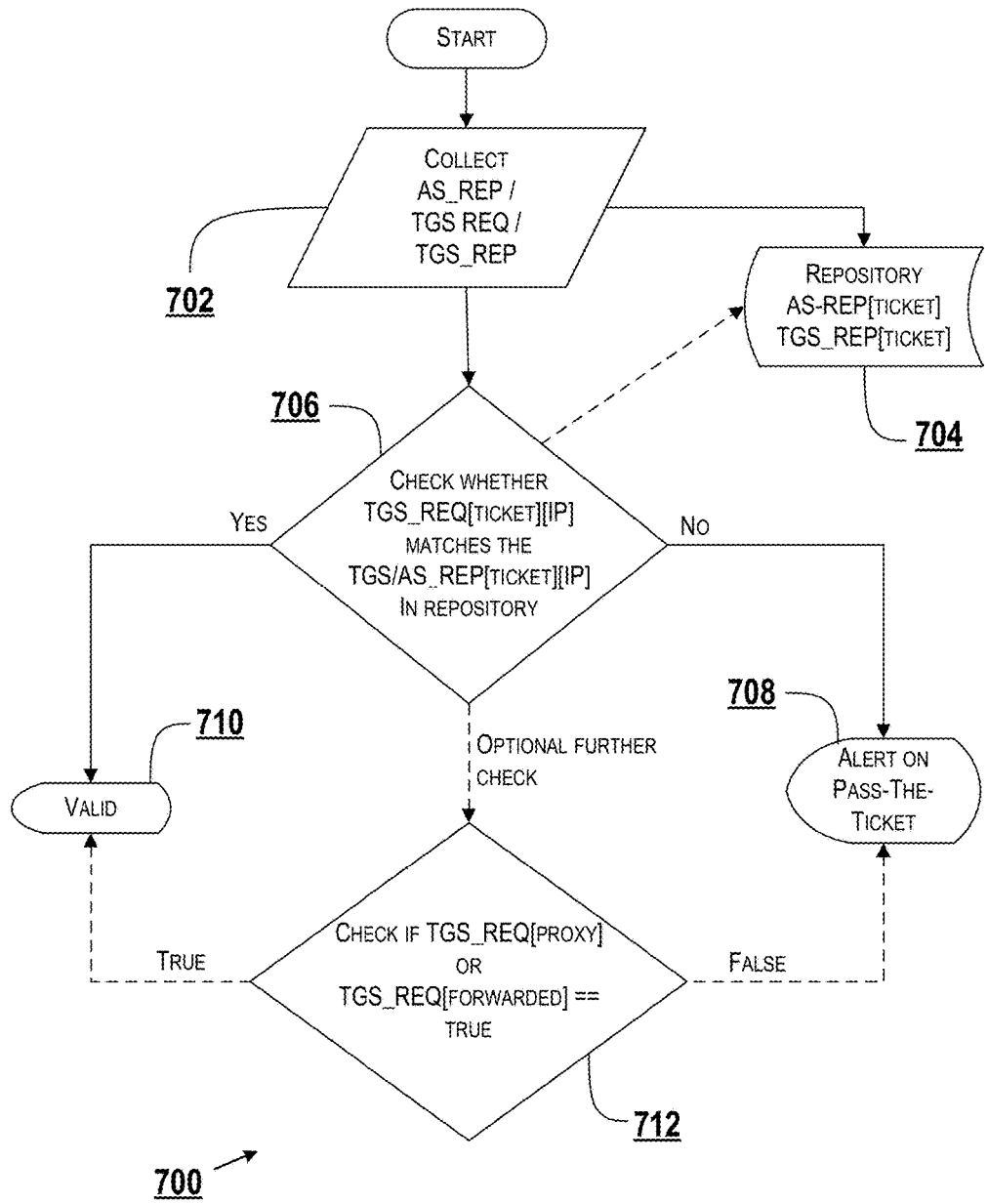

FIGS. 7A-7B illustrate an example method 700 for detecting a Pass-the-Ticket Attack that uses an ST, and related collected data, in accordance with disclosed embodiments. In a Pass-the-Ticket ST attack, the attacker takes a valid ST from network machine X and uses it on network machine Y. Usually, this machine Y did not have the proper original credentials to successfully complete the AS Exchange, nor did it legitimately use a valid TGT to complete the TGS Exchange, and thus did not legitimately receive the ST from the KDC. This attack may enable the attacker to use the ST to access a specific network service for which the ST was generated.

FIG. 7A is a simplified flowchart of an example method 700 for detecting a Pass-the-Ticket ST attack, according to disclosed embodiments. Method 700 may, for example, be performed by authentication system 104, service providing system 106, detection system 108, and/or remediation system 110, as described above in connection with FIG. 1. FIG. 7B is a screen capture showing the Kerberos message fields from which data required for the instant method may be extracted. An example Pass-the-Ticket ST attack is described with reference to FIGS. 7A and 7B.

If an AP_REQ is observed from machine Y with an ST that was not sent to it in a previous TGS_REP, then this may be a Pass-the-Ticket ST attack. If the ST was seen going to another machine X in TGS_REP, this may be a Pass-the-Ticket ST.

As shown in FIG. 7A, the method 700 may include step 702 of collecting AS_REP, TG_REQ, and/or TGS_REP messages. Other messages may be collected as well.

In some embodiments, the method 700 may include step 704 where AS_REP and TGS_REP messages, including TGT and ST tickets, may be stored in, for example, a repository.

In some embodiments, the method 700 may include step 706 where, for some or all TGS_REQ messages, the repository may be checked to determine whether the ticket included in the TGS_REQ message matches the ticket of a TGS_REP or AS_REP message stored in the repository. If not, the method 700 may include step 708 where an alert on a Pass-the-Ticket ST attack may be issued. If, on the other hand, the ticket in the TGS_REQ is determined to match that in the repository, the method 700 may include step 710 where no alert may be issued, and the TGS_REQ may be determined to be valid.

As noted above, there may be an option in Kerberos-authenticated networks to "delegate" tickets, that is, tickets may legitimately be issued for a specific source but used by another. These delegation-intended tickets may be identified by the "FORWARDED" or "PROXY" flag in the TGS_REQ message. Accordingly, in some embodiments, in order to prevent false positive alerts, the method 700 may include step 712 where it may be checked whether a "FORWARDED" or "PROXY" flag is included in the TGS_REQ message.

Figure 8A:
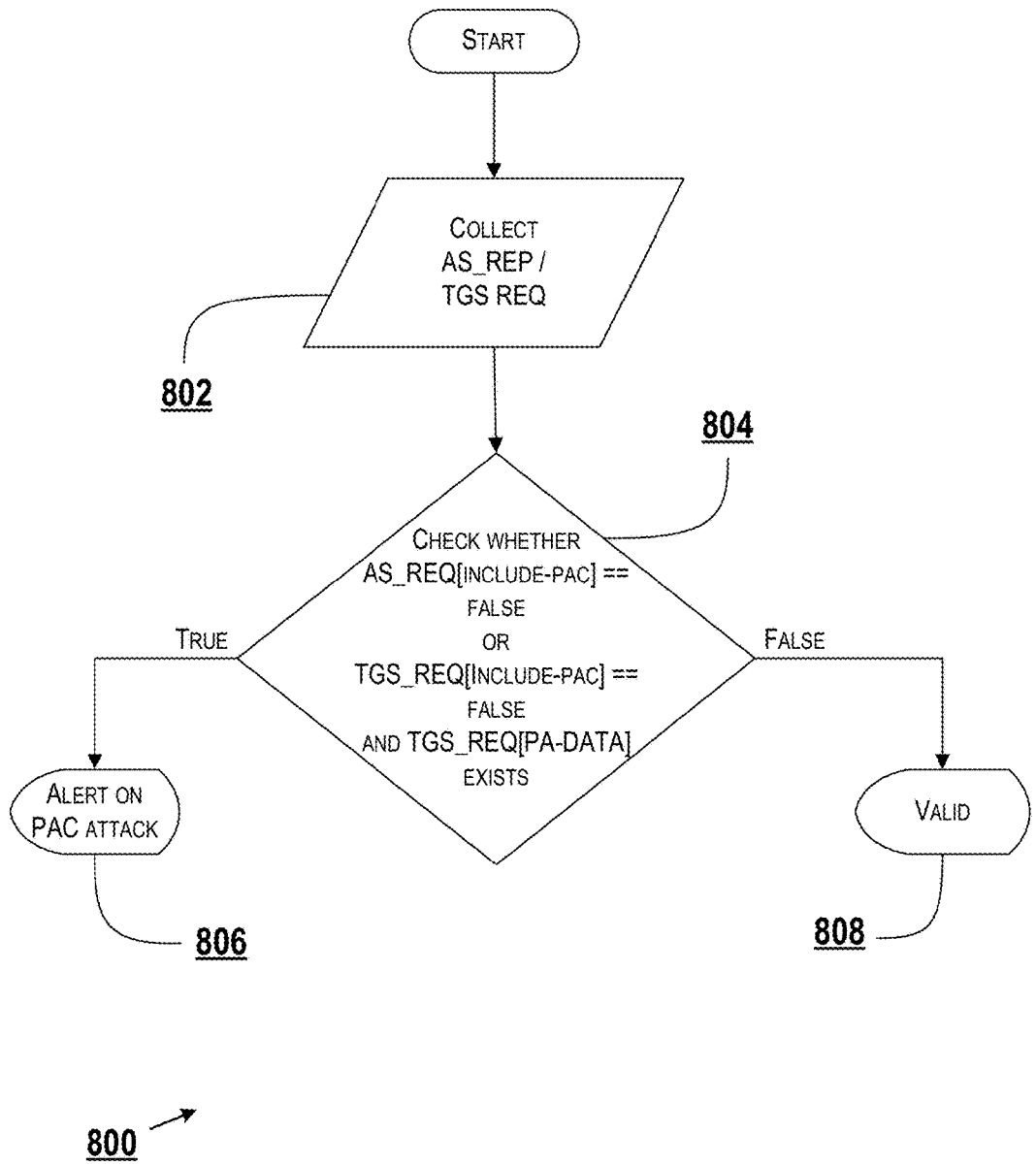

FIGS. 8A-8B illustrate an example method 800 for detecting a PAC Attack, and related collected data, in accordance with disclosed embodiments. A PAC attack, also known as an MS14-068 Exploitation attack, may exploit a Microsoft® vulnerability MS14-068 by assigning an illegitimate PAC to a Kerberos ticket. The PAC is an extension element of the authorization-data field contained in the client's Kerberos ticket. It contains information such as security identifiers, group membership and more.

The PAC attack may be performed on a TGT. It may enable the attacker to create a new TGT that states in its PAC domain groups' assignments that are different than those in the legitimate TGT generated by the KDC. This may effectively change the privileges of the TGT, thereby giving the user higher levels of access to target services. Thus, an attacker using standard user credentials may request and receive a legitimate TGT for a user, then change the PAC to gain higher privileges (such as those of domain administrator).

FIG. 8A is a simplified flowchart of an example method 800 for detecting a PAC attack, according to disclosed embodiments. Method 800 may, for example, be performed by authentication system 104, service providing system 106, detection system 108, and/or remediation system 110, as described above in connection with FIG. 1. FIG. 8B is a screen capture showing the Kerberos message fields from which data required for the instant method 800 may be extracted. An example PAC attack is described with reference to FIGS. 8A and 8B.

In some embodiments, the method 800 may include step 802 of collecting AS_REP and/or TGS_REQ messages. Other messages may be collected as well.

In some embodiments, the method 800 may include step 804 where it may then be determined whether an AS_REQ message exists that includes a special flag (PAC: false) that directs the KDC to provide a TGT with no PAC. This scenario indicates an attempt to create a TGT that will later be altered by the attacker with a non-legitimate PAC. If so, the method 800 may include step 806 where an alert on a PAC attack may be issued. If not, the method 800 may include step 808 where no alert may be issued, and the AS_REP may be determined to be valid.

Figure 9A:
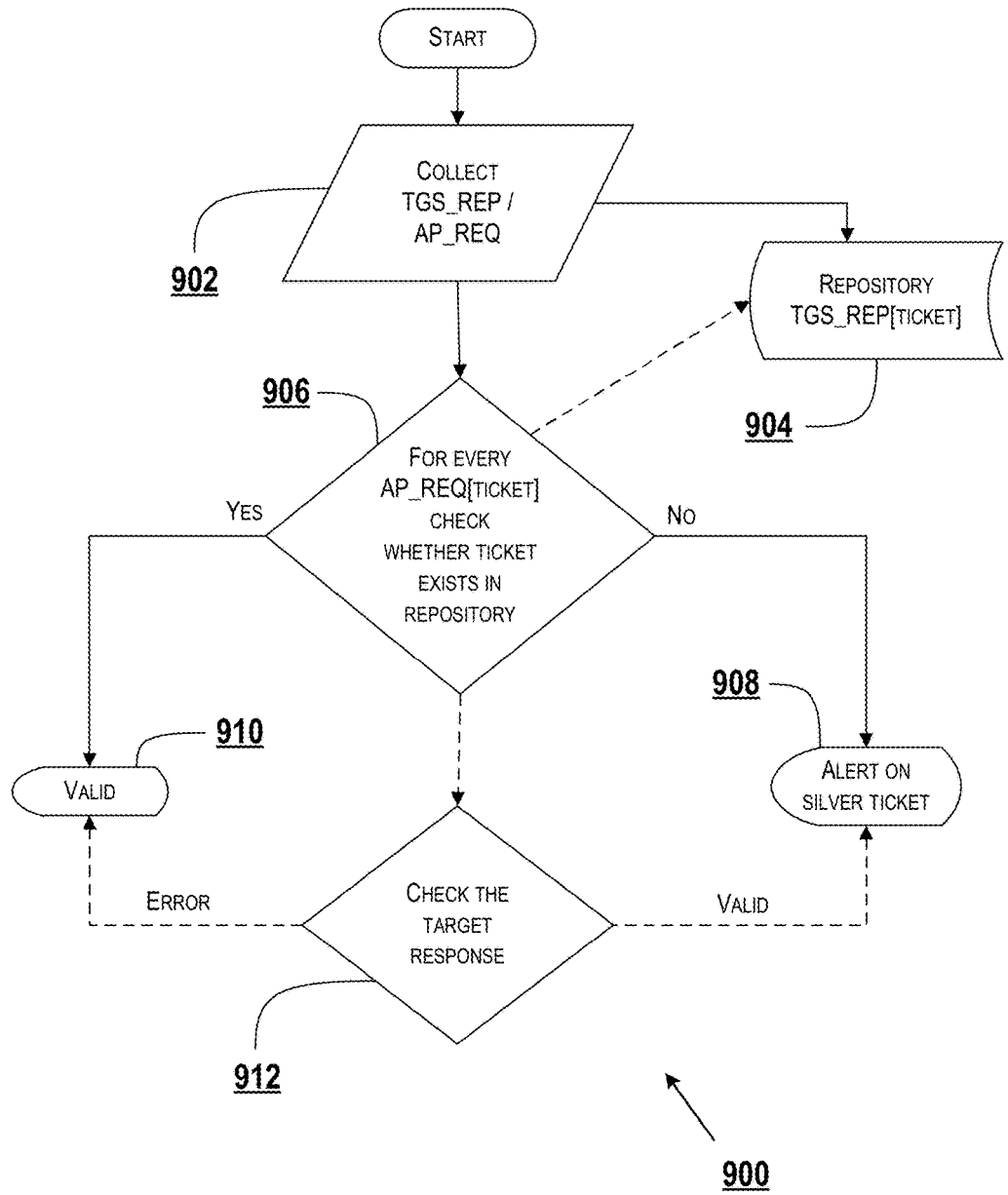

FIGS. 9A-9B illustrate an example method 900 for detecting a Silver Ticket Attack, and related collected data, in accordance with disclosed embodiments. In a Silver Ticket attack, the attacker may change the Kerberos ST PAC. The attack may enable the attacker to obtain different (typically higher) privileges than those granted in the legitimate ST generated by the KDC. This is achieved, for example, by changing the domain groups from those which were present in the legitimate TGT used to obtain the ST. This may effectively change the privileges of the ST, enabling higher levels of access to target services. This Silver Ticket attack enables an attacker using standard user credentials to request and receive a legitimate TGT for a user, to use the TGT to request and receive a legitimate ST, and then to change the PAC in the legitimate ST to gain higher privileges (e.g., those of domain administrator) for operations on the target service.

FIG. 9A is a simplified flowchart of an example method 900 for detecting a Silver Ticket attack, according to disclosed embodiments. Method 900 may, for example, be performed by authentication system 104, service providing system 106, detection system 108, and/or remediation system 110, as described above in connection with FIG. 1. FIG. 9B is a screen capture showing the Kerberos message fields from which data required for the instant method may be extracted. An example Silver Ticket attack is described with reference to FIGS. 9A and 9B.

If an AP_REQ is observed from machine Y with an ST that was not sent to it in a previous TGS_REP, this may indicate potentially malicious activity. If the ST was not seen going to another machine in TGS_REP, this may be a Silver Ticket attack.

In some embodiments, the method 900 may include step 902 of collecting TGS_REP and/or AP_REQ messages. Other messages may be collected as well.

In some embodiments, the method 900 may include step 904 where TGS_REP messages, including TGT and ST tickets, may be stored in, for example, a repository.

In some embodiments, the method 900 may include step 906 where, for some or all AP_REQ messages, the repository may be checked to determine whether the ticket included in the AP_REQ message matches the ticket of a TGS_REP message stored in the repository. If not, the method 900 may include step 908 where an alert on a Silver Ticket attack may be issued. If, on the other hand, the ticket in the AP_REQ is determined to match that in the repository, the method 900 may include step 910 where no alert may be issued, and the AP_REQ may be determined to be valid.

When a Kerberos ticket is about to expire, a renewed ticket may be requested by the requesting entity (renewal request initiation may vary according to the operating system). In some cases, the requesting entity may attempt renewing an expired ticket which was issued prior to the initiation of the network monitoring. In order to eliminate false positive alerts due to such cases, the KDC response to the renewal request may be observed. If the KDC accepts the request, the ETS should be validated as described above. If the KDC rejects the request due to the usage of expired ticket, the ETS may be ignored.

In some embodiments, the method 900 may include step 912 where the KDC may check any TGT it receives along with the TGS_REQ message. When the KDC response to a TGS_REQ message is an error message, no alert may be issued. Such a case may arise when a requesting entity sends the KDC an expired or malformed ticket. If the KDC response is valid (TGS_REP), either an alert may be issued or further optional checks may be performed.

As noted above, in a Silver Ticket attack, the attacker may change the Kerberos ST PAC in order to obtain higher privileges within the network. The ST PAC may, in some embodiments, include two verification values that may be validated in order to detect a Silver Ticket Attack. The verification values may be calculated using, for example, cryptographic keys.

For example, in some embodiments, the ST PAC may include each of a target service checksum, calculated using a target service key, and a KDC checksum, calculated using a Krbtgt key. For example, as shown in FIG. 20A, the ST PAC 2000 may include target service checksum 2002 and KDC checksum 2004. As another example, as shown in FIG. 20B, the ST PAC 2006 may include target service checksum 2008 and KDC checksum 2010. The PAC, target service checksum, and KDC checksum may take other forms as well, and other verification values and other cryptographic keys are possible as well.

During operation of an authentication protocol, the verification values may each be validated. For example, one or more verification values may be validated by a service providing system, while one or more other verification values may be validated by an authentication system, credentialing system, and/or remediation system, as described above in connection with FIGS. 1, 11, 13, 15, 16, 17A-17C, and 19. For example, a target service checksum may, for example, be validated by a service providing system, while a KDC checksum may be validated by an authentication system. Validation of the KDC checksum, sometimes referred to as "PAC Validation," may, in some embodiments, be optional.

In some instances, an attacker may have only one of the two (or more) cryptographic keys. For example, an attacker may have the target service key used to calculate the target service checksum, but may not have the Krbtgt key used to calculate the KDC checksum. In these instances, when a Silver Ticket attack is carried out, the attacker may properly calculate and modify one verification value, but not the other. For example, the attacker may properly calculate and modify the target service checksum using the target service key. Without the Krbtgt key, however, the attacker may be unable to properly calculate and modify the KDC checksum.

Accordingly, in some embodiments, a Silver Ticket Attack may be detected by validating both verification values using the cryptographic keys. A cryptographic key may be obtained, and the verification values may be calculated based on the cryptographic key and decrypted data elements from the received secure ticket. By comparing the verification values to corresponding values in the secure ticket, a Silver Ticket Attack may be detected. For example, a Silver Ticket Attack may be detected by retrieving each of the target service key and the Krbtgt key, decrypting the received ticket, and calculating each of the target service checksum and the KDC checksum using the decrypted data, the target service key, and the Krbtgt key. A mismatch between the received KDC checksum and the calculated KDC checksum may indicate that potentially malicious activity has been detected.

For example, in some embodiments a KDC may issue a legitimate ticket having an encrypted PAC containing (X, H(X,K1), H(H(X,K1),K2)). X may be data elements including, for example, group memberships or other information indicating authorization to access target services. K1 may be a target service key, such that H(X,K1) may be a target service checksum, calculated from the data X using the target service key K1. Similarly, K2 may be a Krbtgt key, such that H(H(X,K1),K2) may be a KDC checksum, calculated from the target service checksum H(X,K1) using the Krbtgt key K2.

In some instances, an attacker conducting a Silver Ticket Attack may modify the data X to data X' offering enhanced access to the attacker. Where the attacker has the target service key K1, the attacker may properly calculate a target service checksum H(X',K1) using the target service key K1. Without the Krbtgt key K2, however, the attacker may be unable to properly calculate the KDC checksum H(H(X', K1),K2). Accordingly, in some embodiments, a Silver Ticket Attack may be detected by retrieving each of the target service key K1 and the Krbtgt key K2, decrypting the received ticket, and calculating each of the target service checksum H(X',K1) and the KDC checksum H(H(X',K1), K2) using the decrypted data, the target service key K1, and the Krbtgt key K2. A mismatch between the received KDC checksum and the calculated KDC checksum may indicate that potentially malicious activity has been detected.

Figure 10A:
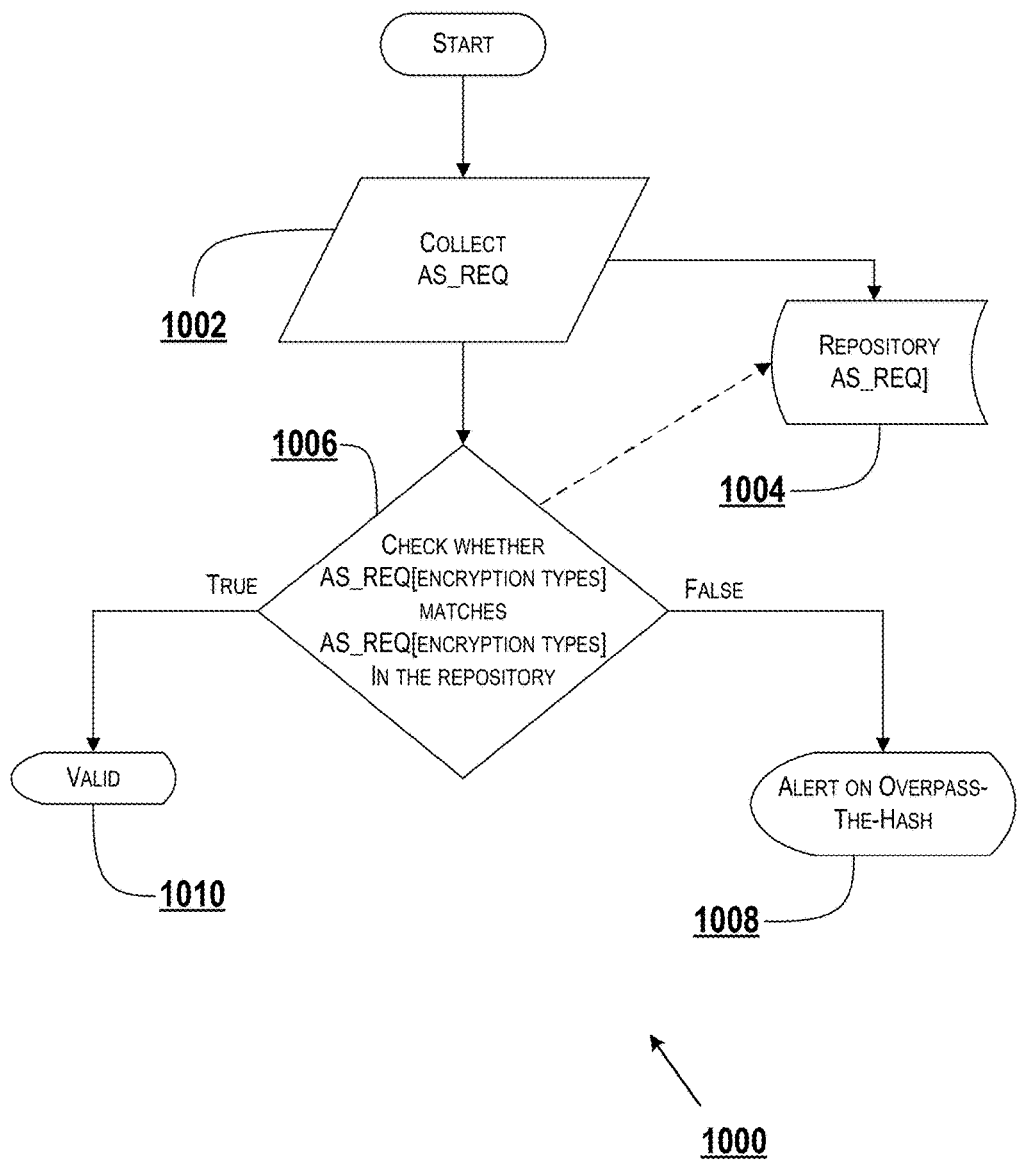

FIGS. 10A-10B illustrate an example method 1000 for detecting an Overpass-the-Hash Attack, and related collected data, in accordance with disclosed embodiments. In a legitimate authentication workflow, such as an AS_REQ/ AS_REP exchange, the client may provide a password for which several authenticators (such as hash values) are calculated. The client may then declare the encryption types that the client supports, and the KDC may choose one of them (usually the strongest one) for the authentication.

In an Overpass-the-Hash attack, the attacker uses a hash that has been obtained in order to successfully complete the AS_REQ/AS_REP message transaction and receive a legitimate TGT without knowing the actual password. The attacker's challenge may be that, without the actual password, it is possible that he will not have all the possible authenticators (hash values). If the attacker were to declare all the encryption types that would be declared in a legitimate authentication workflow, the KDC may choose an encryption type that the attacker does not have the authenticator for and the attacker's authentication will fail. To avoid this, the attacker may change the encryption type declaration and only declare the encryption types for which he has the authenticator, forcing the KDC to choose one of them.

FIG. 10A is a simplified flowchart of an example method 1000 for detecting an Overpass-the-Hash attack, according to disclosed embodiments. Method 1000 may, for example, be performed by authentication system 104, service providing system 106, detection system 108, and/or remediation system 110, as described above in connection with FIG. 1. FIG. 10B is a screen capture showing the Kerberos message fields from which data required for the instant method may be extracted. An example Overpass-the-Hash attack is described with reference to FIGS. 10A and 10B. In some embodiments, the method 1000 may include step 1002 of collecting AS_REQ messages. Other messages may be collected as well.

In some embodiments, the method 1000 may include step 1004 where encryption types included in the AS_REQ messages may be extracted and stored in, for example, a repository.

In some embodiments, the method 1000 may include step 1006 where, for some or all AS_REQ messages, the repository may be checked to determine whether the encryption types included in the TGS_REQ message match the encryption types of an AS_REQ message stored in the repository. If not, the method 1000 may include step 1008 where an alert on an Overpass-the-Hash attack may be issued. If, on the other hand, the encryption types in the AS_REQ are determined to match those in the repository, the method 1000 may include step 1010 where no alert may be issued, and the AS_REQ may be determined to be valid.

Figure 11:
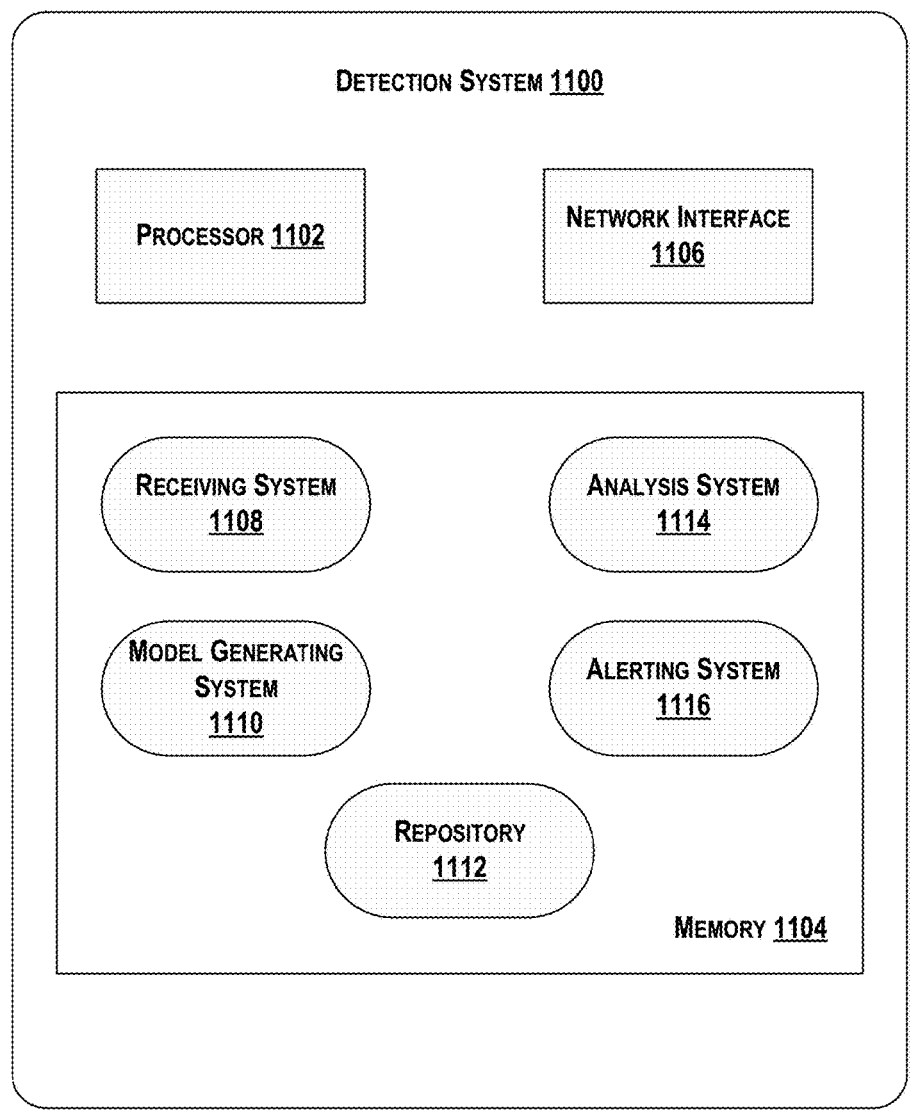
FIG. 11 is a block diagram of an example detection system, in accordance with disclosed embodiments.

FIG. 11 is a block diagram of an example detection system 1100, in accordance with disclosed embodiments. Detection system 1100 may be configured to detect potentially malicious activity in a computer network. In some embodiments, for example, detection system 1100 may be configured to detect whether an authentication message generated and/or exchanged in a computer network (e.g., network 112, from FIG. 1) is indicative of potentially malicious activity in the network. Detection system 1100 may, for example, be similar to detection system 108 described above in connection with FIG. 1. Additionally, or alternatively, detection system 1100 may be implemented by authentication system 104, service providing system 106, detection system 108, and/or remediation system 110, as described above in connection with FIG. 1.

Potentially malicious activity, as referred to herein, may include, for example, any activity that indicates, suggests, or makes possible an attack, a potential attack, or other actual or potentially illegitimate activity in the computer network. Potentially malicious activity is not limited to activity that is actually illegitimate; rather, activity, say in the form of suspicious activity or anomalous activity, that merely suggests a likelihood of illegitimate activity may be potentially malicious activity as well.

As shown, detection system 1100 may include a processor 1102, a memory 1104, and, in some embodiments, a network interface 1106. Memory 1104 may include receiving system 1108, model generating system 1110, repository 1112, analysis system 1114, and alerting system 1116. In some embodiments, receiving system 1108, model generating system 1110, repository 1112, analysis system 1114, and alerting system 1116 may include instructions, executable by processor 1102, to carry out one or more processes for detecting potentially malicious activity.

Receiving system 1108 may include instructions, executable by processor 1102, that configure detection system 1100 to collect Kerberos messages or other types of messages communicated over a network. In some embodiments, receiving system 1108 may be configured to receive data associated with a plurality of authentication messages, as described above in connection with any of the foregoing methods. The received data may include, for example, secure ticket data.

Model generating system 1110 may include instructions, executable by processor 1102, that configure detection system 1100 to extract data relevant to detecting attacks from the collected authentication messages, and repository 1112 may be configured to store the extracted data as plurality of authentication messages data, as described above in connection with any of the preceding methods. Repository 1112 may be, for example, a memory device, database, disk, external memory or any other type of memory or data storage element suitable for storing extracted data and/or a model of Kerberos activity.

Analysis system 1114 may include instructions, executable by processor 1102, that configure detection system 1100 to identify potentially malicious activity indicative of an attack by comparing data contained in an obtained authentication message to the extracted data stored in the repository 1112. In some embodiments, preconfigured or predefined data from the repository 1112, or another storage source, is used in the comparison. Analysis system 1114 may be configured, for example, to analyze the received data associated with the plurality of authentication messages; determine, based on the analyzing, a plurality of characteristics of the data associated with the authentication messages; receive data associated with a new authentication message; determine a plurality of characteristics of the data associated with the new authentication message; compare a determined characteristic of the new authentication message data with a determined characteristic of the plurality of authentication messages data; and generate, based on the comparison, an assessment of whether the new authentication message is indicative of the potentially malicious activity, as described above in connection with any of the preceding methods.

In some embodiments, memory 1104 may further include alerting system 1116, as shown. Alerting system 1116 may include instructions, executable by processor 1102, to issue an alert or a warning message when potentially malicious activity is detected by analysis system 1114.

In some embodiments, detection system 1100 may be implemented in whole or in part using cloud-based, on-demand, or other Internet-enabled computing. For instance, the functions of detection system 1100 may, in some embodiments, be provided as cloud-based, on-demand, or other Internet-enabled services accessible over an Internet connection. In some embodiments, network interface 1104 may be configured to communicate with a network via an Internet connection.

As described above, in some embodiments a ticket used in an authentication protocol may include both a non-encrypted portion and an encrypted portion. For example, in embodiments where a computer network operates according to the Kerberos protocol, a Kerberos ticket, like Kerberos ticket 200 described above in connection with FIG. 2, may include a non-encrypted portion, such as non-encrypted portion 204, and an encrypted portion, such as encrypted portion 206. In any authentication protocol, when authentication messages are monitored and collected, data extracted from the non-encrypted and encrypted portions may be used to detect potentially malicious activity in the computer network.

Figure 12A:
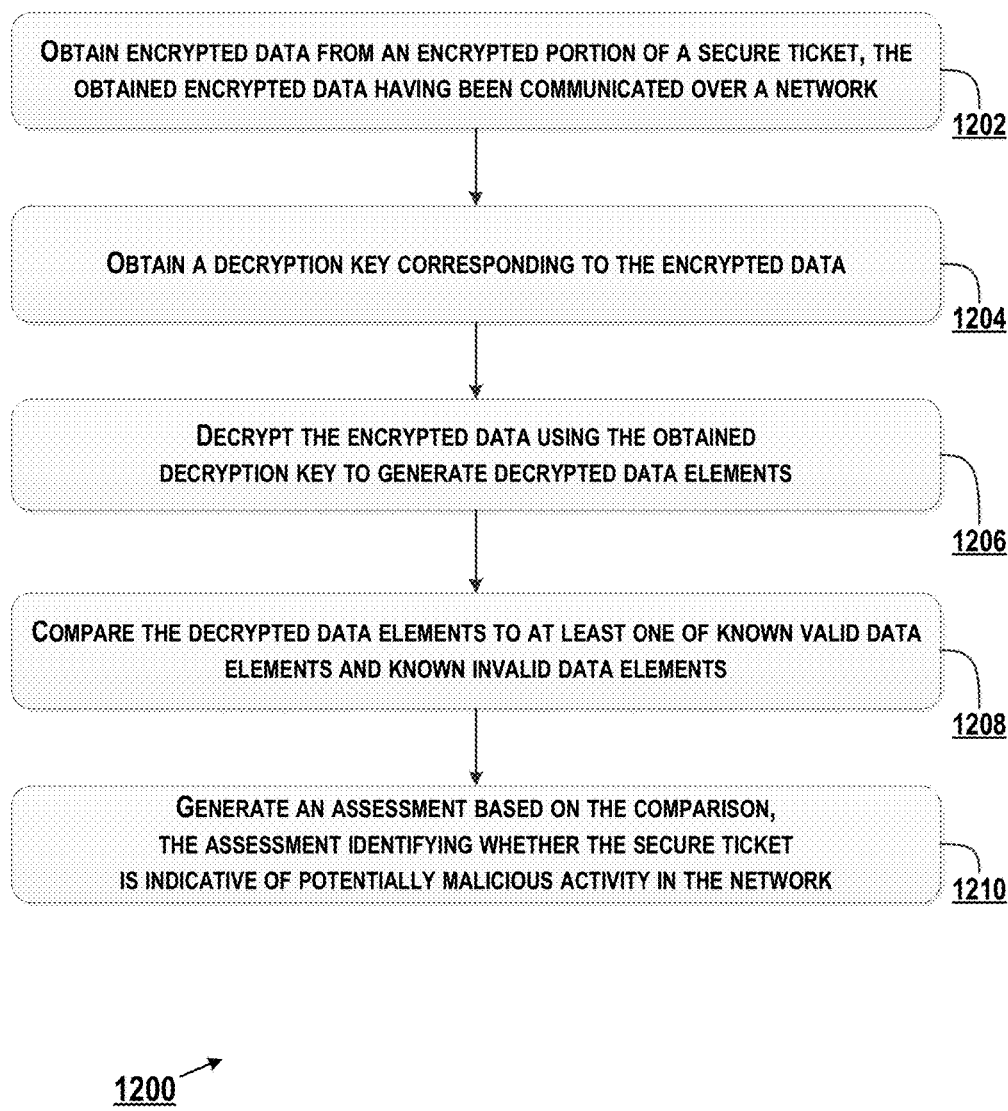
FIGS. 12A-12C are flow charts illustrating example methods for performing detection operations on secure ticket data to detect potentially malicious activity, in accordance with disclosed embodiments.
Figure 12B:
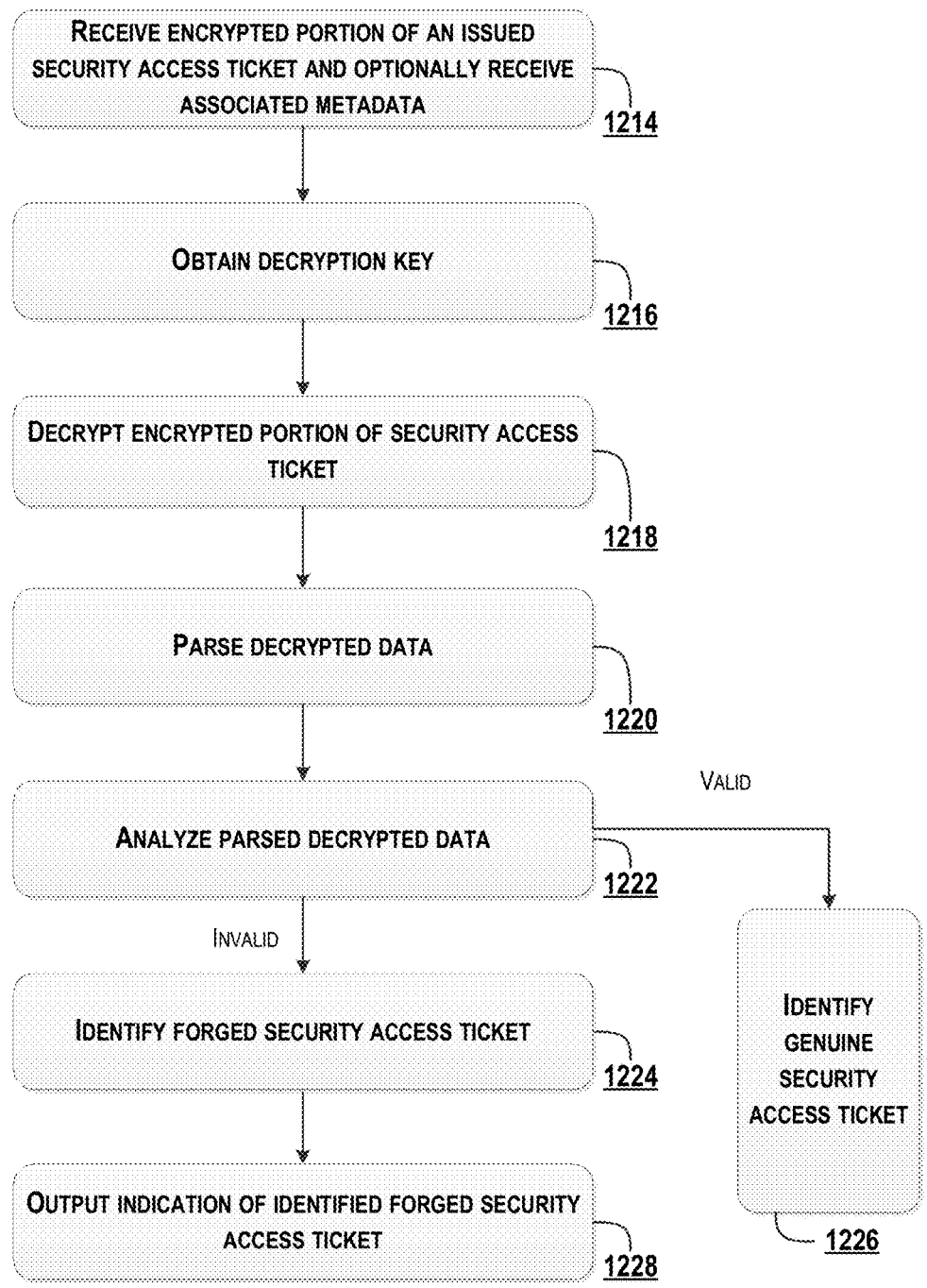
Figure 12C:
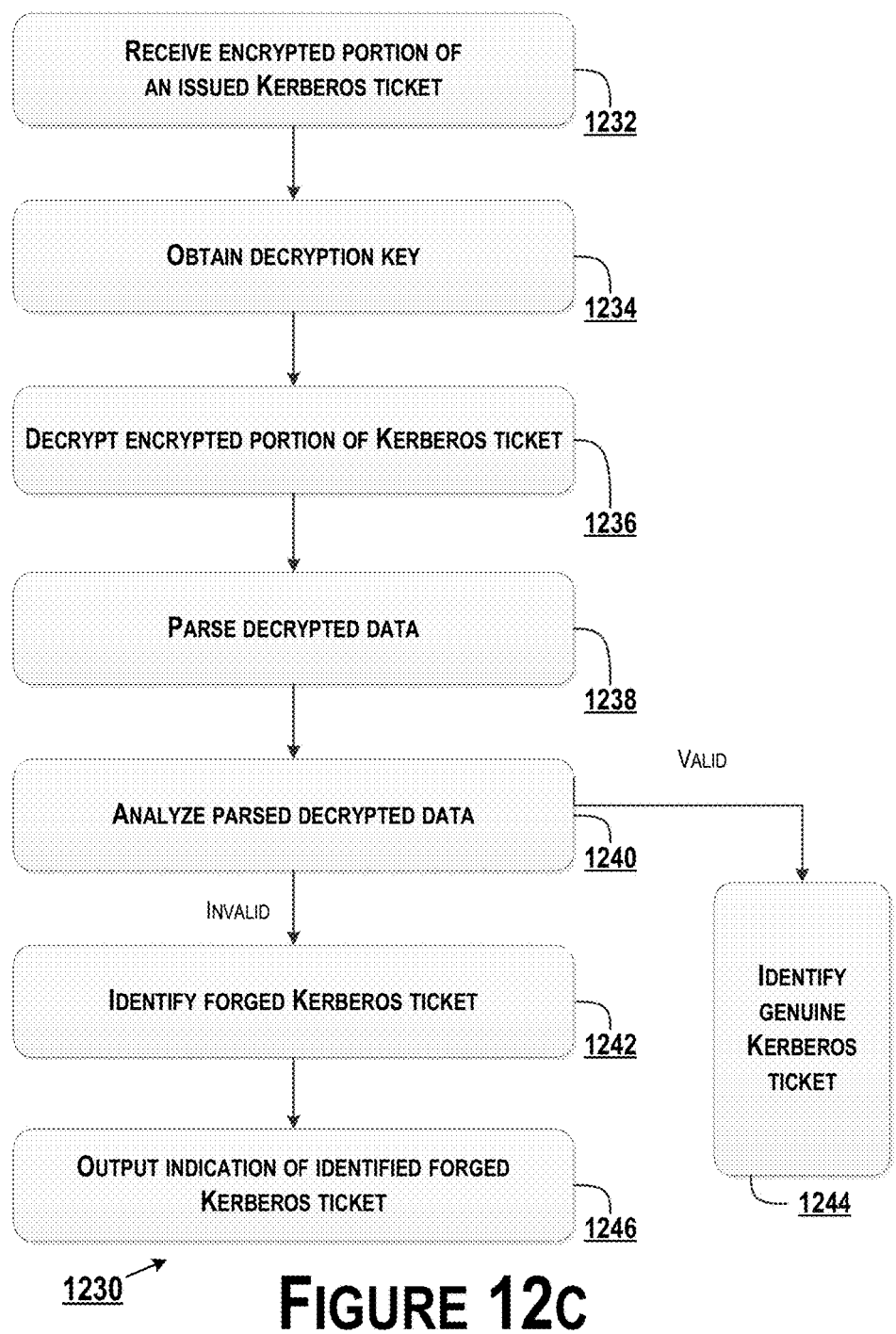

FIGS. 12A-12C are flow charts illustrating example methods for performing detection operations on secure ticket data to detect potentially malicious activity, in accordance with disclosed embodiments. Methods 1200, 1212, and 1230 may, for example, be performed by authentication system 104, service providing system 106, detection system 108, and/or remediation system 110, as described above in connection with FIG. 1.

As shown in FIG. 12A, the method 1200 in some embodiments includes step 1202 of obtaining encrypted data from an encrypted portion of a secure ticket. A secure ticket may be, for example, a ticket used in an authentication protocol, such as a Kerberos ticket used in the Kerberos protocol. Other secure tickets are possible as well. The obtained encrypted data may have been communicated over a network. The encrypted data may include, for example, data from the encrypted portion of the secure ticket. Encrypted data may be obtained, for example, from authentication messages transmitted, received, and/or stored by, to, and/or among any parties or entities on the network, including any location in the network or at a storage location associated with the network.

The method 1200, in some embodiments, also includes, at step 1204, obtaining a decryption key corresponding to the encrypted data. As referred to herein, a decryption key may be any information and/or any algorithm with which the encrypted data may be decrypted. The decryption key may be obtained in a number of manners.

In some embodiments, obtaining the decryption key may involve accessing a network resource to identify, from a plurality of detection keys, a suitable decryption key for decrypting the obtained encrypted data. A network resource may be, for example, another entity, such as a database or server, in the network. A network resource may also be, for example, a KDC, Active Directory® data, a credential "vault" that stores original and/or replacement network credentials, or any other form of network storage, either local or remote from a client. A suitable decryption key may be any decryption key that enables decryption of the encrypted portion. Alternatively or additionally, obtaining the decryption key may involve accessing local storage to identify, from a plurality of detection keys, a suitable decryption key for decrypting the obtained encrypted data. In some embodiments, the decryption key may be identified based on a metadata portion of the secure ticket. The metadata portion may be, may include, or may be included in a non-encrypted portion of the secure ticket. In embodiments where the secure ticket is a Kerberos ticket, such as ticket 200 described above in connection with FIG. 2, for example, the metadata portion may be similar to non-encrypted portion 202. Other metadata portions, including any non-encrypted and/or descriptive portion of any authentication message, are possible as well.

Alternatively or additionally, the decryption key may be identified in other manners selected based on, for instance, available network resources, based on network configuration, network architecture, and/or security risk. For example, the decryption key may be identified by requesting the decryption key from an administrative server storing decryption keys associated with respective TGSs performing encryption (or other servers performing encryption); requesting the decryption key from the TGS identified within the non-encrypted data portion; accessing a local data repository storing decryption keys associated with respective TGS performing encryption (or other servers performing encryption); or accessing an external database stored on a network connected storage device storing decryption keys associated with respective TGSs performing encryption (or other servers performing encryption). The decryption key may be obtained in other manners as well.

At step 1206, in some embodiments, the encrypted data may be decrypted using the obtained decryption key, thereby generating decrypted data elements. The decrypted data elements, as referred to herein, may include any data elements generated through decryption of the encrypted data. For example, in some embodiments, the encrypted portion of the secure ticket may be decrypted using the decryption key. In some embodiments, the decrypted data elements may be stored on a memory (locally and/or remotely).

The method 1200, in some embodiments, may include step 1208 of comparing the decrypted data elements to at least one of known valid data elements and known invalid data elements. Known valid data elements, as referred to herein, may be, for example, data elements known to indicate or suggest legitimate activity on the network, while known invalid data elements, as referred to herein, may be, for example, data elements known to indicate or suggest illegitimate activity on the network, such as forged tickets. In some embodiments, known valid or invalid data elements are known to be valid or invalid in a particular network, or more generally valid or invalid in many or all networks. Other known valid and known invalid data elements are possible as well.

The comparing may involve, for example, comparing a flag value from the decrypted data to a set of known and acceptable flag values. The flag value may be, for example, the value of a flag included in the decrypted data, such as a "FORWARDED" flag, a "PROXY" flag, or a special flag. The flag value may, in some embodiments, be a binary value. Other flag values are possible as well.

Alternatively or additionally, the comparing may involve comparing domain data from the decrypted data to a set of known and acceptable domain data. The domain data may be data indicating a domain in which the secure ticket was issued. The domain may be a monitored or an unmonitored domain. Acceptable domain data may be data that indicates the secure ticket is not indicative of potentially malicious activity. In some embodiments, the acceptable domain data may be data indicating a domain from which the secure ticket should have been issued, as indicated, for example, by related authentication messages. In some embodiments, domain data indicating the secure ticket was issued by an unmonitored domain may be regarded as acceptable domain data in order to avoid false-positive results. Other domain data and acceptable domain data are possible as well.

Still alternatively or additionally, the comparing may involve comparing client name data from the decrypted data to a set of known and acceptable client name data. Client name data may be data that indicates a client to whom the secure ticket was issued. Acceptable client name data may be data that indicates the secure ticket is not indicative of potentially malicious activity. In some embodiments, the acceptable client name data may be data indicating a client to whom the secure ticket should have been issued, as indicated, for example, by related authentication messages. Alternatively or additionally, the comparing may involve accessing a server to obtain updated data, the updated data corresponding to data in the decrypted data, and comparing the updated data with the corresponding data in the decrypted data. Still alternatively or additionally, the comparing may involve accessing a database storing previously received decrypted data from previously received secure tickets, the previously received decrypted data being treated as valid, and comparing the previously received decrypted data with the decrypted data. Any other ascertaining of similarities and/or differences between the decrypted data and other data are possible as well. The comparing may be performed in other manners as well.

The method 1200, in some embodiments, includes at step 1210 generating an assessment based on the comparison, the assessment identifying whether the secure ticket is indicative of potentially malicious activity in the network. The assessment may be generated in any of the manners described above.

In some embodiments, the method 1200 may further include storing, for a future assessment, the decrypted data elements based on a category associated with the results of the assessment of whether the secure ticket is indicative of the potentially malicious activity in the network. Alternatively or additionally, in some embodiments the method 1200 may further include identifying an account associated with a sender of the secure ticket, and executing a responsive measure on the identified account. A responsive measure may include any measure taken to mitigate, reverse, and/or prevent the potentially malicious activity.

Turning to FIG. 12B, the method 1212, in some embodiments, includes step 1214, as shown, of receiving an encrypted portion of an issued security access ticket. In some embodiments, as shown, associated metadata may be received as well. The metadata portion may include, for example, data from the non-encrypted portion of the secure access ticket.

The method 1212, in some embodiments, includes at step 1216 obtaining a decryption key. In some embodiments, the decryption key may be determined, for example, by identifying an issuing TGS from the received metadata and then communicating with this TGS to obtain the decryption key. Identification of the TGS may be direct (e.g., read from a specified field in the data) and/or indirect (e.g., values in the field may be used to look-up data in a database and/or in another server). The decryption key may be obtained in other manners as well.

The method 1212, in some embodiments, includes at step 1218 of decrypting the encrypted portion of the security access ticket. The encrypted portion may be decrypted using the decryption key obtained at step 1216.

At step 1220, in some embodiments, the decrypted data may be parsed. The parsing may be performed according to, for example, the authentication protocol used by the TGS that issued the security access ticket. The method 1212 may be implemented with various authentication protocols, and each authentication protocol may have various versions, such as for different operating systems, and/or according to different updates. The parsing may be performed according to the implemented protocol and/or version.

In some embodiments, for example, the decrypted data may be parsed according to the fields and/or parameters defined within the implementation of the authentication protocol, such as the order of the fields and/or parameters, the size of each field and/or parameter, and/or other organization of the fields and/or parameters within the security access ticket. For example, in Microsoft Windows®-based authentication, the data may be parsed according to fields that include, for instance, a ticket flag field, encryption key field, domain field, principal name, transited encoding field, time field, host address field, authorization data field, and/or at least one field of a privilege attribute certificate. Other authentication protocols and/or other fields are possible as well.

The parsed decrypted data may be stored on a memory (locally and/or remotely). The parsed decrypted data may be stored, for example, in a table and/or database that stores fields and values of the respective field.

The method 1212, in some embodiments, includes at step 1222 analyzing the parsed decrypted data. The parsed decrypted data may be analyzed, for example, to determine whether the encrypted portion includes valid data or invalid data. The detection of invalid data may be suggest or otherwise indicate that the received security access ticket is a forgery, for example, created by an external third entity (e.g., a hacker or malicious code) other than the TGS identified as being associated with the security access ticket.

In some embodiments, the analyzing may be binary (or multiple category) based, for example, generating a result of valid or forged (or other categories, for example, suspected forgery, suspicious ticket). The binary outcome may be generated using a binary analysis method. In some embodiments, for example, when an abnormal value is encountered, the forged result may be generated. Alternatively or additionally, the analyzing may be probability based, for example, generating a probability value indicative of a statistical probability that the security access ticket represents a forgery. The probability value may, for instance, be generated using a statistical probability based analysis method. In some embodiments, for example, the probability of forgery may rise with certain abnormalities in certain fields, and/or may rise with increasing number of detected abnormal values.

In some embodiments, for example, a forged result may be identified, for example, using a binary method that classifies the analysis into the category of forged. The forged version may be identified, for example, using a predefined statistical threshold, range, and/or function, applied to the statistical probability generated based on the analysis. For example, when the threshold is 60%, and the probability is 70% of forgery, a forgery result is identified. The threshold and/or range may be selected, for example, to reduce false positives and/or false negative identifications. Other analyzing is possible as well.

At step 1222, in some embodiments, if the analyzing indicates that the data is invalid, the method 1212 may include step 1224 of identifying a forged security access ticket. The method 1212 may further include step 1228 of outputting an indication of the identified forged security access ticket. For example, a network message indicative of the identified forged version may be generated and outputted as, for instance, a pop-up message on a graphical user interface for presentation to an administrator, and/or a message sent to the administrator (e.g., via email). Other indications, including any notification of potentially malicious network activity, are possible as well.

In some embodiments, malicious-related information may be obtained and outputted and/or stored in association with the indication of the forged version of the security access ticket. Example malicious-related information includes, for instance, identified inconsistencies between values of the parsed decrypted data and actual updated values (e.g., stored in the administrative server and/or ticket generating server). Other malicious-related information is possible as well. The malicious-related information may be used to verify whether the indication is correct.

Alternatively, if the analyzing at step 1222 indicates that the data is valid, the method 1212 may include step 1226 of identifying a genuine security access ticket. The genuine version may be identified, for example, when the encrypted portion of the security access ticket includes valid data in designated fields (e.g., all or certain fields), and/or when the probability that the security access ticket is genuine is above (or below) the predefined threshold. The genuine version may be identified in other manners as well.

In some embodiments, no action may be taken when the security access ticket is identified as genuine. For example, the remainder of the computer network authentication protocol may be allowed to proceed without interruption. Alternatively or additionally, in some embodiments an indication of the identified valid version of the security access ticket may be outputted, for example, as an authentication check of the security access ticket. The TGS may authenticate the security access ticket based on the indication. Still alternatively or additionally, when the packet including the security access ticket has been captured and/or intercepted, the packet may be allowed to continue transmission upon identification of the genuine version of the security access ticket. Other actions are possible as well.

FIG. 12C illustrates a method 1230 for detecting a forged version of a Kerberos ticket or another type of authentication ticket. The method 1230 may permit detection of a forged Kerberos ticket, or another ticket, external to the KDC.

As shown, the method 1230 includes step 1232 of receiving an encrypted portion of a Kerberos ticket issued by a KDC. In some embodiments, metadata (e.g., a non-encrypted portion of the Kerberos ticket, for example, as described above in connection with FIG. 2) associated with the Kerberos ticket may be received as well. The encrypted portion may be received in several ways.

In some embodiments, for example, packets transmitted to and/or from the KDC over the computer network are monitored and/or intercepted. In particular, packets containing Kerberos tickets issued by the KDC may be monitored and/or intercepted.

Alternatively or additionally, in some embodiments the encrypted portion (and/or the Kerberos ticket, and/or a packet including the Kerberos ticket, and/or the metadata) may be received from an external unit that maintains records of packets containing Kerberos tickets transmitted over the network, such as a router, a gateway, a network administrative server, or other network equipment. The external unit may maintain records of packets containing Kerberos tickets issued by the KDC.

In some embodiments, the encrypted portion (or the Kerberos ticket, or a packet including the Kerberos ticket) may be received by accessing a local agent running on the KDC (e.g., through code implementable by a processor of the KDC). The local agent may identify the encrypted portion and/or the metadata of the issuance of the security access ticket. The encrypted portion may be received in other manners as well.

The method 1230, in some embodiments, includes at step 1234 obtaining a decryption key. The decryption key may be obtained, for example, from the KDC, an administrative server, and/o a data repository. In some embodiments, the metadata may be used to obtain the decryption key. The decryption key may be obtained in other manners as well.

The method 1230, in some embodiments, includes at step 1236 decrypting the encrypted portion of the Kerberos ticket. The encrypted portion may be decrypted using, for example, the decryption key obtained in step 1234.

At step 1238, in some embodiments, the decrypted data may be parsed. The decrypted data may be parsed, for example, in any of the manners described above in connection with step 1220 of FIG. 12B. Parsing may be performed based on Kerberos defined fields, for example, as described below.

At step 1240, in some embodiments, the parsed decrypted data may be analyzed. The parsed decrypted data may be analyzed, for example, in any of the manners described above in connection with step 1222 of FIG. 12B.

Based on the analyzing at step 1240, in some embodiments, the Kerberos ticket may be identified as forged or as genuine. If the Kerberos ticket is identified as forged, the method 1230 may include step 1242 of identifying the forged Kerberos ticket. In some embodiments, the analysis may detect new types of attacks based on forgeries of Kerberos tickets, and/or attacks such as Golden Ticket, and other known or yet-to be known attacks (e.g., Zero Days attacks).

In some embodiments, the method 1230 may include step 1246 with outputting an indication of the identification of the forged Kerberos ticket. The indication of the identified forged Kerberos ticket may be outputted (e.g., transmitted or provided) to, for example, a security server or security process, for use by the server or process. The indication may be output, for example, in any of the manners described above in connection with step 1228 of FIG. 12B.

Alternatively, in embodiments where the analyzing at step 1240 indicates that the Kerberos ticket is genuine, the method 1230 may include step 1244 of identifying the Kerberos ticket as genuine.

Figure 13:
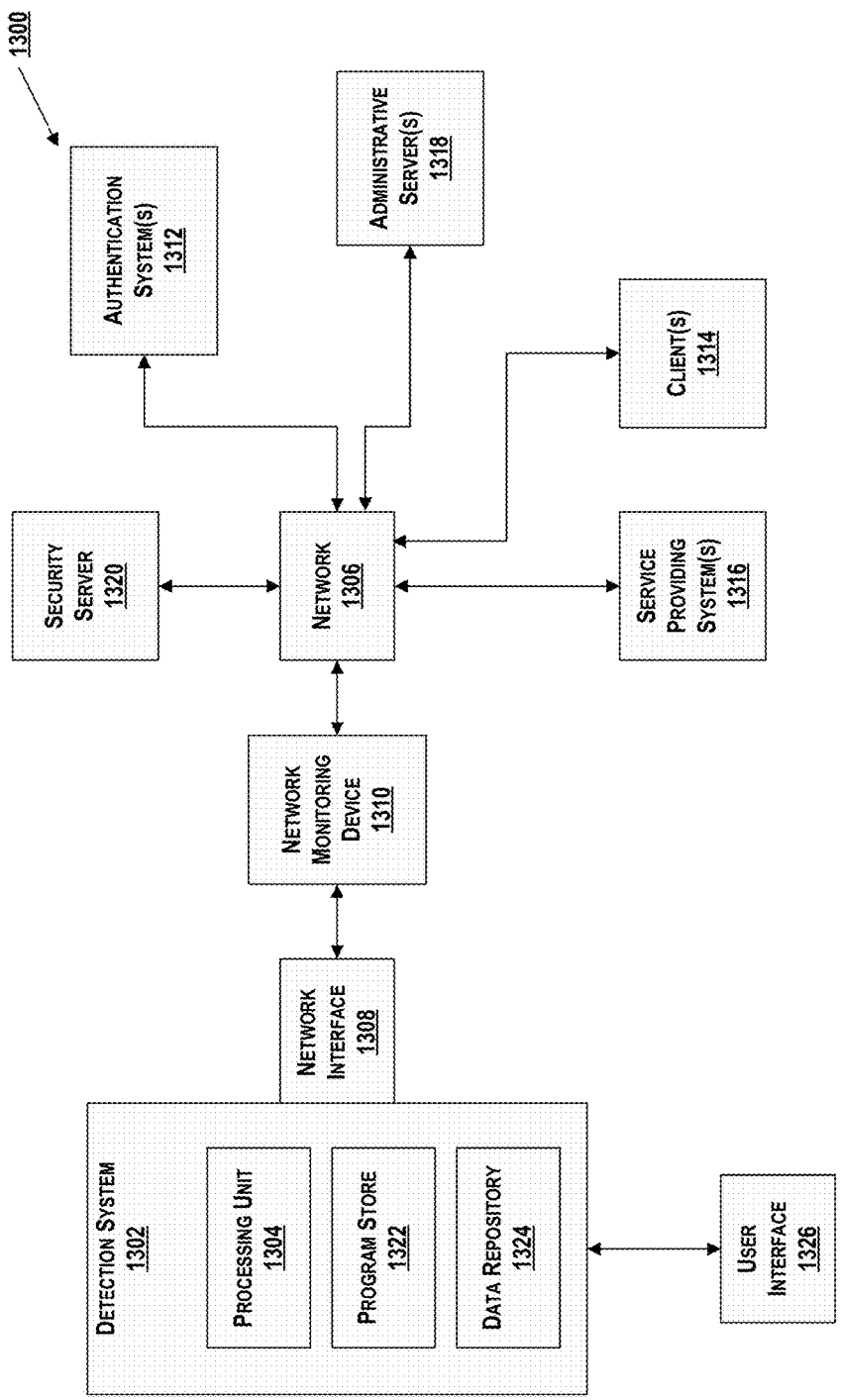
FIG. 13 is a block diagram illustrating an example system for performing potentially malicious activity detection operations on secure ticket data, in accordance with disclosed embodiments.

FIG. 13 is a block diagram illustrating an example system 1300 for performing potentially malicious activity detection operations on secure ticket data, in accordance with disclosed embodiments. System 1300 may be used to perform, for example, any of methods 1200, 1212, and 1230.

As shown, system 1300 includes a detection system 1302 having a processing unit 1304, program store 1322, and data repository 1324. In some embodiments, detection system 1302 may be similar to, for example, detection system 108 described above in connection with FIG. 1 and/or detection system 1100 described above in connection with FIG. 11. In other embodiments, system 1300 may be implemented by authentication system 104, service providing system 106, detection system 108, and/or remediation system 110, as described above in connection with FIG. 1.

Processing unit 1304 may include one or more processors (homogenous or heterogeneous), which may be arranged for parallel processing, as clusters, and/or as one or more multi-core processing units. In some embodiments, processing unit 1304 may, for example, be similar to processor 1102 described above in connection with FIG. 11.

In some embodiments, program store 1322 may be similar to memory 1106 and/or one or more of receiving system 1108, model generating system 1110, analysis system 1114, and alerting system 1116 described above in connection with FIG. 11. Alternatively or additionally, in some embodiments data repository 1324 may be similar to repository 1112 described above in connection with FIG. 11. Program store 1322 and/or repository 1324 may include instructions, executable by processing unit 1324, to carry out one or more processes for detecting potentially malicious activity. In some embodiments, program store 1322 may be configured for storing code and implementable, for example, as a random access memory (RAM), read-only memory (ROM), non-volatile memory, magnetic media, semiconductor memory devices, hard drive, removable storage, and optical media (e.g., DVD, CD-ROM). Alternatively or additionally, in some embodiments repository 1324 may be configured for storing database(s), and/or other data items, for example, historical data of valid and/or forged security access tickets, and/or a statistical classifier trained for classification of security access tickets into forged or valid categories, as described herein.

In some embodiments, detection system 1302 may include multiple computers (having heterogeneous or homogenous architectures), which may be arranged for distributed processing, such as in clusters.

Detection system 1302 may include a network interface 1308 adapted for communication with network resources operating over a network 1306, as shown. In some embodiments, network interface 1308 may be similar to, for example, network interface 1104 described above in connection with FIG. 11.

In some embodiments, detection system 1302 may further include a user interface 1326 adapted for access to and/or receipt of user data. User interface 1326 may be, for example, a graphical user interface, a web server (allowing remote access and/or remote interface capabilities), a display, a screen, a mouse, a keyboard, and/or a touch screen. Other user interfaces are possible as well.

In some embodiments, detection system 1302 may include or may be in communication with a network monitoring device 1310, via network interface 1308, that monitors network traffic, such as network messages (e.g., packets), transmitted over the network 1306. In some embodiments, network monitoring device 1310 may perform real-time monitoring of packets within network 1306. Network monitoring device 1310 may be or may include, for example, a packet sniffer, a packet analyzer, a network sensor, and/or network gateway. Other network monitoring devices are possible as well.

Network 1306 may be a secured or an unsecured network (e.g., network 112 from FIG. 1), such as the Internet, a private network (secured or unsecured), a cellular network, a wireless network, a local area network, or another network. Network 1306 may be configured to provide a platform for communication between different networked resources and accounts in, for example, a Kerberos-based system environment. Other authentication protocols are possible as well.

In some embodiments, units that communicate with network 1306 may include, for example, an authentication system 1312. Authentication system 1312 may be configured to, for example, issue security access tickets according to an implementation of a computer network authentication protocol. In some embodiments, authentication system 1312 may be similar to, for example, authentication system 104 described above in connection with FIG. 1. To this end, authentication system 1312 may facilitate communication, for example, between a client (or other network node) 1314 and a service providing system 1316 over network 1306. In some embodiments, client 1314 and/or service providing system 1316 may be similar to, for example, client 102 and service providing system 106, respectively, described above in connection with FIG. 1. Alternatively or additionally, client 1314 and/or service providing system 1316 may take the form of a network node, a web server, a data storage device, a mobile device, a smartphone, a tablet computer, a desktop computer, a notebook computer, a wearable computer, a watch computer, a glasses computer, and/or a computer at a kiosk, etc. Other clients and service providing servers are possible as well.

Authentication system 1312 may include and/or may be in communication with one or more sub-components and/or sub-servers that may, for example, depend on the implementation of the computer network authentication protocol. In some embodiments, for example, when authentication system 1312 implements the Kerberos protocol, authentication system 1312 may include or be in communication with a KDC, an AS, or a TGS. Other examples are possible as well.

Detection system 1302 may be programmed and/or positioned to monitor and/or intercept network traffic transmitted over network 1306, via network interface 1308. In some embodiments, for example, detection system 1302 may be programmed and/or positioned within network 1306 with network interface 1308 adapted to monitor and/or intercept encrypted data related to an encrypted portion of a security access ticket that is transmitted over network 1306, as described above.

In some embodiments, for example, network interface 1308 may be adapted to monitor network traffic to and/or from authentication system 1312 (and/or from one or more sub-components and/or sub-servers of authentication system 1312). Detection system 1302 may be programmed and/or positioned to monitor and/or intercept security access tickets transmitted to the authentication system 1312, and/or transmitted from the authentication system 1312. Detection system 1302 may be programmed and/or positioned in other ways, as well, such as to monitor and/or intercept security access tickets transmitted to and/or from client 1314 and/or security access tickets transmitted to and/or from service providing system 1316. Detection system 1302 may monitor and/or intercept different tickets at different stages of the implementation of the computer network authentication protocol as well.

In some embodiments, the monitored and/or intercepted tickets may include, for example: a session ticket (or a client-to-server ticket), such as that used by client 1314 requesting services from the service providing system 1316; or a ticket granting ticket, such as that used by client 1314 requesting the session ticket from authentication system 1312. Other ticket types may be monitored and/or intercepted as well, and interception and/or monitoring of tickets may occur at different stages of the computer network authentication protocol.

In some embodiments, an administrative server 1318 may be in communication with network 1306. Administrative server 1318 may store access data, such as decryption keys associated with different user logins, different client accounts, and/or with different authentication systems 1312 performing encryption. In some embodiments, administrative server 1318 may be accessed by detection system 1302 to, for example, obtain data used in decryption of the encrypted portion of the security access ticket, in parsing the decrypted data, and/or in analyzing the parsed decrypted data, as described herein. In some embodiments, administrative server 1318 may maintain and store an active directory (e.g., Active Directory®).

In some embodiments, a security server 1320 may be in communication with network 1306. Security server 1320 may store network security applications, which may be triggered and/or directed based on the outcome of the analysis of the security access ticket by detection system 1302. For example, in some embodiments security server 1320 may execute a network security program to isolate a client when a forged security access ticket transmitted by the client is detected.

While only one of each of detection system 1302, authentication system 1312, client 1314, service providing system 1316, and/or other components of system 1300 is shown for clarity, in some embodiments, network 1306 may include more than one of any of detection system 1302, authentication system 1312, client 1314, service providing system 1316, and/or other components of system 1300.

In some embodiments, one or more components of system 1300 may be implemented in whole or in part using cloud-based, on-demand, or other Internet-enabled computing. For instance, the functions of detection system 1302, network monitoring device 1310, network 1306, security server 1320, authentication system(s) 1312, administrative server(s) 1318, client(s) 1314, and/or service providing system(s) 1316 may, in some embodiments, be provided as cloud-based, on-demand, or other Internet-enabled services accessible over an Internet connection. In some embodiments, communicative coupling among detection system 1302, network monitoring device 1310, network 1306, security server 1320, authentication system(s) 1312, administrative server(s) 1318, client(s) 1314, and/or service providing system(s) 1316 may be via an Internet connection.

In some embodiments, program store 1322 may contain instructions that, when executed by processing unit 1304, cause detection system 1302 to perform one or more of methods 1200, 1212, and 1230 described above in connection with FIGS. 12A-12C. More generally, detection system 1302 may be configured to detect a forged version of a security access ticket based on a computer network authentication protocol for granting access, optionally between a client and a service providing server communicating over a network, which may be unsecure. In some embodiments, such detection may be implemented based on a system architecture in which the detection system 1302 is located externally to the authentication system 1312 (which, e.g., issues a genuine version of the security access ticket), as shown.

Detection system 1302 may be configured to receive an encrypted portion of an issued security access ticket. Optionally, metadata (e.g., non-encrypted portion of the security access ticket) associated with the security access ticket is received by detection system 1302 as well. The metadata may be used for obtaining the decryption key to decrypt the received encrypted portion, as described below.

The encrypted portion may be extracted from the security access ticket, for example, by detection system 1302, by network monitoring device 1310, and/or by another device in communication with detection system 1302. The security access ticket may be extracted from a packet intercepted and/or monitored within network 1306, for example, by detection system 1302, by network monitoring device 1310, and/or another device in communication with detection system 1302.

The encrypted portion may be received by detection system 1302 by communicating with network monitoring device 1310 and/or network interface 1308, each of which may monitor network packets (optionally in real-time) transmitted within network 1306. In some embodiments, packets containing security access tickets that are issued by authentication system 1312 and/or security server 1320 (or another server) may be monitored and/or intercepted. In some embodiments, network monitoring device 1310 is programmed to monitor packets being transmitted to and/or from authentication system 1312 (or to and/or from client 1314, or to and/or from service providing system 1316).

In some embodiments, network interface 1308 and/or network monitoring device 1310 may monitor real time network traffic relating to tickets being communicated over network 1306 and/or extract encrypted data associated with the encrypted part of the security access ticket. Monitoring may be performed continuously, optionally on all network traffic to detect packets containing security access tickets.

Network monitoring device 1310 may be configured to transmit identified packets containing security access tickets and/or the encrypted portion of the security access ticket to detection system 1302 via network interface 1308. Further, network monitoring device 1310 may be configured to monitor the transmitted packets. For example, in some embodiments, monitored packets may be intercepted, and/or logged by network monitoring device 1310.

Packets may be analyzed to detect the presence of security access ticket stored within the packet, for example, within the payload portion. The security access ticket may be extracted from such packets. The encrypted portion (and/or the security access ticket, and/or a packet including the security access ticket, and/or the metadata) may be received by detection system 1302 from an external unit that maintains records of packets containing security access tickets transmitted over network 1306, such as a router, a gateway, a network administrative server, and other network equipment. The external unit may maintain records of packets containing security access tickets issued by authentication system 1312 or other servers.

In some embodiments, the encrypted portion (or the security access ticket, or a packet including the security access ticket) may be received by detection system 1302 by accessing a local agent running on authentication system 1312, such as code implementable by a processor of authentication system 1312, and/or by accessing a local agent running on detection system 1302. The local agent may identify the encrypted portion and/or the metadata of the issuance of the security access ticket.

The security access ticket may include an encrypted portion and a non-encrypted portion, such as metadata. The non-encrypted portion may include an identifier indicative of the authentication system 1312 that issued and/or encrypted the security access ticket, such as the network address of the authentication system 1312, and/or an identification of the instance of the authentication system 1312 (e.g., the Service Principal Name and/or the Security Peripheral, which is an identifier for a certain service offered by a certain hosting server within an authentication domain. In some embodiments, such as those in which system 1300 operates according to the Kerberos protocol, the identifier of the authentication system 1312 (which may be or may include, for example, a KDC) that issued the ticket may be located in the encrypted portion. The domain name of the authentication system 1312 or KDC may be identified based on the metadata of the non-encrypted portion. In some embodiments, there may be multiple authentication systems 1312 in the network and/or in the network domain, located on different servers and/or on the same server with different instance identifies.

The non-encrypted portion of the secure access ticket may include the encryption scheme used for encrypting the data. Alternatively or additionally, the encryption scheme may be obtained, for example, by the detection system 1302 querying the authentication system 1312, the administrative server 1318, a local database, and/or other servers.

Encryption of the encrypted portion of the security access ticket may be performed by the authentication system 1312, a sub-component of the authentication system 1312, and/or another entity (e.g., an application on the same server and/or a different server).

Processing unit 1304 may be configured to parse and analyze the decrypted data as described above in connection with FIGS. 12B and 12C. To this end, processing unit 1304 may be configured to execute instructions to cause detection system 1302 to perform the analyzing. The analyzing may be performed in various manners, which may be executed simultaneously and/or sequentially.

In some embodiments, for example, the analyzing may involve comparing a value of a flag of the parsed decrypted data (e.g., stored in data repository 1324) to valid value options defined by the implementation of the computer network authentication protocol installed on authentication system 1312 that supposedly issued the security access ticket. For example, an abnormal ticket flag compared to defined options of the computer network authentication protocol may be indicative of a forgery.

Alternatively or additionally, in some embodiments the analyzing may involve comparing a case sensitive domain of the parsed decrypted data (e.g., stored in data repository 1324) to valid case sensitivity of domains as defined by the implementation of the computer network authentication protocol installed on authentication system 1312 that supposedly issued the security access ticket.

Alternatively or additionally, in some embodiments the analyzing may involve comparing a case sensitive client name of the parsed decrypted data (e.g., stored in data repository 1324) to valid case sensitivity of client names as defined by the implementation of the computer network authentication protocol installed on authentication system 1312 that supposedly issued the security access ticket.

Alternatively or additionally, in some embodiments the analyzing may involve comparing a lifetime value of the security access ticket (e.g., stored in data repository 1324) to valid ticket lifetimes as defined by the implementation of the computer network authentication protocol installed on authentication system 1312 that supposedly issued the security access ticket. For example, the values of authentication time (e.g., authtime field) and/or renew-until (e.g., renew-till field) may be verified to determine whether they are in the future or past. For example, the value of the renew-until field minus the value of the authentication time field may be according to the value defined for ticket renewal by the implementation of the protocol. As another example, the value of the start time field and/or end time field may be in the past or future. As another example, the value of the start time field minus the value of the end time field may be according to the value defined for ticket lifetime by the implementation of the protocol. Other examples are possible as well.

In some embodiments, the analyzing may be performed by Processing Unit 1304 of detection system 1302 by applying a set-of-rules to the parsed decrypted data to detect cases of potentially malicious activity in the data. The set-of-rules may, for example, compare actual decrypted data to the definition of the data according to the implementation of the computer network authentication protocol. The set-of-rules may be stored, for example, locally in data repository 1324, and/or remotely on a storage device and/or server. The set-of-rules may define cases in which anomalous data may occur. For example, according to the implementation of the computer network authentication protocol, certain fields in the encrypted portion of the security access ticket (i.e., decrypted data) may be defined as required to specify data. When such fields are identified as containing no data, then an anomaly suggesting a forgery may be identified. In another example, when inconsistencies are identified between group membership of an account field of the decrypted data and the group membership element in administrative server 1318, an anomaly may be identified.

Alternatively or additionally, administrative server 1318 may be accessed by detection system 1302 to obtain actual updated values of fields stored in the encrypted portion of the security access ticket. The analysis may be performed by comparing the actual updated values obtained from the administrative server with corresponding values of the parsed decrypted data to identify inconsistencies. The comparison may be performed, for example, using a correlation function, and/or other comparison methods. The actual updated values may include, for example, user information of an account of the client attempting to use the security access ticket to access a service of the service providing server. The user information may include, for example, logon credentials and/or group membership of the account. Other user information is possible as well.

Alternatively or additionally, the analyzing may be based on comparing categorized parsed decrypted data of previously identified genuine versions and/or forged versions of security access tickets to corresponding values of the parsed decrypted data to identify inconsistencies and/or to identify matches. The analysis may be performed, for example, by a statistical classifier that has been trained using the categorized historical decrypted data (or other machine learning based methods, or a set-of-rules, or other historical data analysis methods) and/or security access tickets into the categories of, for example, forgery or valid. The statistical classifier may be stored locally and/or remotely, for example, within data repository 1324.

When an inconsistency is found using the statistical classifier, administrative server 1318 may be accessed to obtain actual updated allowable values defined for the fields of the decrypted data. The actual updated values may be compared with corresponding values of the parsed decrypted data identified as inconsistencies using the statistical classifier (or other methods). In this manner, errors in identification of anomalous data may be reduced or prevented by considering updates to the implemented protocol. In some embodiments, since updates may be infrequent, administrative server 1318 may be accessed when anomalous data is detected based on historical data, rather than accessing administrative server 1318 more frequently (i.e., instead of using the historical data). Such a method may improve utilization of processing, storage, and/or network services, by reducing the frequency of access requests to the administrative server 1318.

Example fields, values, data, and/or data elements (e.g., according to the Kerberos protocol and/or other computer network authentication protocols) included within the encrypted part of the security access ticket that may be analyzed by detection system 1302 for identification of the forged security access ticket (i.e., analyzed in the decrypted optionally parsed state) include one or more of:

Ticket Flag field: indicates which options were used or requested when the ticket was issued.

Encryption Key Field.

Realm (or domain) field: specifies the realm (or domain) name related to issuance of the ticket. For example, the name of the realm (or domain) in which the client is registered, and/or the name of the realm in which initial authentication occurred.

Principal Name: containing the name part of the client's principal identifier.

Transited Encoding field: includes names of the Kerberos realms (or domains) that took part in authenticating the user to whom the ticket was issued.

Kerberos Time field: specifies, for example, one or more of: the start time after which the ticket is valid, end time containing the expiration time after which the ticket will no longer be honored (and, for example, rejected or invalidated), authentication time, renewal time indicating the maximum end time that may be included in a renewal of a ticket.

Host Address Field.

Authorization-Data field: used to pass authorization data from the principal on whose behalf a ticket was issued to the application service. If no authorization data is included, the Authorization-data field is omitted. The Authorization-data field includes restrictions on authority obtained on the basis of authentication using the security access ticket. The Authorization-data field may include data that specifies what actions may be performed with the ticket, according to the Kerberos implementation in the network. The data in the Authorization-data field may be valid for a certain purpose (such as for obtaining account(s) logon-related information), and may specify the designated end-service, names of service-specific objects, and rights to those objects. For example, a client wishing to print a file may obtain a file server proxy to be passed to the print server.

In some embodiments, the parsed decrypted data may be stored in an historical database. The parsed decrypted data may, for example, be stored according to a certain category based on the analysis and/or identified version of the security access ticket, such as forgery, invalid, or genuine. The data from the analysis of the different security access tickets by one or multiple detection systems 1302 may be aggregated within the historical database. The parsed decrypted data and the certain category may be used to update the statistical classifier (or other machine learning and/or categorization method). In this manner, the detection system 1302 includes the learning process, for example, to learn to identify new types of attacks using security access tickets. The historical database may be stored in a central location, for access by multiple detection systems 1302, allowing the different servers to detect new types of attacks based on identification of forged security access tickets by other detection systems 1302.

The indication and/or other information that is output by detection system 1302 may be used by any other system (either internally-implemented and/or an external system) operating over network 1306, in order to, for example, take an appropriate action to secure network 1306 from a malicious attack.

For example, the indication of the identified forged version of the security access ticket may be output (e.g. transmitted, provided, etc.) to a security program and/or a remediation program, which may be stored locally and/or remotely, for example, on security server 1320. Such information may be used by the receiving program, for example, for deleting the forged ticket, preventing the authentication system 1312 from authenticating the security access ticket (or otherwise halting the protocol), isolating the client associated with the ticket, and/or executing other network security processes.

FIG. 14 is a table 1400 of example decryption schemes, in accordance with disclosed embodiments. The decryption schemes may, for example, be suitable for software and/or hardware implementations, according to the Kerberos computer network authentication protocol encryption types, in accordance with some. Other encryption and/or decryption schemes, including those not associated with the Kerberos protocol, are possible as well.

As shown, example decryption schemes may include, for example, Data Encryption Standard (DES) decryption schemes, such as "des-cbc-crc," "des-cbc-md4," "des-cbc-md5," and "des3-cbc-sha1" decryption schemes. Example decryption schemes may further include, for example, Arcfour (also known as RC4) decryption schemes, such as "arcfour-hmac" and "arcfour-hmac-exp" decryption schemes. Example decryption schemes may still further include, for example, Advanced Encryption Standard (AES) decryption schemes, such as "aes128-cts-hmac-shat-96" and "aes256-cts-hmac-sha1-96." Example decryption schemes may further include, for example, Camellia decryption schemes, such as "camellia128-cts-cmac" and "camellia256-cts-cmac." Other decryption schemes are possible as well.

Figure 15:
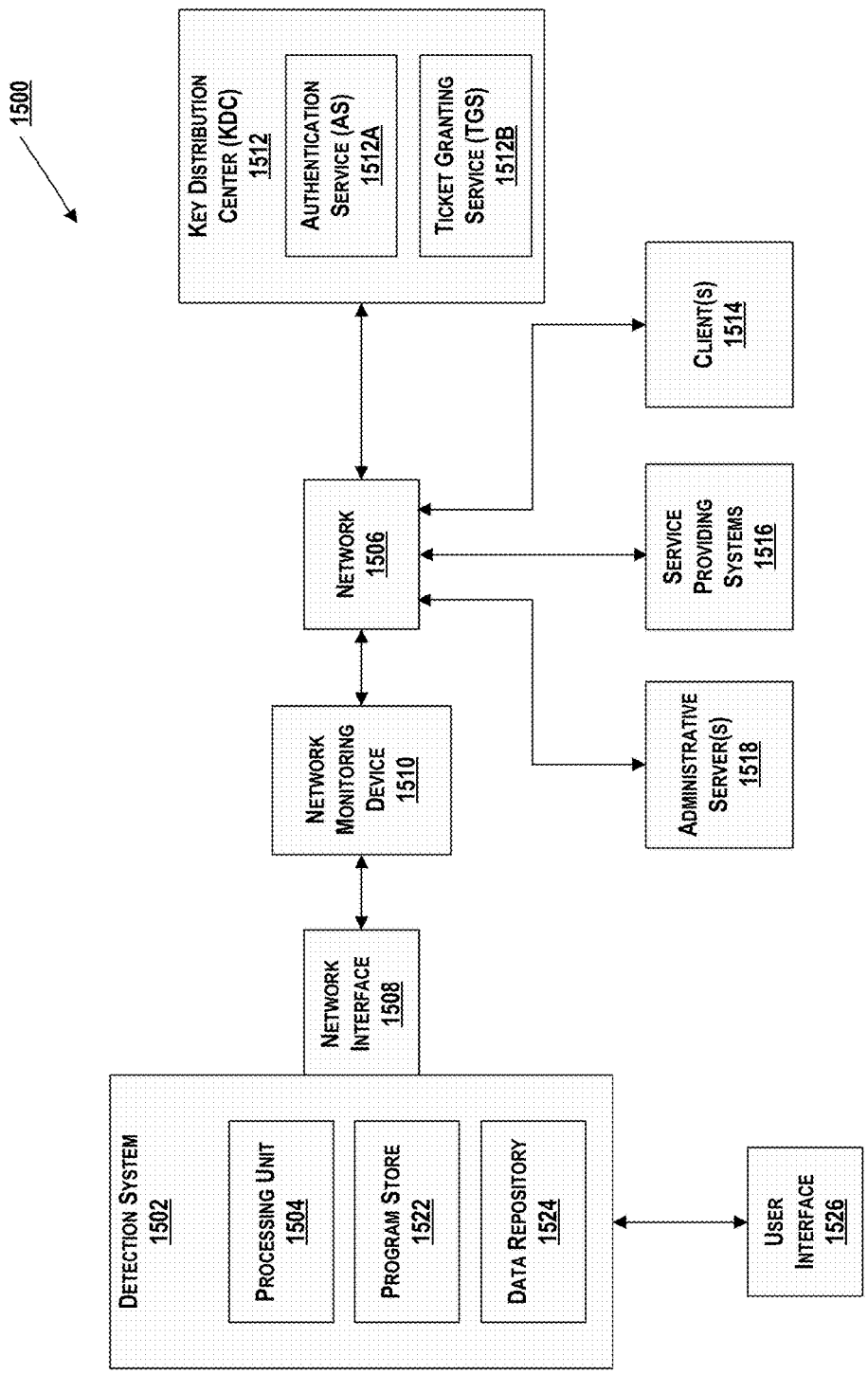
FIG. 15 is a block diagram illustrating an example system for performing detection operations on a Kerberos protocol ticket to detect potentially malicious activity, in accordance with disclosed embodiments.

FIG. 15 is a block diagram illustrating an example system 1500 for performing detection operations on a Kerberos protocol ticket to detect potentially malicious activity, in accordance with disclosed embodiments. As shown, system 1500 may include detection system 1502, including processing unit 1504, program store 1522, and data repository 1524. Detection system 1502, processing unit 1504, program store 1522, and data repository 1524 may take any of the forms described above for detection systems 108, 1100, and 1302 (in FIGS. 1, 11, and 13), processing unit 1304, program store 1322, and data repository 1324, respectively.

In some embodiments, detection system 1502 may further include user interface 1526 and network interface 1508. User interface 1526 and network interface 1508 may take any of the forms described above for user interface 1326 and network interface 1308, respectively.

As shown, system 1500 further includes network monitoring device 1510, network 1506, administrative server 1518, service providing system 1516, and client 1514. Network monitoring device 1510, network 1506, administrative server 1518, service providing system 1516, and client 1514 may take any of the forms described above for network monitoring device 1310, network 1306, administrative server 1318, service providing system 1316, and client 1314, respectively.

As shown, system 1500 further includes KDC 1512, which may include an Authentication Service (AS) component 1512A and/or a Ticket Granting Server (TGS) component 1512B. AS 1512A and TGS 1512B may be implemented within a single server or within different servers.

In some embodiments, one or more components of system 1500 may be implemented in whole or in part using cloud-based, on-demand, or other Internet-enabled computing. For instance, the functions of detection system 1502, network monitoring device 1510, network 1506, KDC 1512, administrative server(s) 1518, client(s) 1514, and/or service providing system(s) 1516 may, in some embodiments, be provided as cloud-based, on-demand, or other Internet-enabled services accessible over an Internet connection. In some embodiments, communicative coupling among detection system 1502, network monitoring device 1510, network 1506, KDC 1512, administrative server(s) 1518, client(s) 1514, and/or service providing system(s) 1516 may be via an Internet connection.

In some embodiments, monitored and/or intercepted packets may be transmitted over network 1506 to and/or from AS 1512A and/or TGS 1512B. A Kerberos ticket may be extracted from a monitored and/or intercepted packet. The Kerberos ticket may be, for example, a ticket granting ticket (TGT) issued by AS 1512A, which may be intercepted, for example, during transmission from AS 1512A to client 1514; or a client-to-server ticket issued by TGS 15126, which may be intercepted, for example, during transmission from TGS 1512B to client 1514, and/or during transmission from Client 1514 to Service Providing Server 1516. Other packets, including any packet transmitted, received, and/or stored in connection with an authentication protocol, are possible as well.

Example use cases are now described, based on the methods and systems described above. It will be understood that the example cases are merely illustrative and are not meant to be limiting.

In an example case, an attacker may attempt a Golden Ticket attack using arbitrary data in a Kerberos computer network authentication protocol environment. The created forged security access ticket may allow the attacker to impersonate another account in the network. Using the systems and/or methods described herein (e.g., the detection system), when the attacker attempts to authenticate to the service providing server using the forged ticket, the detection system may detect the forgery. The forgery may be detected based on identified inconsistencies between the parsed data element containing Logon information of the client account (in the encrypted portion of the security access ticket) and existing Logon information currently logged for the client account in an administrative server (e.g., Active Directory®).

In another example case, an attacker may attempt a Silver Ticket Attack by creating a Kerberos based Ticket Granting Server (TGS) (or a similar server based on a different protocol) with additional group memberships, to attempt to obtain elevated privileges. When the attacker attempts authentication by a target service server, the detection system may detect the forged security access ticket. The forgery may be detected based on identified inconsistencies between the group memberships of the account field (defined in the encrypted portion of the security access ticket) and the group memberships actually defined for the client account in the administrative server (e.g., Active Directory®).

In some embodiments, the systems and/or methods described herein may be implemented within a Windows® based system environment that implements Kerberos as the computer network authentication protocol. In such an implementation, the Authorization-Data field in the encrypted portion of the security access ticket may include, for example, a PAC data structure. The PAC data structure (e.g., sub-portions 210, 212, and/or 214 described above in connection with FIG. 2) includes a linked list to PAC related data. Example data elements and/or data attributes included within the PAC data structure that may be used in the analysis to determine whether the security access ticket is a forgery may, for example, include one or more of:

Logon Time: A FILETIME structure that includes the user account's last logon attribute value.

LogoffTime: A FILETIME structure that includes the time the client's logon session will expire.

KickOffTime: A FILETIME structure that includes Log off Time minus the user account's force Logoff time.

PasswordLastSet: A FILETIME structure that includes the user account's pwdLastSet attribute.

PasswordCanChange: A FILETIME structure that includes the time at which the client's password is allowed to change.

PasswordMustChange: A FILETIME structure that includes the time at which the client's password expires.

EffectiveName: An RPC_UNICODE_STRING structure that includes the user account's attribute value.

FullName: An RPC_UNICODE_STRING structure that includes the user account's full name for interactive logon and is defined to be zero for network logon.

LogonScript: An RPC_UNICODE_STRING structure that includes the user account's scriptPath attribute value for interactive logon and is defined to be zero for network logon.

ProfilePath: An RPC_UNICODE_STRING structure that includes the user account's profilePath attribute value for interactive logon and is defined to be zero for network logon.

HomeDirectory: An RPC_UNICODE_STRING structure that includes the user account's HomeDirectory attribute value for interactive logon and is defined to be zero for network logon.

HomeDirectoryDrive: An RPC_UNICODE_STRING structure that includes the user account's HomeDrive attribute value for interactive logon and is defined to be zero for network logon. This member is defined as being populated when HomeDirectory includes a universal naming convention (UNC) path structure containing information that defines how to read a path.

LogonCount: A 16-bit unsigned integer that includes the user account's LogonCount attribute value.

BadPasswordCount: A 16-bit unsigned integer that includes the user account's badPwdCount attribute value for interactive logon.

UserId: A 32-bit unsigned integer that includes the RID of the account.

PrimaryGroupId: A 32-bit unsigned integer that includes the RID for the primary group to which this account belongs.

GroupCount: A 32-bit unsigned integer that includes the number of groups within the account domain to which the account belongs.

GroupIds: A pointer to a list of GROUP MEMBERSHIP structures that include the groups to which the account belongs in the account domain.

UserFlags: A 32-bit unsigned integer that includes a set of bit flags that describe the user's logon information.

UserSessionKey: A session key that is used for cryptographic operations on a session.

LogonServer. An RPC_UNICODE_STRING structure that includes the NetBIOS name of the Kerberos KDC that performed the authentication server (AS) ticket request.

LogonDomainName: An RPC_UNICODE_STRING structure that includes the NetBIOS name of the domain to which this account belongs.

LogonDomainId: An RPC_SID structure that includes the SID for the domain specified in LogonDomainName. This member is used in conjunction with the UserId, PrimaryGroupId, and GroupIds members to create the user and group SIDs for the client.

Reserved1: A two-element array of unsigned 32-bit integers. This member is reserved, and each element of the array is defined to be zero when transmitted.

UserAccountControl: A 32-bit unsigned integer that includes a set of bit flags that represent information about this account. This field carries the UserAccountControl information from the corresponding Security Account Manager field.

SubAuthStatus: A 32-bit unsigned integer that includes the subauthentication package's section status code.

LastSuccessfullLogon: A FILETIME structure that includes the user account's Last Successful Interactive Logon Time.

LastFailedlLogon: A FILETIME structure that includes the user account's Last Failed Interactive Logon Time.

FailedlLogonCount: A 32-bit unsigned integer that includes the user account's Failed Interactive Logon Count At Last Successful Logon.

Reserved3: A 32-bit integer. This member is reserved, and is defined to be zero when transmitted.

SidCount: A 32-bit unsigned integer that includes the total number of SIDs present in the ExtraSids member.

ExtraSids: A pointer to a list of KERB_SID_AND_ATTRIBUTES structures that contain a list of SIDs corresponding to groups in domains other than the account domain to which the principal belongs.

ResourceGroupDomainSid: An RPC_SID structure that includes the SID of the domain for the server whose resources the client is authenticating to.

ResourceGroupCount: A 32-bit unsigned integer that includes the number of resource group identifiers stored in ResourceGroupIds.

ResourceGroupIds: A pointer to a list of GROUP MEMBERSHIP structures that contain the RIDs and attributes of the account's groups in the resource domain.

Other data elements and/or data attributes are possible as well.

Once potentially malicious activity is detected in a computer network, it may be desirable to remediate the network.

Remediation may, in some embodiments, involve taking corrective action to prevent, mitigate, and/or reverse the potentially malicious activity.

Figure 16:
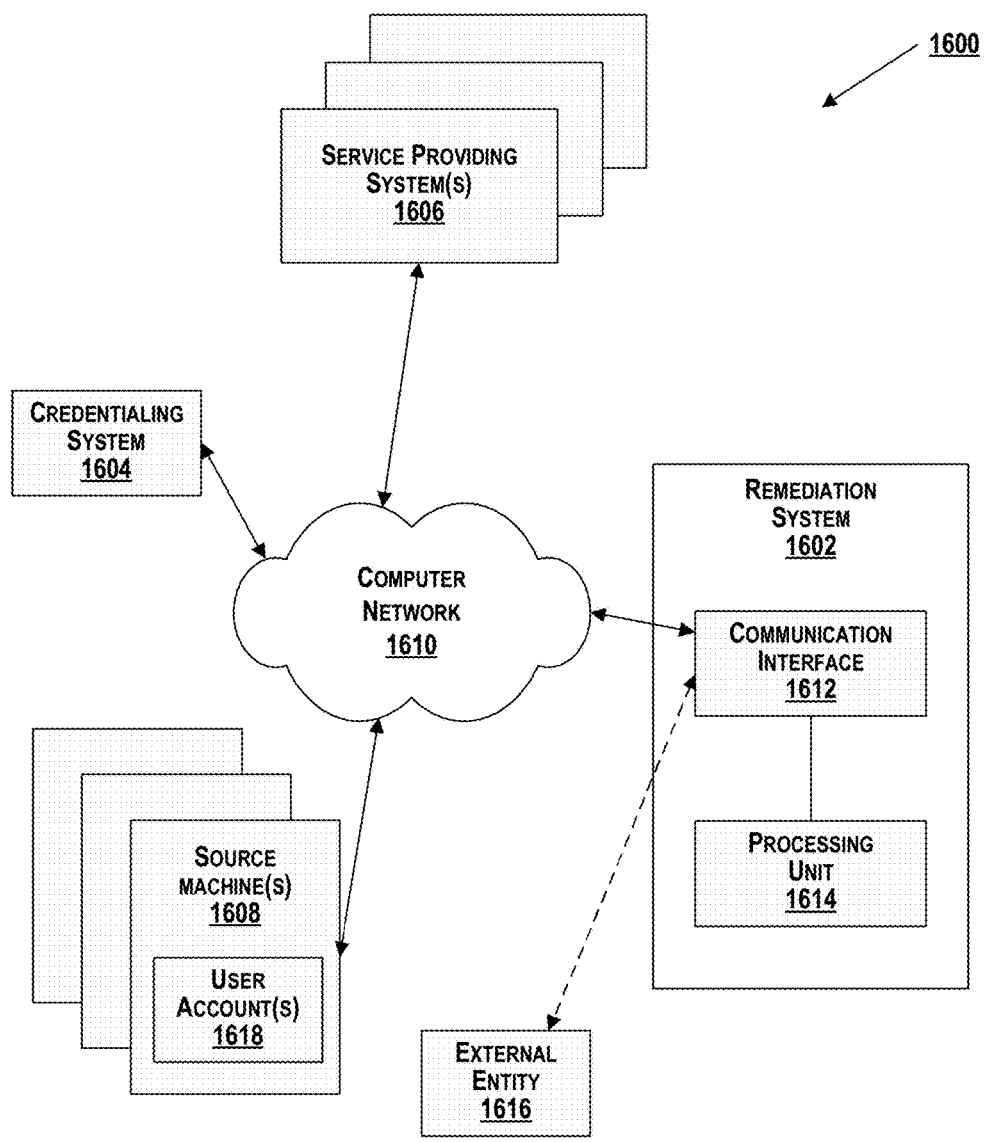
FIG. 16 is a block diagram of an example computer network including a remediation system, in accordance with disclosed embodiments.

FIG. 16 is a block diagram of an example computer network system 1600 including a remediation system 1602, in accordance with disclosed embodiments. Remediation system 1602 may be configured to prevent, mitigate, and/or reverse the potentially malicious activity detected in a computer network by one or more detection systems, such as any of detection system 108 described above in connection with FIG. 1, detection system 1100 described above in connection with FIG. 11, detection system 1302 described above in connection with FIG. 13, and detection system 1502 described above in connection with FIG. 15. In some embodiments, remediation system 1602 may be configured to perform and/or cause to be performed one or more control actions in connection with one or more network accounts. Control actions may be actions taken to prevent, mitigate, and/or reverse the potentially malicious activity.

As shown, remediation system 1602 may operate within a computer network environment. The network entities communicate over computer network 1610. As shown, for example, computer network 1610 facilitates communication between remediation system 1602, a credentialing system 1604, service providing systems 1606, and source machines 1608, which may include one or more user accounts 1618.

In some embodiments, one or more of components of system 1600 may be implemented in whole or in part using cloud-based, on-demand, or other Internet-enabled computing. For instance, the functions of remediation system 1602, credentialing system 1604, service providing system(s) 1606, source machine(s) 1608, computer network 1610, and/or external entity 1610 may, in some embodiments, be provided as cloud-based, on-demand, or other Internet-enabled services accessible over an Internet connection. In some embodiments, communicative coupling among remediation system 1602, credentialing system 1604, service providing system(s) 1606, source machine(s) 1608, computer network 1610, and/or external entity 1610 may be via an Internet connection.

Computer network 1610 may be any type and/or scale of network, using any type of protocol, whether known or yet to be known in the art. Examples of computer networks may include, for example, the Internet or another wide area network, a local area network (LAN), organizational network, global area network, or virtual network.

The term network entity encompasses any hardware or software component capable of communicating over the computer network. At least some of these network entities may have associated accounts, such as user accounts or service accounts. For example, source machine(s) 1910 is shown to have associated user account(s) 1618.

Remediation system 1602 may include communication interface 1612 and processing unit 1614. In some embodiments, remediation system 1602 may further include a control action software module and/or other logic (not shown).

Communication interface 1612 may be, for example, a physical or logical port connection provided to communicate with computer entities communicating and operating over computer network 1610 or that are external to computer network 1610, including endpoint machines, servers, target services and the like. In some embodiments, for instance, communication interface 1612 may be a network port connection for receiving notifications, otherwise referred to herein as indications, of detected potentially malicious activity in computer network 1610.

Such notifications or indications may be in the form of any signal or message that is issued out to remediation system 1602 in order to notify remediation system 1602 that potentially malicious activity is being detected in computer network 1610. In some embodiments, the notification may be issued by a different system or entity in computer network 1610 that interacts with remediation system 1602 or by an external system that communicates with computer network 1610. In some embodiments, the notification may be provided by an external entity which independently monitors activity in computer network 1610. Alternatively or additionally, notifications may be obtained by polling network entities which are of interest (such as target services, computer servers, computer endpoints, credentialing system, etc.) and requesting notification of detected suspicious activity and/or other information of interest. Other notifications are possible as well.

Potentially malicious activity may be detected in any number of ways, including, for example, the methods described above in connection with FIGS. 3, 4, 5A, 6A, 7A, 8A, 9A, 10A, and 12A-C. Other methods of detecting potentially malicious activity are possible as well.

As shown, communication interface 1612 may be operatively connected to processing unit 1614. In some embodiments, processing unit 1614 may be configurable with implementation logic to perform the processing and communication operations required to implement embodiments of the invention as described herein. In some embodiments, for example, when a notification of potentially malicious activity in computer network 1610 is received through communication interface 1612, processing unit 1614 may be operative to carry out various actions.

In some embodiments, for example, processing unit 1614 may be configured to analyze data specified in the received notification for identifying at least one account associated with the potentially malicious activity (also denoted herein an associated account). In some embodiments, processing unit 1614 may be further operative to analyze additional information relating to the potentially malicious activity. Such additional information may, for example, be obtained from other network entities, such as data logs, credential repository information, and the like. An associated account may, for example, be an account that is associated with the detected potentially malicious activity either directly or indirectly. In some embodiments, the association may be affected by many parameters, including, but not limited to, network and communication protocols, the type of account and the type of suspicious activity or attack.

In some embodiments, processing unit 1614 may be further configured to determine one or more respective control actions to perform for at least one of the identified accounts in reaction to the potentially malicious activity. In some embodiments, the control actions may be determined separately for each account, for a sub-group of accounts (e.g., for a specified type of account), or for all of the identified accounts as a group. Examples of control actions are presented below.

In some embodiments, processing unit 1614 may be still further configured to cause respective control actions to be performed on the identified accounts (either directly, or indirectly such as by invoking a different network element to perform the control action). A control action performed on an account may include one or multiple actions, such as terminating a session, changing service account credentials, limiting user authorization, and/or changing user account credentials. User account credentials may include information used by a user to access an account, such as a user identification, logon, or password. Other credentials, including any information usable to gain access to and/or otherwise associated with a network account, are possible as well.

In some embodiments, credentials used for accessing accounts and managing communication sessions may be managed by credentialing system 1604. In some embodiments, credentialing system 1604 may take the form of, for example, a Privileged Account Management System (PAMS). Other credentialing systems are possible as well.

A PAMS is a system that manages privileged accounts, access, and actions in accordance with an organizational policy by controlling and managing the credentials to privileged accounts (i.e., privileged credentials). A privileged account may be, for example, an account having heightened access to the network, such as an administrator account. Other privileged accounts are possible as well. In some embodiments, the PAMS may include user authentication, mapping of which users are allowed usage of which privileged account(s), and logging of privileged account(s) usage. In some embodiments, the PAMS may include additional features such as monitoring of actions performed by privileged users. Other additional features may include, for example, support of various workflows, such as managerial approval for password retrieval, correlation with ticketing systems, one-time passwords, and password replacement. Other additional features are possible as well. Thus, the PAMS may be operable to support and enforce organizational policies and procedures for network security and access control. In some embodiments, The PAMS may be, for example, a system commercially available, such as a Privileged Account Security (PAS) System by CyberArk® Software Ltd., assignee of this application. The PAMS make take other forms as well.

In embodiments where remediation system 1602 is configured to communicate and interact with a PAMS, remediation system 1602 may be further configured to obtain additional data from the PAMS (e.g., about the suspicious activities, identified accounts, and/or credentials associated with identified accounts) and/or instruct the PAMS to perform a control action on an account or session.

In some embodiments, remediation system 1602 may include a control action system (not shown), as noted above. A control action system may contain or may have access to logic (e.g., control action logic) configured to react to the received notification. In some embodiments, the logic may be updatable. For example, the logic may be updatable remotely by an external entity communicating over the communication interface or by a user using a graphical user interface (GUI).

In some embodiments, the control action system may be a dedicated hardware component configured with control action logic to perform control action(s) with respect to associated accounts identified in computer network 1610, thereby reacting to the suspicious activity. The control action logic may, in some embodiments, be predefined.

In some embodiments, the control action system may be configured to perform control action(s) directly on identified accounts. In some embodiments, for example, the control action system may be configured to change credentials of some or all identified accounts. Alternatively or additionally, the control action system may be configured to invoke a control action by instructing an external entity to perform the control action. For example, the control action system may instruct a PAMS to perform a credential change on specified accounts. Other examples are possible as well.

In some embodiments, the control action system may be configured to communicate with network and/or external entities over communication interface 1612. Alternatively or additionally, the control action system may include a dedicated communication interface.

In some embodiments, the logic may be dependent on pre-configuration of the system, or may be specified by user or organization preference. Alternatively or additionally, in some embodiments the control action system includes logic for performing one or more of:

i) Identifying accounts associated with the potentially malicious activity, based at least in part on analysis of the notification data;

ii) Determining which of the identified accounts should undergo control actions;

iii) Selecting respective control actions to be performed;

iv) Causing control actions to be performed, either directly by remediation system 1602 or by invoking an external entity to perform the control action. In some embodiments, for example, for a credential change control action, remediation system 1602 may instruct a PAMS to perform the credential change; and v) Providing limitations to control actions. In some embodiments, for example, an organization may choose to limit the control actions for some accounts which are deemed critical, and for which, despite detected potentially malicious activity, no action should be taken. In some cases, this may be desirable in, for example, Industrial Control Systems (ICS) and/or Critical Infrastructure (CI), where any interruption in the process can potentially lead to more harmful impacts than those caused by malicious activities. In general, an organization may choose to limit the control actions for some accounts.

In some embodiments, the logic may be accessed in any way known or yet to be known in the art, including, but not limited to from local memory on remediation system 1602 or the control action system; from an external database or other network connected storage; and from a disk or other data storage element. The logic may be accessed in other manners as well.

Figure 17A:
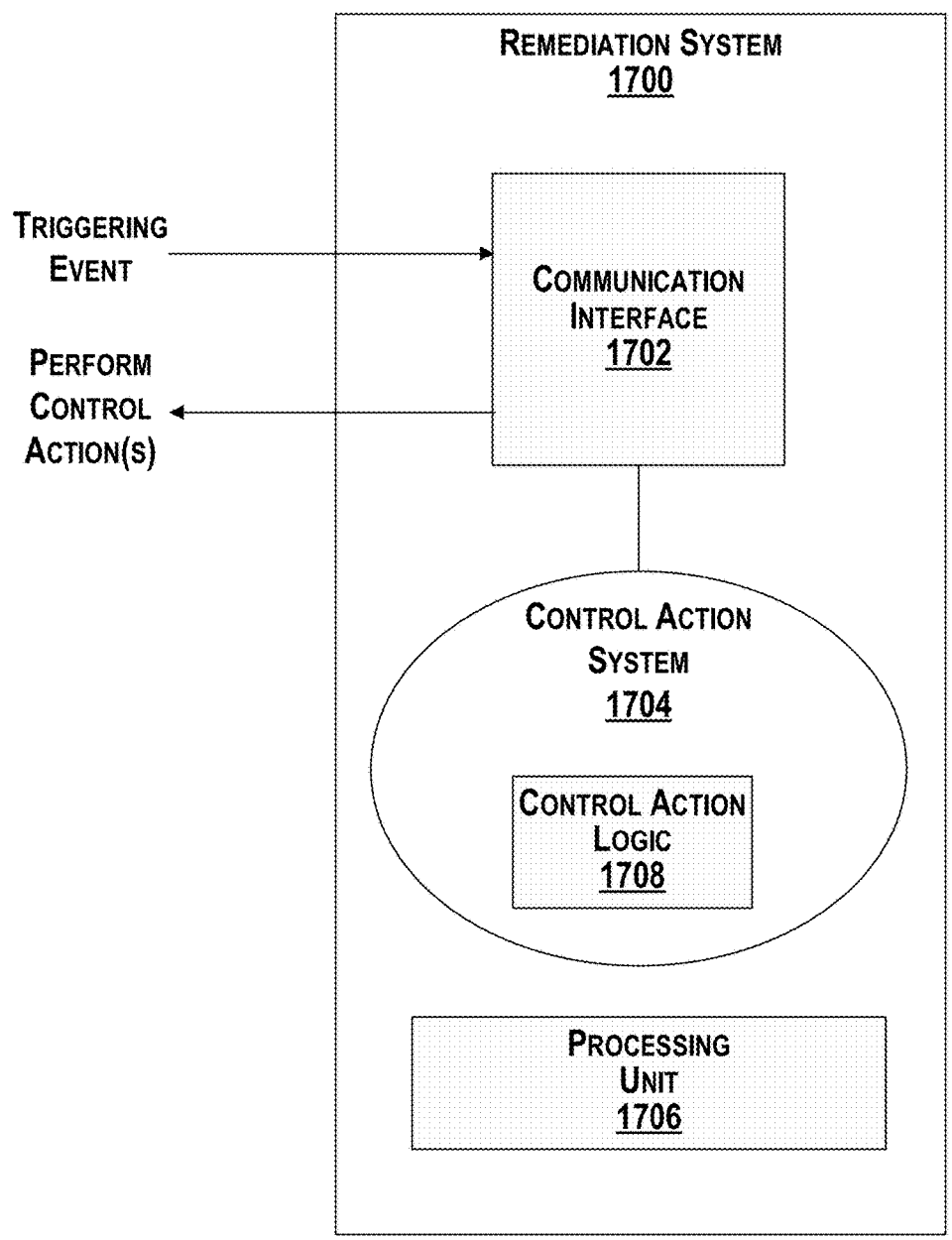
FIGS. 17A-17C are block diagrams illustrating example remediation systems for performing operations responsive to potentially malicious activity, in accordance with disclosed embodiments.
Figure 17B:
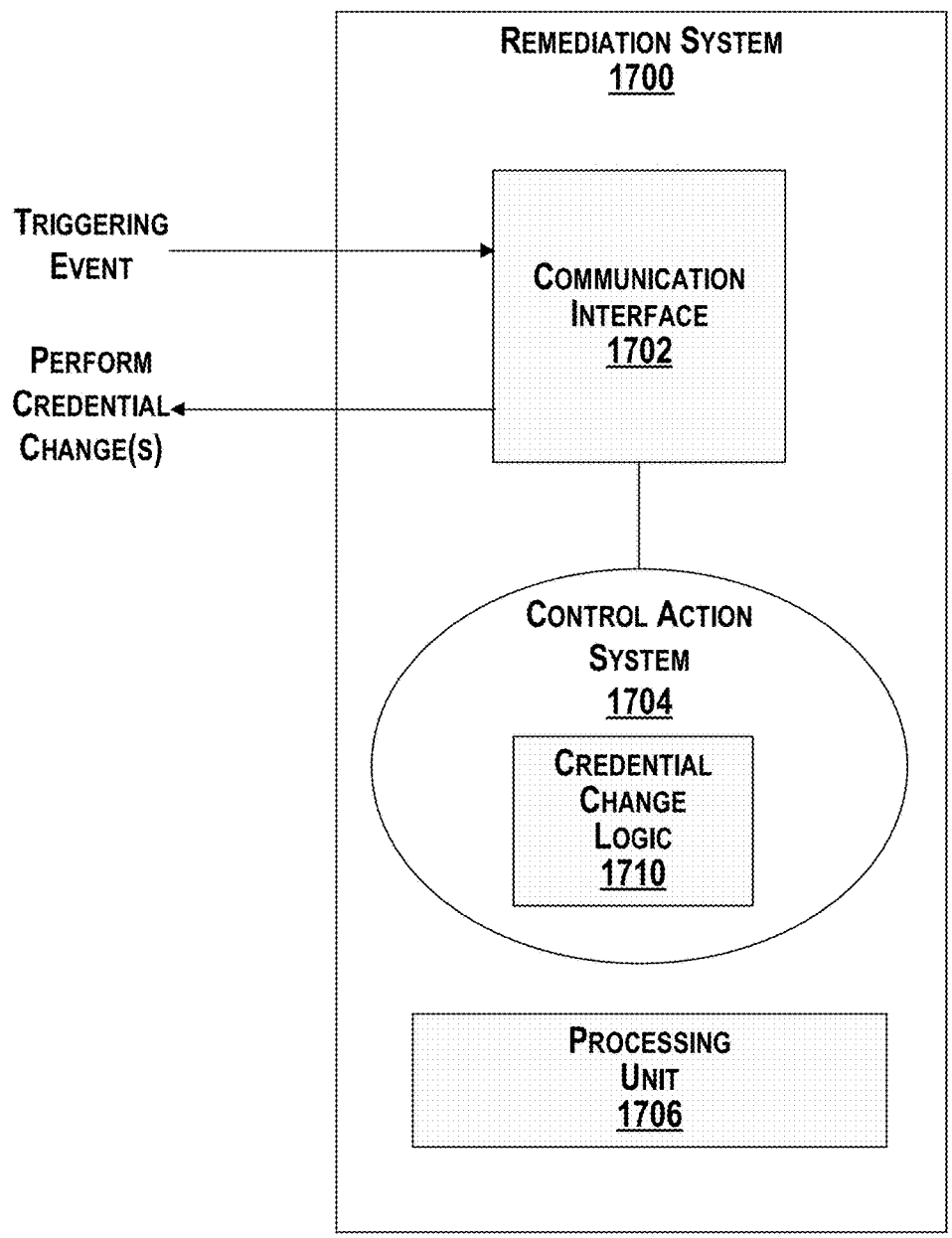
Figure 17C:
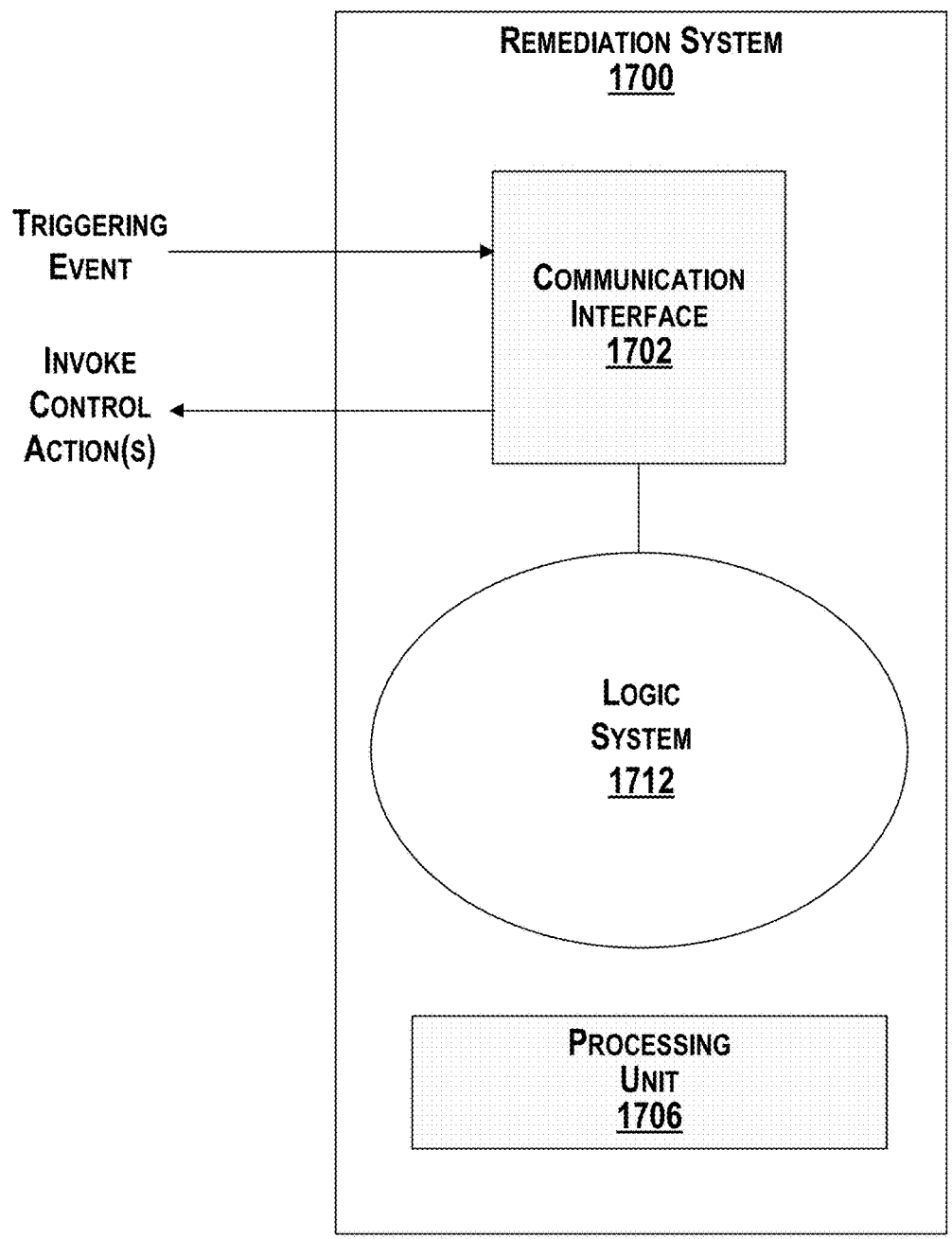

FIGS. 17A-17C are block diagrams illustrating example remediation systems for performing operations responsive to potentially malicious activity, in accordance with disclosed embodiments. The remediation systems of FIGS. 17A-17C illustrate systems which implement different control actions based on different logical rules. In some embodiments, the remediation systems may perform some or all of the logic operations using an external server or other hardware machine.

As shown in FIG. 17A, a remediation system 1700 may include a communication interface 1702, a control action system 1704, and a processing unit 1706. Control action system 1704 may include control action logic 1708. Control action logic 1708 may include any logic rules, data, or other tools configured to determine control actions to be performed and to perform the control actions or otherwise cause them to be performed. In particular, as shown, communication interface 1702 may be configured to receive notification of a triggering event. Based on the triggering event, control action system 1704 may determine, according to control action logic 1708, control actions to be performed, as shown.

Similarly, as shown in FIG. 17B, remediation system 1700 may include communication interface 1702, control action system 1704, and processing unit 1706. Control action system 1704 in FIG. 17B, however, may include credential change logic 1710. Credential change logic 1710 may include any logic rules, data, or other tools configured to determine which accounts should undergo a credential change and to perform the credential change or otherwise issue instructions to cause the credential change to be performed. In particular, as shown, communication interface 1702 may be configured to receive notification of a triggering event. Based on the triggering event, control action system 1704 may determine, according to credential change logic 1710, credential changes to be performed, as shown.

FIG. 17C shows remediation system 1700, which may include communication interface 1702 and processing unit 1706. Remediation system 1700 may further include logic system 1712. Logic system 1712 may include any logic rules, data, or other tools configured to determine which control actions should be performed with respect to an identified account and to invoke another entity or system to perform these control actions by communicating with the system over the network.

Figure 18A:
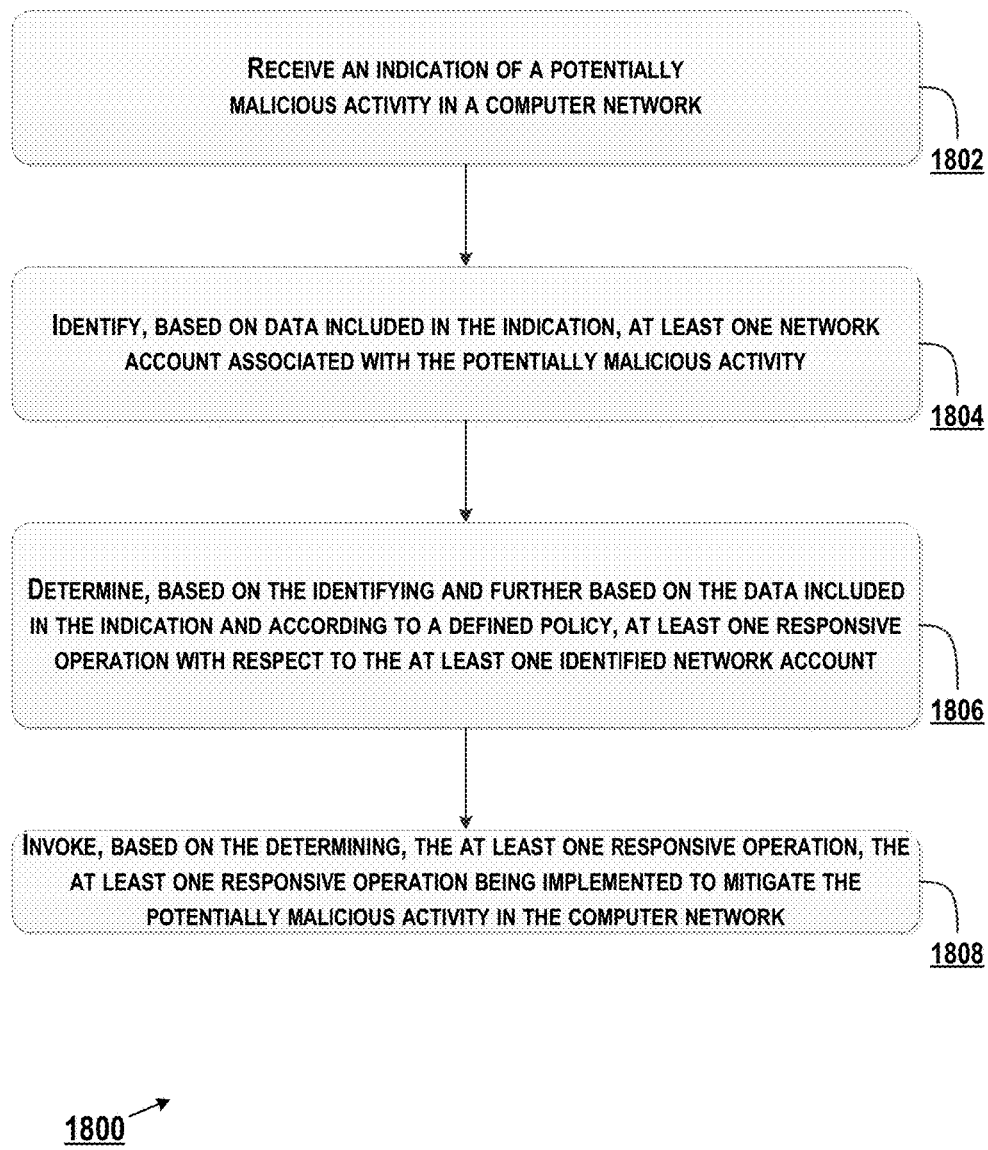
FIGS. 18A-18B are flow charts illustrating an example method for performing operations responsive to potentially malicious activity, in accordance with disclosed embodiments.
Figure 18B:
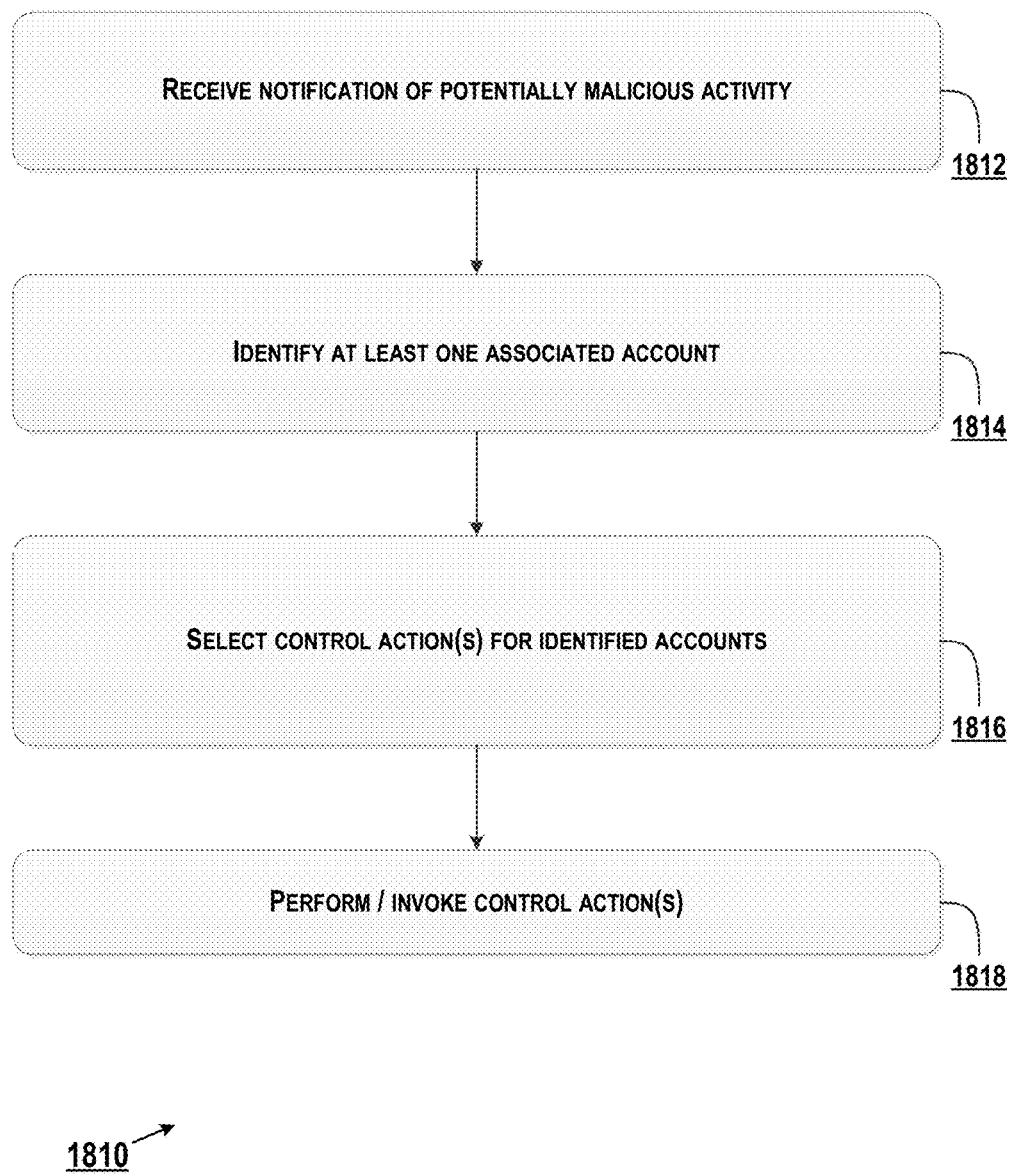

FIGS. 18A-18B are flow charts illustrating example methods for performing operations responsive to potentially malicious activity, in accordance with disclosed embodiments. Methods 1800 and 1810 may, for example, be performed by authentication system 104, service providing system 106, detection system 108, and/or remediation system 110, as described above in connection with FIG. 1. Similarly, methods 1800 and 1810 may be performed by systems 1110, 1300, 1500, 1600, and/or 1700, as described above.

A method 1800 is shown in FIG. 18A. As shown, the method 1800 includes step 1802 of receiving an indication of potentially malicious activity in a computer network. The receiving may involve, for example, includes querying a network resource and obtaining the indication from the queried network resource. Other receiving is possible as well.

The method 1800 includes at step 1804 identifying, based on data included in the indication, at least one network account associated with the potentially malicious activity. A network account may be an account providing access to the network. In some embodiments, the identifying may involve querying a network resource and identifying the at least one associated network account from the queried network resource. Other identifying is possible as well.

Alternatively or additionally, in some embodiments, the at least one identified network account may be determined to be a source of the potentially malicious activity. Alternatively or additionally, in some embodiments, the at least one identified network account may be determined to be a target of the potentially malicious activity. Still alternatively or additionally, in some embodiments, the at least one identified network account may be determined based on a type of the potentially malicious activity. And alternatively or additionally, in some embodiments, the at least one identified network account may be determined based on data in the received indication of the potentially malicious activity. The at least one identified network account may be determined in other manners as well.

In some embodiments, identifying the at least one network account associated with the potentially malicious activity may involve identifying credential data associated with a potential network attack; determining a privileged account from which the credential data originated; and identifying, as the identified network account, the determined privileged account. Credential data may be data indicating credentials used to access the network through a network account. Other credential data is possible as well. The at least one identified network account may be determined in other manners as well.

The method 1800, in some embodiments, includes at step 1806 determining, based on the identifying and further based on the data included in the indication and according to a defined policy, at least one responsive operation with respect to the at least one identified network account. In some embodiments, the determining may involve reading a policy file, the policy file being a locally stored policy file or a remotely stored policy file. Other determining is possible as well. A responsive operation may be any action taken to prevent, mitigate, and/or reverse the potentially malicious activity.

As referred to herein, the defined policy may be, for example, any organizational policy for the network related to cyber-security. The defined policy may govern network activity including, for example, credentials and network accounts. A policy file may be data indicating the defined policy.

In some embodiments, the at least one responsive operation may include, for example, taking an action on the at least one identified network account. Alternatively or additionally, the at least one responsive operation may include changing a parameter of the defined policy. A parameter may include, for example, any parameter governing network activity. Still alternatively or additionally, the at least one responsive operation may include storing data associated with the potentially malicious activity. Alternatively or additionally, in some embodiments, the responsive operation may include invalidating credentials for the at least one identified network account.

Alternatively or additionally, in some embodiments the at least one responsive operation may include changing access settings of the defined policy for the at least one identified network account. The access settings may control the ability of the at least one network account to receive incoming network communications. Still alternatively or additionally, the at least one responsive operation may include changing use settings of the defined policy for the at least one identified network account. The use settings may control the ability of the at least one network account to send outgoing network communications. In some embodiments, changing access settings may involve limiting access settings. Other changing of access settings is possible as well. In some embodiments, controlling an ability may involve restricting the ability. Other controlling of an ability is possible as well.

In other embodiments, the responsive operation includes taking no action, either with or without recording data associated with the at least one identified network account or the potentially malicious activity. If data is recorded, such data may include, for example, a recording (e.g., video or screen-shot simulation) of traffic communicated over the network, a recording of operations, keystrokes, or other user input, a recording of application operations, etc. The responsive operation may also include collecting traffic data, data from user operations, data from application activity, or creating logs, audit records, or forensic artifacts. In this way, recordings and/or data may be stored that are associated with any relevant network activity or network device.

Other responsive operations are possible as well.

The method 1800, in some embodiments, includes at step 1808 invoking, based on the determining, the at least one responsive operation, the at least one responsive operation being implemented to mitigate the potentially malicious activity in the computer network.

In some embodiments, the method 1800 may further comprise determining, based on data received in the indication, at least one related network account with a relationship criteria in common with the at least one identified network account; determining at least one corresponding responsive operation for the related network account; and invoking a corresponding responsive operation. A corresponding responsive operation may be any action implemented to broaden the scope of the invoked at least one responsive operation. Relationship criteria may indicate any relationship between network accounts, such as that network accounts are operated by the same data center or accessed by the same machine. Other relationship criteria are possible as well.

Alternatively or additionally, in some embodiments, the method 1800 may further comprise identifying a plurality of network accounts associated with the potentially malicious activity, each identified network account having at least one associated network communications policy; determining, based on the identifying and according at least one associated network communications policy, at least one responsive operation with respect to the identified plurality of network accounts; and invoking a plurality of responsive operations with respect to the plurality of network accounts, wherein differing responsive operations are applied to different network accounts.

Alternatively or additionally, in some embodiments, the method 1800 may further comprise changing network permissions for the at least one identified network account. Network permissions may indicate, for example, what network activity and/or access is permitted by the network account. Other network permissions are possible as well.

Another method 1810 for performing operations responsive to potentially malicious activity is illustrated in FIG. 18B. In some embodiments, the method 1810 may be performed by a remediation system, such as remediation systems 1602 and 1700 described above.

As shown, the method 1810, in some embodiments, includes step 1812 of receiving notification of potentially malicious activity. The notification may be received, for example, through a communication interface, such as communication interfaces 1612 and 1702 described above. The notification may include, for example, notification data indicative of potentially malicious activity detected in any of the entities connected to and operating over a computer network. In some embodiments, further data may be obtained by querying other network entities (such as a credentialing system) and/or retrieving data from a database, credential repository or other storage devices.

The method 1810, in some embodiments, includes at step 1814 identifying at least one associated account. The account may be identified by, for example, analyzing the notification data. In some embodiments, additional information relating to the potentially malicious activity may be analyzed as well. Examples of associated accounts and the identification of associated accounts are described below.

The method 1810, in some embodiments, includes at step 1816 selecting control action(s) for the identified account. In some embodiments, a control action may incorporate multiple actions which are performed, possibly in a specified sequence, to control the account in the desired manner. Other control actions are possible as well.

In some embodiments, for example, the control actions may include one or more of controlling access to an identified account; controlling use of an identified account; and changing the credentials of an identified account. Other control actions are described below.

The method 1810 further includes at step 1818 performing and/or invoking the control actions. In some embodiments, the control actions may be performed with respect to the at least one identified associated account, thereby reacting to the potentially malicious activity. In some embodiments, a control action may be performed by invoking another entity to perform the control action.

In some embodiments, control actions may include any action which controls access to and/or use of an account. For example, a control action may control access to an account, for example by wholly or partially changing, controlling, restricting, prohibiting, and/or permitting access to the account. Alternatively or additionally, in some embodiments a control action may control use of an account, for example by wholly or partially changing, controlling, restricting, prohibiting, and/or permitting use of the account. Other control actions are possible as well.

In some embodiments, control actions may include one or more of:

A) Changing the credentials of an account—Credentials may be changed according to account and/or service and/or network protocols required to effect the credential change. After the credential change, the previous credentials may no longer be used so that the danger of misuse of the credentials is eliminated. In some embodiments, the credentials may be changed transparently to the users. In other embodiments, the credential change may disrupt, at least partly, in-progress user activity. The effect of the credential change on users and in-progress user activity may depend on many factors, such as the nature of the credentials, type of suspicious activity, and type of account. Example implementations of credential changes are presented below.

B) Disabling an account—In some embodiments, if the account is local, then the account may be disabled on the device on which it is defined by accessing the device and issuing a respective command. Alternatively or additionally, if the account is network-level, then the account may be disabled at, for example, the domain controller, by issuing a respective command to the domain controller.

B) Changing the authorization policy of an account—Applying a change to the permissions and privileges of the account by, for example, limiting the level of access and operation it enables.

D) Limiting or terminating sessions established by the account—In some embodiments, f the session is managed by a PAMS (such as with CyberArk® PSM), the session may be terminated and/or the actions that may be performed using the account in the managed session may be changed, controlled, and/or limited.

E) Applying additional monitoring—In some embodiments, if the actions performed by the account may be monitored (e.g., by built-in audit log collection systems on machines in the network or by monitoring system in the PAMS), then additional monitoring may be applied, possibly including real-time monitoring, video and text recording, over-the-shoulder monitoring etc.

Other control actions are possible as well.

Potentially malicious activity may take any number of forms. Example potentially malicious activity may include:
  A) Kerberos-related operations, such as:
  i. Pass-the-Ticket Ticket-Granting-Ticket (TGT) attacks;
  ii. Golden Ticket attacks—typically referring to usages of TGT that were not generated by the legitimate Key Distribution Center (KDC). The Golden Ticket is a method to arbitrarily generate Kerberos TGT tickets for any user of the target domain. Therefore, it may be used to impersonate any user. Domain Administrators accounts are often impersonated, but potentially any legitimate user may be impersonated;
  iii) Pass-the-Ticket Service-Ticket (ST) attacks;
  iv) PAC attacks (also known as MS14-068 exploitation attack). Typically refers to a new Ticket Granting Ticket (TGT) that specifies in its PAC (i.e., in the authorization data field of the client's Kerberos ticket) different domain groups assignments than those specified in the legitimate TGT message of the KDC;
v) Silver Ticket attacks;
vi) Overpass-the-Hash attack; and
vii) Other Kerberos-messages and Kerberos tickets.
B) NT LAN Manager (NTLM)-type attacks such as:
i) Pass-the-Hash attack; and
ii) Other NTLM (e.g. NTLM-relay/NTLM-replay) type attacks.
C) Unexpected User Switch;
D) Credential Theft attacks;
E) Irregular communication; and
F) Other types of anomalous operations (e.g., messaging or data or operations) and/or account usages (e.g., from an unexpected machine or at an unexpected point of time) that are likely to pass from a user machine to a service in a computer network on behalf of a potential attacker requiring access to the computer network or entity communicating over the computer network.
G) Zero Day attacks, such as undisclosed, yet to be known, attack techniques.

Other potentially malicious activity is possible as well.

Associated accounts may take any number of forms. Example associated accounts associated with various types of potentially malicious activity may include:

A) Pass-the-ticket attack:
i. Directly associated account: An account that is using the ticket involved in the attack. In some embodiments, the directly associated account may be identified by accessing the logs in the machine and analyzing stored data to determine which account(s) were logged on during the time of the attack.
ii. Indirectly associated account: An account having the Local Administrator privileges on the machine from which the ticket specified in the notification was extracted. Extracting Kerberos tickets of a specific account's session may require local machine administrative privileges. Therefore, when a Pass-the-Ticket attack occurs, it may be that one or more of the local administrative accounts have been compromised. In some embodiments, the indirectly associated accounts may be identified utilizing application program interfaces (APIs), such as Windows Management Instrumentation (WMI) tools on the machine.

B) Golden Ticket attack:
i. Directly associated accounts:
   a. The KRBTGT account;
   b. The account utilizing the Golden Ticket specified by the notification. In some embodiments, information about the actual account utilizing the ticket may be extracted from the machine hosting the account utilizing the Golden Ticket on which the attack was executed. Information about the machine may be extracted from the notification.
ii. Indirectly associated account: All domain accounts (users, services, machines) and local accounts (that are not managed by the Domain Controller), particularly accounts having domain administrative privileges.

C) PAC attack:
i. Directly associated account: The account utilizing the ticket with the forged PAC. The account utilizing the ticket may be specified in the triggering event.
ii. Indirectly associated account: Local Administrator accounts on the machine from which the forged PAC was transmitted. In some embodiments, altering and injecting Kerberos ticket requires local administrative privileges. Therefore, when a PAC attack occurs, it may be that one or more of the local administrative accounts have been compromised and should be changed. In some embodiments, the local administrative accounts are extracted with WMI tools on the machine.

D) NTLM attack:
i. Directly associated account:
   a. The impersonated account—The impersonated account was compromised and its password hash was used to carry out the attack. Information about the account may be specified in the triggering event.
   b. The impersonating account—An account that is suspected of impersonating another account. Impersonating accounts are logged on to the machine at the time of the attack. Information about the machine may be specified in the triggering event. Information about the accounts may then be obtained from that machine by using WMI tools.
ii. Indirectly associated account: Local Administrator accounts on the machine where the attack was carried out. Altering and injecting password hashes require local administrative privileges. Therefore, when an NTLM attack occurs, it is likely that one or more of the local administrative accounts have been compromised and should be changed. Information about the machine may be specified in the triggering event. The local administrative accounts may be extracted with WMI tools on the machine.

E) Unexpected User Switch anomaly:
i. Directly associated accounts:
   a. The account initiating the switch. Information about the account may be specified in the triggering event.
   b. The target account of the switch. Information about the account may be specified in the triggering event.
ii. Indirectly associated account: Local Administrator accounts on the machine where the activity took place. Information about the machine where the activity took place may be specified in the triggering event. Information about the accounts may then be obtained from the specified machine using WMI tools.

F) Credential Theft attack:
i. Directly associated account: An account associated with the stolen credentials. Information about the account may be specified in the triggering event.
ii. Indirectly associated account: Local Administrator accounts on the machine where the activity took place. Information about the machine where the activity took place may be specified in the triggering event. Information about the accounts may then be obtained from the specified machine by using WMI tools.

G) Irregular Communication
i. Directly associated account: The account associated with the irregular communications. Information about the account may be specified by the triggering event.
ii. Indirectly associated account: Local Administrator accounts on the machine where the activity took place. Information about the machine may be specified in the Triggering Event. Information about the accounts may then be obtained from that machine by using WMI tools.

Other associated accounts are possible as well.

Associated accounts may be identified in any number of manners. In some embodiments, for example, associated accounts may be identified by:

A) Analyzing data included in the notification: An associated account may be identified by analyzing credential information and/or account information included in the notification. In the case of a Silver Ticket attack, for example, the notification may include a) the user account requesting the ticket of the attack and b) information about the service account on which the attack is designated to operate. This information may be used to query the repository to identify account(s) associated with the Silver Ticket. In some embodiments, this information may be used to access a repository, database, or other credential storage entity and to identify the account(s) associated with the detected ticket.

B) Accessing an external resource—An associated account may be identified by utilizing a special command or API to access an external resource, such as a domain controller, to obtain account information. In some embodiments, for example, an operating system API, such as WMI, may be used to access the machine specified in the triggering event in order to identify the relevant accounts operating on that machine based on information available about the suspicious events (e.g. notification data and data obtained from other network entities). Alternatively or additionally, in some embodiments, the "setspn" command may be used to access an external resource, such as the domain controller, and identify the relevant account(s) accordingly. The "setspn" command is a tool available by default in all Windows versions, which may be used to find associated accounts with a particular service, for example by using the command syntax: Setspn-Q<service>/<machine.domain_name>.

C) Logic-based identification—Based on specified logic, which is optionally defined or configurable for a particular service or service type. For example, for file system services such as Common Internet File System (CIFS) the service account involved in the attack may be defined to be an associated account. In other words, an account associated with the ticket of a detected attack may be the machine account of the target machine (e.g. target server).

Associated accounts may be determined in other manners as well.

Any number of credential change control actions are possible. In some embodiments, for example, credential change controls actions may include one or more of:

A) PMWindows—changes windows local and win-domain accounts using win-api calls such as WNetAddConnection2 (similar to net-use), NetUserChangePassword and WnetCancelConnection2.

B) PMWMIRemoteExecution—changes windows local and win-domain accounts using WMI (which runs cmd commands on remote machine). It connects to the remote machines processes namespace and registry, creates a cmd which runs the password change action and then it reads the return value from the machine's registry.

C) For service accounts each service account type has its own plug-in. Sometimes the logon and credential change may be performed using a logon account or a reconcile account (when the account cannot log on or change its own password).

Any number of service account credential change control actions are possible. In some embodiments, for example, service account credential change controls actions may include one or more of:

i. WinService—if it is a SQL service then it connects to the server with WMI, gets the sql namespace and service's state and then changes it with WMI. Otherwise, it uses win-api to logon as the account's user (Impersonate), locks and opens the ServiceActive database with full access rights (using SC Manager), recursively changes the password of the service and any dependent services with the same account and finally starts the services and unlocks the database.

ii. IISAppPool and IISAnonymous services—the password is changed using WMI.

iii. SSH Keys (on Unix machines only)—the Central Policy Manager runs a process (PMTerminal) that calls a plug-in (currently written in python) that connects to the remote machine SFTP and SSH, finds the relevant user's key file and changes the key.

Other service account credential change control actions are possible as well.

4) Credential change by a credentialing system, such as a PAMS. Optionally the method may include prompting a credentialing system to change credentials for specified associated accounts. The credential management system may be configured to connect with the different entities operating in and connected to the computer network and further communicate with the different accounts of the entities that are under its control. Examples of entities to which the credential management system connects may include one or more of: target services, user machines (clients), Active Directory®, network connected devices (such as routers, switches etc.), databases and more.

Optionally, the credentialing system may be configured to change (e.g., update, rotate, etc.) the credentials of any one of the accounts of these entities on a regularized basis based on a defined policy, and further according to the system requirements.

In some embodiments, the credential change flow may have two phases: a logon phase and a change phase. At the logon phase, the credentialing system may initiate a logon process in an attempt to logon using the current credentials (e.g. password, user name, etc.). If that logon process fails, the credentialing system may perform a secondary logon process using either the saved backup credentials or the backup containing the new credentials. If the logon process succeeds with one of the backups, those backup credentials may be saved as the correct credentials and other backups are deleted. At the change phase, the account status may be read and then verified to make sure that the account is not already in a process. When the account is already in a process the change may be postponed. When the account is a service account, the credentials object may be locked. When the credential change does not specify the next credentials (such as a password), new credentials may be generated (for example, a new key with puttygen for SSH keys). Backups for the current and new credentials may be saved in the system. The new credentials may be stored in a vault temporarily, and may become permanent after the change in the remote machine.

In some embodiments, a "credentials changer" process may be utilized in order to call the plug-in for the specific platform in order to change the credentials on the remote machine.

5) In some embodiments a credentials change may be carried out on the account that originally generated the credentials (e.g., the ticket) used in the attack. In some instances, such as in the case of a Golden Ticket attack, to achieve real-time remediation of the attack it may not be enough merely to identify an account that is associated with the ticket of the attack and to change the credentials of that account. For example, in a Golden Ticket attack the attacker may create a new ticket for any desired username (including an invalid or un-existing username) and use this ticket without any credentials.

In some embodiments, the credential change may be performed more than one time in order to overcome existing system architecture solutions which store currently in use credentials and also the previous credentials (e.g., rotational groups that allow a grace period in which both the old password and the new one are valid). For example, with respect to a Kerberos Golden Ticket, credential change may be performed by resetting the KRBTGT account password twice. Since resetting the password of a user account does not block the usage of the related Golden Ticket, the Golden Ticket becomes invalid only if the whole password history (i.e., former hashes stored in the Active Directory®) is reset (by default this occurs after two password resets). Resetting the built-in KRBTGT password twice invalidates any Golden Tickets created with the previously KRBTGT hash as well as all other Kerberos tickets.

In some embodiments, an account suspected of generating the credentials may be identified by determining the accounts logged on to the machine the ticket was used from at the time if the actual usage. The security logs residing on every endpoint machine may register the accounts that have been used to access the machine and may be analyzed to expose the accounts suspected of using the Golden Ticket. Information about the suspected accounts may be then obtained using WMI tools.

In some embodiments, in addition to identifying associated accounts, supplementary accounts may be identified. Supplementary accounts may not be directly involved with the specific suspicious activity detected, but may be potentially relevant accounts that may potentially be affected or impacted by the detected potentially malicious activities. Supplementary accounts may include, for example:

A) Other user accounts in the same operational unit operating in and controlled by a Data Center (e.g., Active Directory®) of the system;

B) Other machine accounts operating in the Data Center or in the same subnet; and C) Other service accounts in the same machine.

Other supplementary accounts are possible as well.

Supplementary accounts in the same operational unit in a Data Center may be identified by, for example, connecting with the particular operational unit and querying it about resident accounts for obtaining information about additional accounts that are associated with an already identified account. Supplementary accounts may be identified in other manners as well.

In some embodiments, all local administrator accounts on a specified (possibly compromised) machine may be located by executing the "Net localgroup administrators" command on the specified machine. The command lists all accounts with local administrator privileges. Thus, if one of the local administrator accounts on the machine is compromised the passwords may be changed for all local administrator accounts.

Accounts may be identified in other manners as well.

Figure 19:
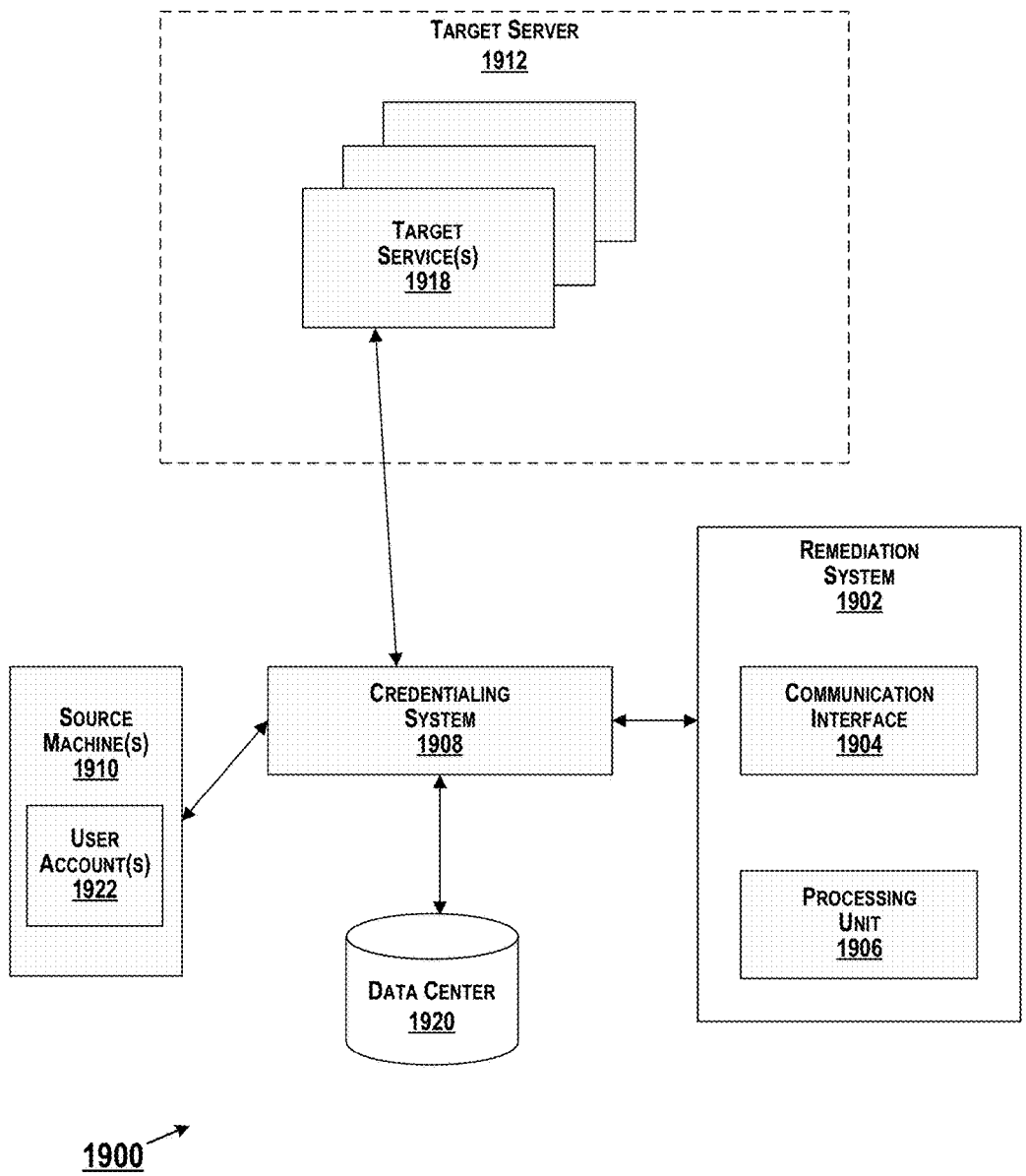
FIG. 19 is a block diagram of an example remediation system cooperating with a credentialing system, in accordance with disclosed embodiments.

FIG. 19 is a block diagram of an example remediation system 1900 cooperating with a credentialing system 1908, in accordance with disclosed embodiments. As shown, remediation system 1900 includes communication interface 1904 and processing unit 1906. Communication interface 1904 and processing unit 1906 may take any of the forms described above for communication interfaces 1612 and 1702 and processing units 1614 and 1706, respectively. Similarly, system 1900 may, for example, correspond to system 104, service providing system 106, detection system 108, and/or remediation system 110, as described above in connection with FIG. 1.

Remediation system 1900 may be configured to receive notifications, such as in the form of a triggering event, of potentially malicious activities detected in the computer network and to perform control actions on one or more accounts associated with the suspicious activities. In some embodiments, for example, the control action may be a credential change performed by connecting with credentialing system 1908.

Network entities credentialing system 1908, source machine(s) 1910, and target services 1918 may be connected over a computer network by, for example, a network interface. While only a single target server 1912 is shown, it will be understood that more target servers are possible as well. In some embodiments, for example, the target services may reside on multiple servers and/or machines connected to the computer network.

Credentialing system 1908 may be configured to manage user account credentials (e.g., passwords) by interacting with the network entities that are under its control (either directly, or indirectly) on a regularized basis and by changing (e.g., updating, rotating) credentials (e.g., passwords, SSH keys, tokens, etc.) of the identified accounts that are associated with the potentially malicious activities. In some embodiments, credentialing system 1908 may take the form of a PAMS system, as described above.

Remediation system 1902 may be configured to communicate with credentialing system 1908, via the network interface, to prompt credentialing system 1908 to carry out the control action (e.g., credential change) on selected associated account(s). The associated account(s) may include, for example, one or more of a user machine (client), a target service of a connected target server in the system, and accounts of other entities connected in the computer network. Other associated accounts are possible as well.

In some embodiments, one or more of components of system 1900 may be implemented in whole or in part using cloud-based, on-demand, or other Internet-enabled computing. For instance, the functions of remediation system 1902, credentialing system 1908, target server 1912, source machine(s) 1910, and/or data center 1920 may, in some embodiments, be provided as cloud-based, on-demand, or other Internet-enabled services accessible over an Internet connection. In some embodiments, communicative coupling among remediation system 1902, credentialing system 1908, target server 1912, source machine(s) 1910, and/or data center 1920 may be via an Internet connection.

In some embodiments, the credentials change may involve changing passwords, SSH keys, tickets, tokens, etc. The notification may be in the form of a triggering event that is issued in the system upon detection of a computer attack or other anomalous activity.

As users retrieve credentials from credentialing system 1908 (or connect through credentialing system 1908), the users may receive and use up-to-date account credentials. In this manner, operational outage due to invalidation of user or service account credentials may be limited or prevented.

It is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods as described above may be used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a software module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant clients, target services, protocols, communication networks, messages and tickets will be developed and the scope of the term client, target service, protocol, communication network, message and ticket is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for detecting potentially malicious activity, comprising:
   receiving data associated with a plurality of authentication messages, wherein at least some of the received data includes secure ticket data, the authentication messages having been communicated over a network and the plurality of authentication messages includes at least one of ticket-granting ticket requests and service ticket requests;
   analyzing the received data associated with the plurality of authentication messages;
   determining, based on the analyzing, a plurality of characteristics of the data associated with the authentication messages, wherein a characteristic from the plurality of characteristics includes the secure ticket data;
   receiving data associated with a new authentication message communicated over the network;
   determining a plurality of characteristics of the data associated with the new authentication message;
   comparing at least one determined characteristic of the new authentication message data with at least one of: a determined characteristic of the plurality of authentication messages data, known valid data, and known invalid data, wherein the comparing includes:
   determining whether the new authentication message data includes a ticket;
   identifying a machine from which the new authentication message data originated; and
   ascertaining whether the ticket was previously sent to the machine from which the new authentication message originated; and
   generating, based on the comparison, an assessment of whether the new authentication message is indicative of the potentially malicious activity in the network.

2. The non-transitory computer-readable medium of claim 1, wherein generating the assessment includes performing a protective false-positive detection operation to limit false-positive indications from the potentially malicious activity indications.

3. The non-transitory computer-readable medium of claim 1, wherein generating the assessment includes determining whether the new authentication message data is associated with a potential attack in the network.

4. The non-transitory computer-readable medium of claim 1, wherein generating the assessment includes determining information containing the potentially malicious activity.

5. The non-transitory computer readable medium of claim 1, further including identifying a network account associated with a sender of the received data associated with the new authentication message, and executing a responsive measure with respect to the identified network account.

6. The non-transitory computer-readable medium of claim 1, wherein the new authentication message is encrypted, and the comparing is based on encrypted data of the new authentication message without first decrypting the encrypted data.

7. The non-transitory computer-readable medium of claim 1, wherein the comparing includes determining whether data from the new authentication message matches data from the received data from the plurality of authentication messages.

8. The non-transitory computer-readable medium of claim 1, wherein the comparing includes determining whether data from the new authentication message includes a flag that is not included in the received data from the plurality of authentication messages.

9. The non-transitory computer-readable medium of claim 1, wherein the comparing includes determining whether an encryption type associated with the new authentication message data matches an encryption type associated with the received data from the plurality of authentication messages.

10. The non-transitory computer-readable medium of claim 1, wherein the comparing includes determining whether the new authentication message data includes a ticket that is also included in the received data from the plurality of authentication messages.

11. The non-transitory computer-readable medium of claim 1, wherein the comparing includes:
    determining whether the new authentication message data includes a ticket;
    identifying a machine from which the new authentication message data originated; and
    ascertaining whether the ticket was previously sent to the machine from which the new authentication message originated.

12. The non-transitory computer-readable medium of claim 1, wherein the comparing includes determining whether an encryption attribute of an authentication message, from the plurality of authentication messages, matches an encryption attribute of the new authentication message.

13. The non-transitory computer-readable medium of claim 1, wherein the plurality of authentication messages include Kerberos messages and the new authentication message is a Kerberos message.

14. The non-transitory computer-readable medium of claim 1, further comprising intercepting the new authentication message and determining, based on the assessment, whether to transmit the new authentication message to a target application.

15. A network system configured for detecting potentially malicious activity, the network system comprising:
    at least one computer-readable memory storing instructions; and
    at least one processor configured to execute the instructions to:
    receive data associated with a plurality of authentication messages, wherein at least some of the received data includes secure ticket data, the authentication messages having been communicated over a network and the plurality of authentication messages includes at least one of ticket-granting ticket requests and service ticket requests;

analyze the received data associated with the plurality of authentication messages;

determine, based on the analysis, a plurality of characteristics of the data associated with the authentication messages, wherein a characteristic from the plurality of characteristics includes the secure ticket data;

receive data associated with a new authentication message communicated over the network;

determine a plurality of characteristics of the data associated with the new authentication message;

compare at least one determined characteristic of the new authentication message data with at least one of: a determined characteristic of the plurality of authentication messages data, known valid data, and known invalid data, wherein the comparing includes:

determining whether the new authentication message data includes a ticket;

identifying a machine from which the new authentication message data originated; and ascertaining whether the ticket was previously sent to the machine from which the new authentication message originated; and generate, based on the comparison, an assessment of whether the new authentication message is indicative of the potentially malicious activity in the network.

16. The network system of claim 15, wherein the generation of the assessment includes performing a protective false-positive detection operation to limit false-positive indications from the potentially malicious activity indications.

17. The network system of claim 15, wherein the at least one processor is further configured to execute the instructions to identify a network account associated with a sender of the received data associated with a new authentication message, and execute a responsive measure with respect to the identified network account.

18. The network system of claim 15, wherein the comparison includes a determination of whether data from the new authentication message matches data from the received data from the plurality of authentication messages.

19. The network system of claim 15, wherein the comparison includes a determination of whether data from the new authentication message includes a flag that is not included in the received data from the plurality of authentication messages.

20. The network system of claim 15, wherein the comparison includes a determination of whether an encryption type associated with the new authentication message data matches an encryption type associated with the received data from the plurality of authentication messages.

21. The network system of claim 15, wherein the plurality of authentication messages include Kerberos messages and the new authentication message is a Kerberos message.

22. The network system of claim 15, wherein the new authentication message is an intercepted message, such that the generation of the assessment occurs before a determination of whether to transmit the new secure ticket message to the target application.

23. A computer-implemented method for performing potentially malicious activity detection operations, comprising:

receiving data associated with a plurality of authentication messages, wherein at least some of the received data includes secure ticket data, the authentication messages having been communicated over a network and the plurality of authentication messages includes at least one of ticket-granting ticket requests and service ticket requests;

analyzing the received data associated with the plurality of authentication messages;

determining, based on the analyzing, a plurality of characteristics of the data associated with the authentication messages, wherein a characteristic from the plurality of characteristics includes the secure ticket data;

receiving data associated with a new authentication message communicated over the network;

determining a plurality of characteristics of the data associated with the new authentication message;

comparing at least one determined characteristic of the new authentication message data with at least one of: a determined characteristic of the plurality of authentication messages data, known valid data, and known invalid data, wherein the comparing includes:

determining whether the new authentication message data includes a ticket;

identifying a machine from which the new authentication message data originated; and ascertaining whether the ticket was previously sent to the machine from which the new authentication message originated; and generating, based on the comparison, an assessment of whether the new authentication message is indicative of the potentially malicious activity in the network.

24. The computer-implemented method of claim 23, wherein the comparing includes determining whether an encryption type associated with the new authentication message data matches an encryption type associated with the received data from the plurality of authentication messages.

25. The computer-implemented method of claim 23, wherein the comparing includes determining whether the new authentication message data includes a ticket that is also included in the received data from the plurality of authentication messages.

* * * * *